(12) United States Patent
Futa et al.

(10) Patent No.: US 8,265,267 B2
(45) Date of Patent: Sep. 11, 2012

(54) INFORMATION SECURITY DEVICE

(75) Inventors: Yuichi Futa, Osaka (JP); Masao Nonaka, Osaka (JP); Natsume Matsuzaki, Osaka (JP)

(73) Assignee: Panasonic Corporation, Osaka (JP)

( * ) Notice: Subject to any disclaimer, the term of this patent is extended or adjusted under 35 U.S.C. 154(b) by 877 days.

(21) Appl. No.: 12/376,494

(22) PCT Filed: May 20, 2008

(86) PCT No.: PCT/JP2008/001252
§ 371 (c)(1),
(2), (4) Date: Feb. 5, 2009

(87) PCT Pub. No.: WO2008/149496
PCT Pub. Date: Dec. 11, 2008

(65) Prior Publication Data
US 2010/0177886 A1    Jul. 15, 2010

(30) Foreign Application Priority Data

May 30, 2007    (JP) ................................. 2007-143243

(51) Int. Cl.
*G06F 21/00*      (2006.01)
(52) U.S. Cl. ........................................................ 380/28
(58) Field of Classification Search ..................... 380/28
See application file for complete search history.

(56) References Cited

U.S. PATENT DOCUMENTS

| | | | |
|---|---|---|---|
| 6,408,075 B1 | 6/2002 | Ohki et al. | |
| 2005/0152541 A1* | 7/2005 | Takenaka et al. | ............... 380/28 |
| 2008/0025500 A1 | 1/2008 | Izu et al. | |

FOREIGN PATENT DOCUMENTS

| | | |
|---|---|---|
| JP | 2000-165375 | 6/2000 |
| WO | 2006/077651 | 7/2006 |

OTHER PUBLICATIONS

Itoh, et al. DPA Countermeasures by Improving the Window Method. CHES2002, LNCS. 2523. Springer. Apr. 2003. pp. 303-317. Docuemtn submitted by applicant.*

International Search Report issued Aug. 19, 2008 in the International (PCT) Application of which the present application is the U.S. National Stage.

"A-7-4 Attack Method Using Template of Power Consumption," Manuscript No. 2006-10059-138, Joint Convention of the Institute of Electronics, Information and Communication Engineers and the IEICE Engineering Sciences Society, p. 138.

(Continued)

*Primary Examiner* — Jason Gee
(74) *Attorney, Agent, or Firm* — Wenderoth, Lind & Ponack, L.L.P.

(57) ABSTRACT

To aim to provide an information security device capable of reducing a period necessary for performing a power operation used for secret communication or authentication. The information security device performs secret communication or authentication by calculating an exponentiation $X^d$ based on target data X and a secret value d using the window method. In the process of calculating the exponentiation $X^d$, immediately after square of a random value R acquired for multiplication is repeatedly performed a predetermined number of times, for example 256 times, a result of square of the random value R is cancelled using a cancellation value S ($=R^{(-2^{256})}$). This makes it unnecessary to perform cancellation processing that has been conventionally performed.

17 Claims, 30 Drawing Sheets

OTHER PUBLICATIONS

Kouichi Itoh et al., "DPA Countermeasures by Improving the Window Method," CHES2002, LNCS, 2523, Springer, Apr. 2003, pp. 303-317.

Paul Kocher, "Timing Attacks on Implementations of Diffie-Hellman, RSA, DSS and Other Systems," CRYPTO' 96, INCS 1109, Springer-Verlag, 1996, pp. 104-113.

Paul Kocher, "Differential Power Analysis," Advances in Cryptology—CRYPTO' 99, LNCS, 1666, Springer-Verlag, 1999, pp. 388-397.

"Power Analysis and Counterneasure of RSA Cryptosystem," Journal A of the Institute of Electronics, Information and Communication Engineers vol. J88-A, No. 5, 2005, pp. 607-611.

* cited by examiner

FIG. 14

PRIVATE KEY d
$(d=1\times2^{511}+1\times2^{510}+1\times2^{509}+\cdots+1\times2^{2}+1\times2^{1}+1)$

| 1 (count=511) | 1 (count=510) | ... | 1 (count=509) | ... |
|---|---|---|---|---|
| ·Z←1<br>·Z←Z^2<br>=1<br>·Z←Z×X×R<br>=1×X×R<br>=X×R | ·Z←Z^2<br>=(X×R)^2<br>·Z←Z×X×R<br>=(X×R)^2×X×R | ... | ·Z←Z^2<br>=((X×R)^2×X×R)^2<br>·Z←Z×X×R<br>=((X×R)^2×X×R)^2×X×R | ... |

① ②

INFORMATION SECURITY DEVICE

TECHNICAL FIELD

The present invention relates to an art of making it difficult to perform an analysis attack on secret information embedded in an encryption module by measuring an amount of power consumed for encryption processing.

BACKGROUND ART

In recent years, various types of code-cracking methods have been proposed for analyzing an encryption key with use of side information of encryption processing performed by an encryption module realized with hardware or software. These code-cracking methods allow an unauthorized third person to analyze an encryption key to crack a private key, and pretend to be an authorized user using the cracked private key to perform an unauthorized act using the private key.

One example of such code-cracking methods is a timing attack in which an encryption key is analyzed with use of the fact that a period necessary for an encryption module to perform encryption processing slightly varies depending on a value of the encryption key used for the encryption processing. That is, according to the timing attack, an encryption key is analyzed using a period necessary for performing encryption processing as side information. Code-cracking methods using side information include the Simple Power Analysis and the Differential Power Analysis in which an encryption key is analyzed using an amount of power consumed for performing encryption processing as side information. With high-performance measurement devices that are obtainable inexpensively in recent years, these code-cracking methods are known to be capable of analyzing actual products provided with an encryption module such as IC cards. In the following descriptions, code-cracking methods of analyzing an encryption key with use of the change in an amount of power consumed for encryption processing by an encryption module as described above, that is, a power waveform are collectively referred to as "power analysis attacks". Note that timing attacks are described in detail in the Non-Patent Document 1, and power analysis attacks are described in detail in the Non-Patent Document 2.

The following describes the Simple Power Analysis of the RSA encryption. Note that the RSA encryption is described in detail in the Non-Patent Document 3.

<Simple Power Analysis of RSA Encryption>

In a case where decryption processing is performed based on the RSA encryption scheme, with respect to a product n of primes p and q, a ciphertext c that is a positive integer less than n, and a private key d that is a positive integer, $c^d \bmod n$ is calculated. As a method of calculating this expression, the binary method disclosed in page 9 of the Non-Patent Document 4 is known, for example. The following describes the binary method. When $d = d0 + d1 \times 2 + d2 \times 2^2 + \ldots + d(len-1) \times 2^{(len-1)}$ and $i = 0, 1, \ldots, len-1$ are satisfied, di is 0 or 1. Here, len denotes the number of bits of d, and "×" denotes multiplication of integers, and "x^y" denotes x raised to the y-th power.

(Binary Method)
Step 1-1: $i \leftarrow len-2$ and $z \leftarrow c$
Step 1-2: $z \leftarrow z^2 \bmod n$
Step 1-3: Judge whether di is 1.
When $di=1$, $z \leftarrow z \times c \bmod n$.
Step 1-4: $i \leftarrow i-1$ Judge whether i is negative. When i is negative, output z. Otherwise, return to Step 1-2.

According to the above method, Steps 1-2, 1-3, and 1-4 are repeatedly performed as a loop. In this loop, with respect to di ($i=1, 2, \ldots, len-1$) in a case where $di=1$, square of z and multiplication of c are performed. With respect to di ($i=1, 2, \ldots, len-1$) in a case where $di=0$, only square of z is performed. The value n is a large value such as an integer of 1024 bits. Generally, square can improve the efficiency in calculation processing compared with multiplication. Accordingly, it is possible to perform processing in a case where $di=0$ at a higher speed than that in a case where $di=1$. In such a case, square and multiplication differ in processing from each other, and accordingly differ in power waveform from each other.

Therefore, measurement of power waveforms makes it possible to analyze a calculation order in which square and multiplication are performed. Furthermore, by using the fact that calculation processing performed in the loop differs depending on a value of di, it is possible to obtain a value of di based on the calculation order in which calculation processing is performed. As a result, it is possible to perform the Simple Power Analysis by performing the following steps.

(Simple Power Analysis Using Binary Method)
Step 2-1: Decrypt a ciphertext c, and measure power waveforms consumed for decrypting the ciphertext c.
Step 2-2: Obtain the calculation order in which square and multiplication are performed based on the above power waveforms.
Step 2-3: Obtain a bit di ($i=1, 2, \ldots, len-1$) based on the above calculation order.

<Conventional Countermeasure Against Simple Power Analysis of RSA Encryption>

According to the above Simple Power Analysis, a private key is analyzed by using the fact that multiplication is performed only when $di=1$ in Step 1-3 of the binary method.

In view of this, the following countermeasure has been proposed against the Simple Power Analysis. According to this countermeasure, when $di=0$, z is multiplied by 1. A result of this multiplication remains z. However, by performing multiplication even when $di=0$, the calculation order in which square and multiplication are performed does not depends on whether di is 0 or 1 (see the Non-Patent Document 1).

According to the above countermeasure against the Simple Power Analysis of the RSA encryption, when $di=1$, a value c is used for multiplication. Also, when $di=0$, a value 1 is used for multiplication. In this way, a multiplier differs depending on whether di is 0 or 1. With use of this, there has been proposed an attack of analyzing whether di is 0 or 1 (referred to as "Big Mac Attack") (see the Non-Patent Document 5). This Big Mac Attack enables analysis on whether di is 0 or 1 even if the above countermeasure against the Simple Power Analysis is taken. This is because power waveforms consumed for performing multiplications using the same multiplier are likely to partially match each other. Accordingly, it is possible to classify power waveforms consumed for performing multiplications into two types (for example, a group A and a group B), which are acquired by performing the Simple Power Analysis. There are only two correspondence patterns including a pattern in which the group A corresponds to $di=1$ and the group B corresponds to $di=0$, and a pattern in which the group A corresponds to $di=0$ and the group B corresponds to $di=1$. By newly decrypting a ciphertext with respect to each of the two patterns for example, it is possible to find which of the two patterns is correct, that is, it is possible to obtain a private key.

In view of this, the Patent Document 1 discloses an art for making analysis of a private key difficult. According to this art, a private key d is divided into a plurality of blocks each having predetermined bits. A value z is multiplied by a random value different for each block based on the binary method regardless of a value of di. Then, after squares and multiplications complete with respect to all the values as di, a random value used for the multiplications is cancelled using a cancellation value corresponding to the random value.

According to the Patent Document 1, before $c^d$ for a ciphertext c is calculated, values R and S are calculated. Here, R×S mod n=1.

Then, square and multiplication for each of values as di are performed. Here, random values to be used for multiplication are determined using a value R such that the random values are different for each block. For example, with respect to the m-th block, multiplication is performed using a random value $R^m$. Accordingly, it is possible to use random values different for each block.

After squares and multiplications complete with respect to all the blocks, an influence of the random value R is cancelled by using a value S. This results in a value $c^d$.

According to this art, there are two correspondence patterns including a pattern in which di=0 and a pattern in which di=1 for each block. Since there are two correspondence patterns for each of all the blocks, there are 2^(the number of blocks) patterns for the whole private key d. Accordingly, an analyzer needs to check all the 2^(the number of blocks) patterns. This makes analysis of a private key difficult.

[Patent Document 1] Japanese Laid-Open Patent Application Publication No. 2000-165375
[Non-Patent Document 1] Paul Kocher. Timing attacks on implementations of Diffie-Hellman, RSA, DSS, and other systems. In Neal Koblitz, editor, CRYPTO'96, LNCS1109, Springer-Verlag, 1996, pp. 104-113
[Non-Patent Document 2] P. Kocher, J. Ja_e, and B. Jun, "Di_erential Power Analysis", Advances in Cryptology-CRYPTO '99, LNCS, 1666, Springer-Verlag, 1999, pp. 388-397
[Non-Patent Document 3] Tatsuaki OKAMOTO, Hirosuke YAMAMOTO "Gendai Ango" (Modern Cryptography), Sangyotosho (1997)
[Non-Patent Document 4] H. Cohen, "A Course in Computational Algebraic Number Theory", GTM 138, Springer-Verlag, 1996, p 9
[Non-Patent Document 5] C. D. Walter, "Sliding windows succumbs to Big Mac Attack", CHES2001, LNCS2162, Springer-Verlag, 2001, pp. 286-299
[Non-Patent Document 6] Kaminaga, Watanabe, Endoh, OhKohchi, "Power Analysis and Countermeasure of RSA Cryptosystem", IEICE, Vol. J88-A, No. 5, pp. 606-615, 2005

SUMMARY

Problems the Invention is Going to Solve

However, according to the art disclosed in the Patent Document 1, after squares and multiplications for all the values as di complete, a random value used for the multiplications is cancelled. As a result, it takes a longtime to cancel the random value for the following reason. For example, in a case where an operation target is a bit d511 that is a bit at a head of all the bits, if a random value R is acquired, this random value R exerts influences on all the bits subsequent to the bit d511, and finally results in $R^{(2^{(len-1)})}$. In other words, when an operation target is the i-th bit di, a random value $R^m$ is acquired. Then, square is performed using the random value $R^m$ with respect to each of all the bits subsequent to the i-th bit di. Here, the value m denotes a block number of a block to which di belongs. Squares with respect to all the bits subsequent to the i-th bit di finally results in $(R^m)^{(2^{(i-1)})}$.

That is, in order to cancel the influence of the random value R using the value S, it is necessary to calculate, for each of all the values as di, a cancellation value $(S^m)^{(-2^{(i-1)})}$ corresponding to the final result of the squares $(R^m)^{(2^{(i-1)})}$ performed using the random value $R^m$ acquired for performing multiplication of the value di, and multiply all the calculated cancellation values.

As a result, it takes a longtime to cancel the influence of the random value R using the value S, and as a result it takes a long time to perform the whole power operations.

In view of the above problem, the present invention aims to provide an information security device, a method, a program, and an integrated circuit that are capable of reducing a period necessary for performing calculation processing that is calculated when secret communication or authentication is performed.

Means to Solve the Problems

In order to achieve the above aim, the present invention provides an information security device that securely and reliably processes predetermined information by performing a power operation d&X over a group defined by a predetermined set and a basic operation that uses elements of the predetermined set, the power operation d&X being the basic operation repeatedly performed d times using an element X, the information security device comprising: an acquisition unit operable to acquire a value d; and a main operation unit operable to perform the power operation d&X by performing a window operation and a carry operation based on a window method for each of windows of the value d, the window operation being performed using the element X and a window value of a corresponding one of the windows, wherein with respect to a first window included in the windows, the main operation unit uses a random value R to perform the window operation, and with respect to a second window included in the windows, the main operation unit uses a cancellation value S to perform the window operation, the cancellation value S being for canceling a cumulative factor that is a result of the carry operations performed using the random value R with respect to windows from the first window to the second window.

Effect of the Invention

According to the above structure, in the process of performing a power operation d&X using target data X based on the window method, the information security device cancels the influence of the carry operation performed using the acquired random value with respect to the first window, by performing the window operation using the cancellation value S with respect to the second window. Accordingly, unlike the conventional information security devices, the information security device does not need to perform cancellation processing of calculating a value to be used for canceling the influence of the random value R after the window operations with respect to all the windows have been performed. Therefore, it is possible to reduce the whole period necessary for performing power operations compared with the conventional information security devices.

BRIEF DESCRIPTION OF THE DRAWINGS

FIG. 14 shows, by giving a specific example, that after exponentiation of a random value R is performed a predetermined number of times (256 times), an influence of the random value R is cancelled, continuing to FIG. 15;

DESCRIPTION OF CHARACTERS

Figure 1:
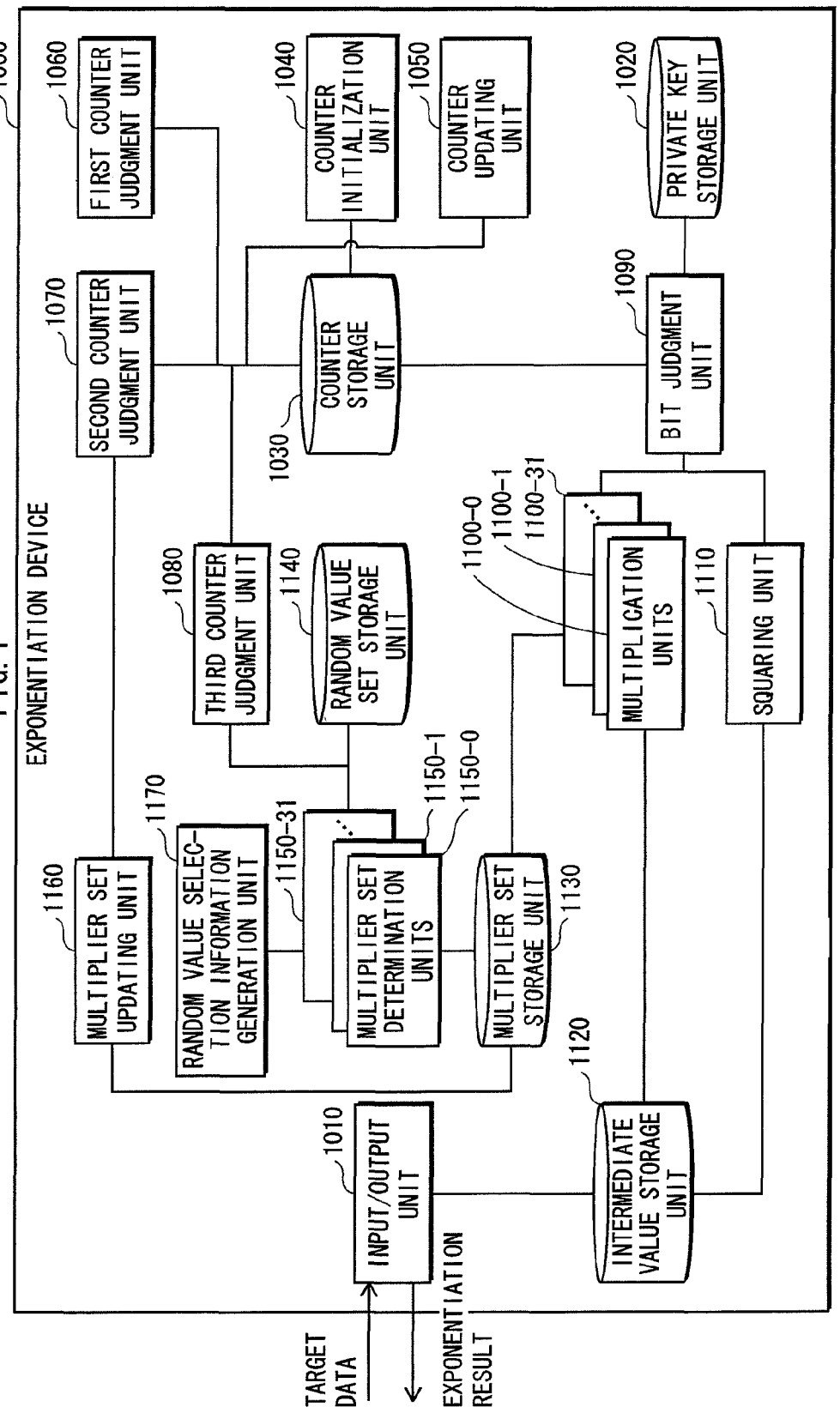
FIG. 1 is a block diagram showing the structure of an exponentiation device 1000.

1000, 2000, and 3000: exponentiation device
1010, 2010, and 3010: input/output unit
1020, 2020, and 3020: private key storage unit
1030, 2030, and 3030: counter storage unit
1040, 2040, and 3040: counter initialization unit
1050, 2050, and 3050: counter updating unit
1060, 2060, and 3060: first counter judgment unit
1070, 2070, and 3070: second counter judgment unit
1080, 2080, and 3080: third counter judgment unit
1090 and 2090: bit judgment unit
1100, 2100, and 3100: multiplication unit
1110, 2110, and 3110: squaring unit
1120, 2120, and 3120: intermediate value storage unit
1130, 2130, and 3130: multiplier set storage unit
1140, 2140, and 3140: random value set storage unit
1150, 2150, and 3150: multiplier set determination unit
1160, 2160, and 3160: multiplier set updating unit
1170: random value selection information generation unit
2180 and 3180: random value seed storage unit
2190 and 3190: random value set determination unit
3090: multiplier selection unit

DETAILED DESCRIPTION OF THE INVENTION

One aspect of the present invention is an information security device that securely and reliably processes predetermined information by performing a power operation d&X over a group defined by a predetermined set and a basic operation that uses elements of the predetermined set, the power operation d&X being the basic operation repeatedly performed d times using an element X, the information security device comprising: an acquisition unit operable to acquire a value d; and a main operation unit operable to perform the power operation d&X by performing a window operation and a carry operation based on a window method for each of windows of the value d, the window operation being performed using the element X and a window value of a corresponding one of the windows, wherein with respect to a first window included in the windows, the main operation unit uses a random value R to perform the window operation, and with respect to a second window included in the windows, the main operation unit uses a cancellation value S to perform the window operation, the cancellation value S being for canceling a cumulative factor that is a result of the carry operations performed using the random value R with respect to windows from the first window to the second window.

With this structure, in the process of performing a power operation d&X using target data X based on the window method, the information security device cancels the influence of the carry operation performed using the acquired random value with respect to the first window, by performing the window operation using the cancellation value S with respect to the second window. Accordingly, unlike the conventional information security devices, the information security device does not need to perform cancellation processing of calculating a value to be used for canceling the influence of the random value R after the window operations with respect to all the windows have been performed. Therefore, it is possible to reduce the whole period necessary for performing power operations compared with the conventional information security devices.

Here, the information security device may further comprise a processing unit operable to decrypt the information or add a digital signature to the information, with use of a result of the power operation d&X.

With this structure, the information security device decrypts information or adds a digital signature to the information, with use of a result of a power operation d&X. Therefore, it is possible to reduce a period necessary for performing such processing compared with conventional information security devices.

Here, the second window may be ahead of the first window by a value v, the cancellation value S may be an inverse of a power operation $(2^\wedge v)$&R performed using a result of a power operation $(2^\wedge v)$ and the random value R, the main operation unit may include: an acquisition subunit operable to acquire the random value R and the cancellation value S; a variable storage subunit operable to store therein a variable Z; an initialization subunit operable to assign a unit element to the variable Z, as an initial value; a carry operation subunit operable to perform the carry operation to carry the variable Z by a window width, and assign a result of the carry operation to the variable Z; a window operation subunit operable to acquire a result of a power operation w&X performed using the element X and a window value w of a window that is being an operation target, perform the window operation using at least the acquired result of the power operation w&X and the variable Z, and assign a result of the window operation to the variable Z; and a control subunit operable to control the carry operation subunit and the window operation subunit respectively to perform the carry operations and the window operations with respect to all the windows, and with respect to the first window, the window operation subunit may perform the window operation using a result of the power operation w&X, the random value R, and the variable Z, and assign a result of the window operation to the variable Z, and with respect to the second window, the window operation subunit may perform the window operation using a result of the power operation w&X, the cancellation value S, and the variable Z, and assign a result of the window operation to the variable Z.

With this structure, the information security device can certainly cancel a cumulative factor that is a result of carry operations performed using the random value R, with use of a cancellation value S that is an inverse of a power operation $(2^\wedge v)$&R, for the following reason. From when the random value R is acquired with respect to the first window to when the carry operation is performed with respect to the second window, the intermediate value Z is carried by the value v. As a result, at the time when the window operation is performed with respect to the second window, a result of the carry operation performed using the random value R is $(2^\wedge v)$&R. Therefore, the information security device can cancel the value $(2^\wedge)$&R by performing the window operation using the cancellation value S with respect to the second window.

Here, with respect to a window-group that includes i consecutive windows starting with the first window (i is less than v), the window operation subunit may perform, for each of the windows included in the window-group, the window operation using a result of the power operation w&X, the random value R, and the variable Z, and with respect to a window-group that includes i consecutive windows starting with the second window, the window operation subunit may perform, for each of the windows included in the window-group, the window operation using a result of the power operation w&X, the cancellation value S, and the variable Z.

With this structure, the information security device performs the window operation using the random value R with respect to each of the i consecutive windows starting with the first window, and performs the window operation using the cancellation value S with respect to each of the i consecutive windows starting with the second window. This can makes analysis of the value d difficult. Also, windows that are respectively ahead of the i consecutive windows starting with the first window by the value v are included in the i consecutive windows starting with the second window. Therefore, it is possible to certainly cancel an influence of the carry operations performed using the random value R acquired with respect to each of the i consecutive windows, by performing the window operation with respect to a window ahead of each of the i consecutive windows by the value d.

Here, a number of bits included in each of all the windows of the value d may be u (u is an integer no less than 1), a number of the windows of the value d may be lend/u, the value lend may be a least exponent of 2 that is no less than a bit length of the value d, the value v may satisfy lend=2v, the first window may be a window located at a head of all the windows of the value d, and the second window may be a lend/2u+1-th window counting from the first window, lend/2u windows starting with the first window may be divided into a first to a p-th window-groups for each i consecutive windows, and lend/2u windows starting with the second window and ending with a window located at an end of all the windows of the value d may be divided into a p+1-th to an m-th window-groups for each i consecutive windows, with respect to the first to the p-th window-groups, when the operation target is shifted from one window-group to a subsequent window-group, the acquisition subunit may acquire a random value different from a random value that has been used with respect to the one window-group, with respect to each of the first to the p-th window-groups, the window operation subunit may acquire, for each of the windows included in the window-group, a result of the window operation performed using a random value acquired by the acquisition subunit, with respect to an m'-th window-group included in the p+1-th to the m-th window-groups, the acquisition subunit may acquire a cancellation value corresponding to a random value that has been used with respect to an (m'−p)-th window-group, and with respect to the m'-th window-group, the window operation subunit may acquire a result of the window operation performed using the corresponding cancellation value acquired by the acquisition subunit.

With this structure, the information security device associates the first to the p-th groups respectively with groups that are ahead of the first to the p-th groups by p groups. Accordingly, with respect to each of the first to the p-th groups, the information security device can certainly cancel a result of the carry operation performed by the carry operation unit using the random value acquired as a result of the window operation performed by the window operation unit, by using a cancellation value corresponding to the random value with respect to a group ahead of each of the first to the p-th groups by the p groups.

Here, the acquisition subunit may store beforehand therein p random values and cancellation values in one-to-one correspondence, the p random values being different from each other, with respect to each of the first to the p-th window-groups, the acquisition subunit may acquire a random value to be used, by selecting one among one or more random values that have not yet been selected at a time of shift of the operation target to each of the first to the p-th window-groups, and with respect to the m'-th window-group, the acquisition subunit may acquire the cancellation value to be used, by selecting the cancellation value corresponding to the random value that has been used with respect to the (m'−p)-th window-group.

With this structure, the information security device beforehand stores therein p random values and cancellation values in one-to-one correspondence. The p random values are different from each other. Accordingly, the information security device does not need to generate a random value or a cancellation value each time a group that is an operation target is shift. This can reduce a period necessary for calculating a power operation d&X.

Here, the acquisition subunit may acquire the different random value, by performing an exponentiation $R\hat{}q$ using a predetermined value q and a random value R that is being stored therein at the time of shift of the operation target, and newly storing therein a result of the exponentiation $R\hat{}q$ as the random value R, and the acquisition subunit may acquire the cancellation value, by performing an exponentiation $S\hat{}q$ using the predetermined value q and a cancellation value S that is being stored therein at the time of shift of the operation target, and newly storing therein a result of the exponentiation $S\hat{}q$ as the cancellation value S.

With this structure, by using a random value or a cancellation value stored therein, the information security device can easily generate a different random value and a cancellation value corresponding to the random value.

Here, the acquisition subunit may store therein beforehand a first seed value U and a second seed value V that is a cancellation value for cancelling a result of a power operation $(2\hat{}v)\&U$ performed using the value v and the first seed value U, and with respect to the first window-group, before performing the window operations and the carry operations, the acquisition subunit may generate a random value r, and (i) perform an exponentiation using the random value r and the first seed value U, and store therein a result of the exponentiation as a random value R, and (ii) perform an exponentiation using the random value r and the second seed value V, and store therein a result of the exponentiation as a cancellation value S.

With this structure, the information security device can save a storage capacity by storing therein beforehand the first seed value and the second seed value. Also, before performing the window operations and the carry operations with respect to the first group, the information security device generates a random value r, and generates a random value R and a cancellation value S using the generated random value r and the first and the second seed values respectively. Accordingly, the information security device can change, for each of a plurality of pieces of target data, a random value and a cancellation value corresponding to the random value that are to be used for operations with respect to the first group. Therefore, even if an analyzer attempts to analyze the value d based on power waveforms of a plurality of pieces of target data, it is difficult to analyze the value d. This is because random values to be used by the main operation unit differ for each of the pieces of target data, and accordingly the waveforms of the pieces of target data differ from each other.

Here, each of all the window-groups may include one window.

With this structure, the information security device performs an operation using a random value different for each window. In other words, power waveforms differ for each window. This makes it difficult to analyze the value d.

Here, each of all the windows of the value d may have one bit.

With this structure, in a case where the information security device uses the binary method in which a private key is divided for each one bit to perform the power operation d&X, the information security device also does not need to perform cancellation processing for canceling the influence of the random value R. That is, if using the binary method, the information security device can also reduce a period necessary for performing the power operation d&X compared with conventional information security devices.

Here, with respect to a third window that is between the first window and the second window, the acquisition subunit may further acquire a random value R' different from the random value R, the acquisition subunit may further acquire a cancellation value S' for canceling a cumulative factor that is a result of the carry operations performed using the random value R' with respect to windows from the third window to the second window, and store therein the acquired cancellation value S' together with the cancellation value S, with respect to the third window, the window operation subunit may perform the window operation using a result of the power operation w&X, the random value R', and the variable Z, and assign a result of the window operation to the variable Z, and with respect to the second window, the window operation subunit may further acquire a result of the window operation performed using the cancellation value S'.

With this structure, the information security device acquires a random value R' different from the random value R, which is to be used for the window operation performed by the window operation unit with respect to the third window. This makes it more difficult to analyze the value d. Also, the information security device cancels a result of the carry operation using the random values R and R' with respect to the second window. This can reduce a period necessary for performing the power operation d&X compared with conventional information security devices.

Here, the acquisition subunit may store therein the cancellation values S and S' by storing therein beforehand a value T that is a result of a basic operation performed using the cancellation values S and S', and with respect to the second window, the acquisition subunit may acquire the cancellation values S and S' by acquiring the value T.

With this structure, the information security device stores therein beforehand a value T that is a result of a basic operation performed using the cancellation values S and S'. Accordingly, when performing the power operation d&X, the information security device does not need to calculate the cancellation values S and S'. This can reduce a period necessary for performing the power operation d&X.

Here, the acquisition subunit may store therein beforehand the cancellation values S and S', and the acquisition subunit may acquire the cancellation values S and S' by performing a basic operation using the cancellation values S and S' to acquire a value T.

With this structure, the information security device stores therein beforehand the cancellation values S and S'. Accordingly, when performing the power operation d&X, the information security device does not need to calculate the cancellation values S and S'. This can reduce a period necessary for performing the power operation d&X.

1. First Embodiment

The following describes an exponentiation device 1000 according to a first embodiment of the present invention with reference to the drawings.

1.1 Preparation

The exponentiation device 1000 is used, for example, for performing decryption in accordance with the RSA encryption scheme and generating a signature in accordance with the RSA signature scheme. The following describes the RSA encryption scheme and the RSA signature scheme.

(1) RSA Encryption Scheme (1-1) Generation of Key

A public key and a private key are calculated in the following way.

(Step 1-1)

Randomly select large primes p and q, and calculate their product n=p×q.

(Step 1-2)

Calculate the least common multiple of (p−1) and (q−1), that is, L=LCM(p−1,q−1).

(Step 1-3)

Randomly select a natural number e that is relatively prime to L and less than L.

$$1 \leq e \leq L-1, \text{ and } GCD(e,L)=1$$

Here, GCD(e,L) denotes the greatest common divisor of e and L.

(Step 1-4)

Calculate d such that e×d=1 mod L.

Since GCD(e,L)=1, d that satisfies e×d=1 mod L is certainly obtained. A pair of the integers e and n obtained in the above process is a public key. Also, the integer d is a private key. Here, "x mod y" denotes a remainder of x divided by y.

(1-2) Generation of Ciphertext

A ciphertext c is calculated by performing encryption operation on a plaintext m using the pair of the integers e and n that is a public key.

$$c = m^e \bmod n$$

Note that, in the present Specification, the operator "^" denotes exponentiation. For example, "A^x" denotes A raised to the x-th power when x>0.

(1-3) Generation of Decrypted Text

A decrypted text m' is calculated by performing decryption operation on the ciphertext c using the integer d that is a private key.

$$m' = c^d \bmod n$$

The following expressions are satisfied.

$$m' = c^d \bmod n$$
$$= (m^e)^d \bmod n$$
$$= m^{(e \times d \bmod L)} \bmod n$$
$$= m^1 \bmod n$$
$$= m \bmod n$$

Accordingly, the decrypted text m' matches the plaintext m.

The exponentiation device 1000 is used for calculating the decrypted text m' using the ciphertext c in the above process of generating the decrypted text. Specifically, the exponentiation device 1000 calculates m'=c^d mod n for c as target data using the private key d.

Note that the RSA encryption is described in detail in pages 110 to 113 of the Non-Patent Document 3.

(2) RSA Signature Scheme (2-1) Generation of Key

A method of generating a key in accordance with the RSA signature scheme is the same as that of the RSA encryption scheme.

(2-2) Generation of Signature

Signature data S for message data D is calculated in the following way.

Firstly, a hash function Hash is used for calculating a hash value of message data D, that is, h=Hash(D).

Next, signature data S is calculated by raising the hash value h to the d-th power using an integer d that is a private key.

$$S = h^d \bmod n$$

(2-3) Verification of Signature

It is verified whether the signature data S is a correct signature of the message data D in the following way.

It is checked whether Hash(D) is equal to S^e mod n. When Hash(D) is equal to S^e mod n, the signature data S is judged to be a correct signature, and is accordingly accepted. When Hash(D) is not equal to S^e mod n, the signature data S is judged not to be a correct signature, and is accordingly rejected.

The exponentiation device 1000 is used for calculating the signature data S using the hash value h in the above process of generating a signature. Specifically, the exponentiation device 1000 calculates S=h^d mod n for h as target data using the private key d.

Note that the RSA signature is described in detail in pages 175 to 176 of the Non-Patent Document 3.

1.2 Structure of Exponentiation Device 1000

FIG. 1 shows the structure of the exponentiation device 1000.

The exponentiation device 1000 inputs target data X that is target data of exponentiation, and outputs a result of exponentiation (X^d) using a private key d as an exponent for the target data X.

As shown in FIG. 1, the exponentiation device 1000 includes an input/output unit 1010, a private key storage unit 1020, a counter storage unit 1030, a counter initialization unit 1040, a counter updating unit 1050, a first counter judgment unit 1060, a second counter judgment unit 1070, a third counter judgment unit 1080, a bit judgment unit 1090, multiplication units 1100-0 to 1100-31, a squaring unit 1110, an intermediate value storage unit 1120, a multiplier set storage unit 1130, a random value set storage unit 1140, multiplier set determination units 1150-0 to 1150-31, a multiplier set updating unit 1160, and a random value selection information generation unit 1170.

Note that, in the following descriptions, "x_y" denotes that "y" is written as a subscript index to the right of "x".

(1) Intermediate Value Storage Unit 1120

The intermediate value storage unit 1120 includes a region for storing target data X and an intermediate value Z to be used for performing exponentiation.

(2) Input/Output Unit 1010

Upon receiving target data X from outside, the input/output unit 1010 stores the received target data X in the intermediate value storage unit 1120.

The input/output unit 1010 assigns a value "1" to the intermediate value Z as an initial value, and stores the intermediate value Z in the intermediate value storage unit 1120.

When exponentiation of the target data X completes, the input/output unit 1010 receives a notification indicating that the exponentiation completes from the first counter judgment unit 1060. Then, the input/output unit 1010 outputs, as a result of the exponentiation, the intermediate value Z stored in the intermediate value storage unit 1120.

(3) Private Key Storage Unit 1020

The private key storage unit 1020 stores therein a private key d.

Note that the private key d is an integer of 512 bits.

(4) Multiplier Set Storage Unit 1130

The multiplier set storage unit 1130 stores therein multiplier sets MT_0 to MT_31 that are to be used respectively by the multiplication units 1100-0 to 1100-31.

Figure 2:
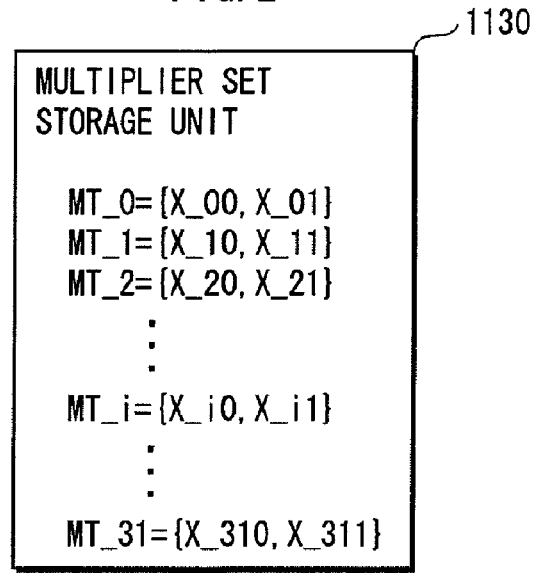
FIG. 2 shows a multiplier set stored in a multiplier set storage unit 1130.

Specifically, as shown in FIG. 2, the multiplier set storage unit 1130 stores therein a multiplier set MT_i including multipliers X_i0 and X_i1. Here, the value i is an integer between 0 and 31 inclusive.

(5) Random Value Set Storage Unit 1140

The random value set storage unit 1140 stores therein random value sets RT_0 to RT_15.

Figure 3:
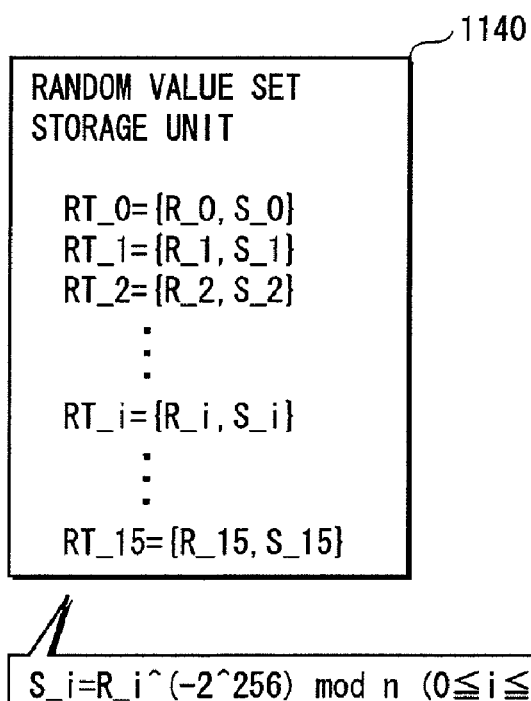
FIG. 3 shows a random value set stored in a random value set storage unit 1140.

Specifically, as shown in FIG. 3, the random value set storage unit 1140 stores therein a random value set RT_i including a random value R_i and a cancellation value S_i. Here, the value i is an integer between 0 and 15 inclusive.

Also, the random value R_i and the cancellation value S_i satisfy the following expression.

$$S\_i = R\_i^{(-2^{256})} \bmod n$$

That is, $R\_i^{(2^{256})} \times S\_i = 1$ is satisfied. Here, the value n is a product of large primes p and q to be used for performing the RSA encryption scheme.

(6) Counter Storage Unit 1030

The counter storage unit 1030 stores therein a counter "count" to be used for performing exponentiation.

(7) Counter Initialization Unit 1040

When exponentiation processing is started, the counter initialization unit 1040 assigns an initial value (lend−1) to the counter "count".

Here, lend denotes the bit size of the private key d. In the first embodiment, lend=512. Note that although lend denotes the bit size itself of the private key d here, lend may denote the number of bits that can be input as the private key d. The bit size of the private key d is determined to be 512 bits here, for example. Alternatively, the bit size of the private key d actually may be for example 510 bits, which is the number of bits that is less than 512. In this case, the number of bits that can be input as the private key d is lend=512. That is, lend only have to be an exponent of 2 and no less than the bit size of the private key d. For example, lend is the least exponent of 2 and no less than the bit size of the private key d. Alternatively, lend may be a multiple of 2 and no less than the bit size of the private key d. For example, lend is the least multiple of 2 and no less than the bit size of the private key d.

(8) Counter Updating Unit 1050

The counter updating unit 1050 updates a counter "count" stored in the counter storage unit 1030.

Specifically, upon receiving an update instruction to update the counter "count" from any of the second counter judgment unit 1070, the third counter judgment unit 1080, and the multiplier set determination units 1150-0 to 1150-31, the counter updating unit 1050 decrements the counter "count" stored in the counter storage unit 1030 (by 1), and newly stores a result of the decrement in the counter storage unit 1030 as the counter "count".

(9) First Counter Judgment Unit 1060

The first counter judgment unit 1060 judges whether the counter "count" stored in the counter storage unit 1030 is 0.

If judging the counter "count" to be 0, the first counter judgment unit 1060 notifies the input/output unit 1010 that calculation completes.

If judging the counter "count" not to be 0, the first counter judgment unit 1060 instructs the third counter judgment unit 1080 to make a judgment.

(10) Third Counter Judgment Unit 1080

Upon receiving an instruction to make a judgment from the first counter judgment unit 1060, the third counter judgment unit 1080 judges whether the counter "count" stored in the counter storage unit 1030 is divisible by 16, that is, whether the counter "count" is a multiple of 16.

If judging the counter "count" to be divisible by 16, the third counter judgment unit 1080 instructs the counter updating unit 1050 to update the counter.

If judging the counter "count" not to be divisible by 16, the third counter judgment unit 1080 instructs the second counter judgment unit 1070 to make a judgment.

(11) Second Counter Judgment Unit 1070

Upon receiving an instruction to make a judgment from the third counter judgment unit 1080, the second counter judgment unit 1070 judges whether the counter "count" stored in the counter storage unit 1030 is divisible by 8, that is, whether the counter "count" is a multiple of 8.

If judging the counter "count" to be divisible by 8, the second counter judgment unit 1070 instructs the multiplier set updating unit 1160 to update a multiplier set MT_i stored in the multiplier set storage unit 1130. Here, the value i is the largest integer no more than (lend−count−1)/16.

If judging the counter "count" not to be divisible by 8, the second counter judgment unit 1070 instructs the counter updating unit 1050 to update the counter "count".

(12) Bit Judgment Unit 1090

The bit judgment unit 1090 judges whether the count-th bit of the private key d stored in the private key storage unit 1020 is 0 or 1 using the counter "count" stored in the counter storage unit 1030.

Here, the count-th bit of the private key d represents the order counting from the lowest bit of the private key d. Note that the lowest bit is the zero-th bit.

(13) Multiplication Units 1100-0 to 1100-31

The multiplication units 1100-0 to 1100-31 perform the same operations. Accordingly, a multiplication unit 1100-*i* is described here. The value i is an integer between 0 and 31 inclusive.

The multiplication unit 1100-*i* multiplies the intermediate value Z stored in the intermediate value storage unit 1120 by the multiplier X_i0 or the multiplier X_i1 included in the multiplier set MT_i stored in the multiplier set storage unit 1130, and stores a result of the multiplication in the intermediate value storage unit 1120.

Specifically, if the bit judgment unit 1090 judges the count-th bit to be 0, the multiplication unit 1100-*i* multiplies the intermediate value Z by the multiplier X_i0. Also, if the bit judgment unit 1090 judges the count-th bit to be 1, the multiplication unit 1100-*i* multiplies the intermediate value Z by the multiplier X_i1.

Here, the multiplication unit 1100-*i* multiplies the intermediate value Z by the multiplier X_i0 by calculating Z←Z× X_i0 mod n. Also, the multiplication unit 1100-*i* multiplies the intermediate value Z by the multiplier X_i1 by calculating $Z \leftarrow Z \times X\_i1 \mod n$. Here, the symbol "←" denotes that a result of calculation in the right is assigned to the variable in the left.

(14) Squaring Unit 1110

The squaring unit 1110 squares the intermediate value Z stored in the intermediate value storage unit 1120, and stores a result of the square in the intermediate value storage unit 1120.

Specifically, the squaring unit 1110 executes $Z \leftarrow Z^2 \mod n$.

(15) Random Value Selection Information Generation Unit 1170

The random value selection information generation unit 1170 generates random value selection information that is information for selecting a random value or a cancellation value to be used by the multiplier set determination units 1150-1 to 1150-32.

The random value selection information generation unit 1170 temporarily stores therein the generated random value selection information.

Specifically, the random value selection information generation unit 1170 generates an array in which values each given as a subscript "k" included in a random value R_k or a cancellation value S_k are arranged in order. Here, this array includes 32 elements, which are generated by repeating twice 16 elements each having a different value among values between 0 and 15 inclusive.

For example, the random value selection information generation unit 1170 generates an array RSI (={14, 12, 11, 2, 4, 8, 9, 0, 1, 6, 10, 7, 13, 3, 15, 5, 14, 12, 11, 2, 4, 8, 9, 0, 1, 6, 10, 7, 13, 3, 15, 5}). Here, the array RSI starts with the zero-th element, and the i-th element is denoted as RSI_i. In this example, the zero-th element (RSI_0) has a value 14. Also, it is necessary to generate the array RSI whose elements are randomly arranged.

Figure 4:
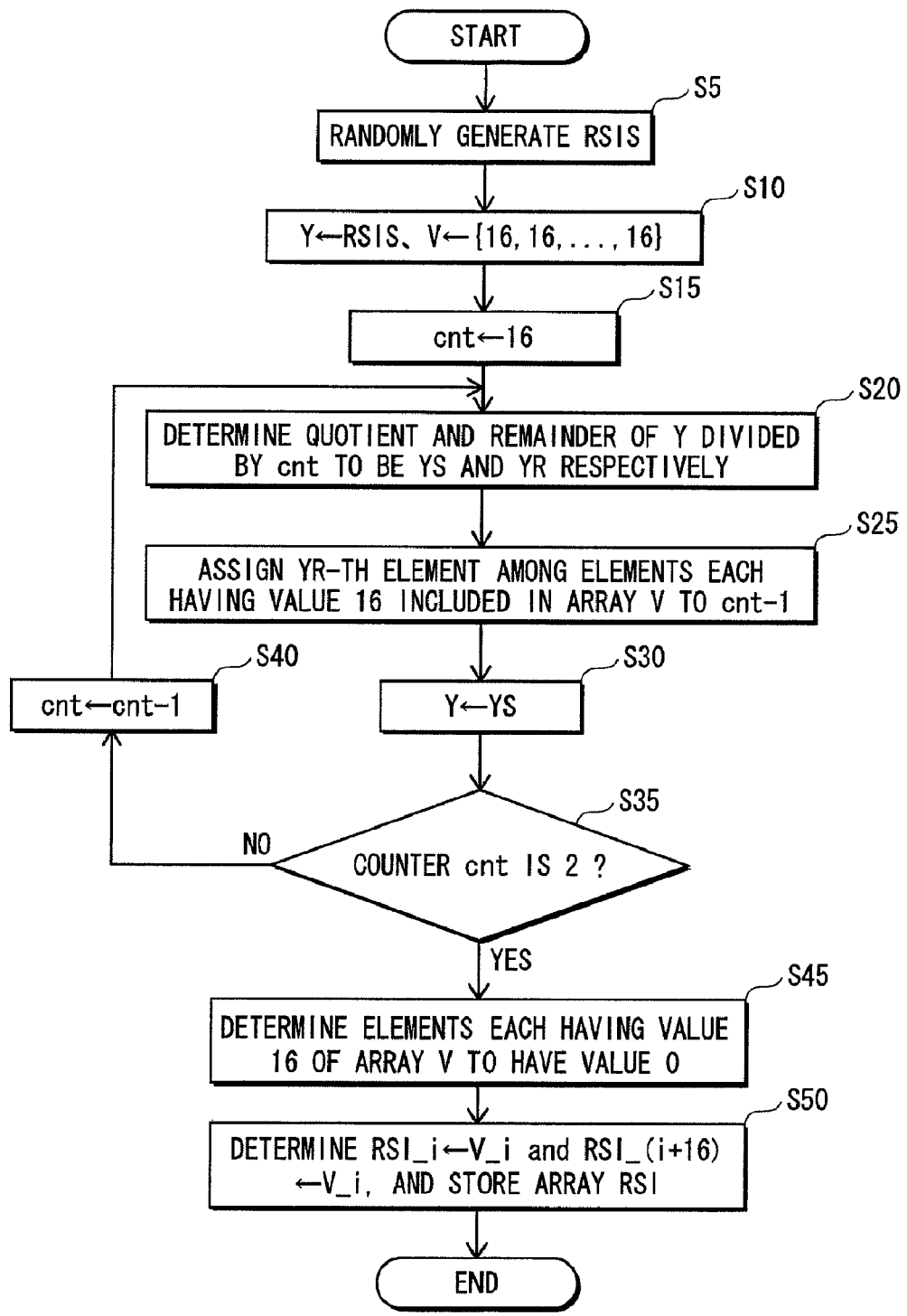
FIG. 4 is a flow chart showing operations of generating an array RSI performed by a random value selection information generation unit 1170.

Here, an example of a method of generating the array RSI whose elements are randomly arranged is described with reference to a flow chart shown in FIG. 4.

The random value selection information generation unit 1170 randomly generates one value RSIS among values between 0 and 16!−1 (=20, 922, 789, 887, 999) inclusive (Step S5).

The random value selection information generation unit 1170 assigns the generated RSIS to Y (Y←RSIS), and generates an array V (V←{16, 16, ..., 16}), which is constituted by 16 elements each being a value 16 (Step S10). Here, the array V starts with the zero-th element, and the i-th element is denoted as V_i.

The random value selection information generation unit 1170 assigns a value 16 to the counter cnt (Step S15).

The random value selection information generation unit 1170 divides Y by cnt to obtain a quotient YS and a remainder YR (Step S20).

The random value selection information generation unit 1170 assigns the YR-th element among the elements each having a value 16 included in the array V to cnt−1 (Step S25).

The random value selection information generation unit 1170 assigns the quotient YS obtained in Step S20 to Y (Step S30). That is, the random value selection information generation unit 1170 executes Y←YS.

The random value selection information generation unit 1170 judges whether cnt is 2 (Step S35).

If judging cnt not to be 2 ("NO" in Step S35), the random value selection information generation unit 1170 decrements the counter cnt (by 1), and newly assigns a result of the decrement to the counter cnt (Step S40), and the flow returns to Step S20. That is, the random value selection information generation unit 1170 executes cnt←cnt−1.

If judging cnt to be 2 ("YES" in Step S35), the random value selection information generation unit 1170 assigns a value 0 to the elements each having a value 16 included in the array V (Step S45).

The random value selection information generation unit 1170 assigns V_i to be RSI_i and RSI_(i+16) (RSI_i←V_i, RSI_(i+16)←V_i) to values that are each an integer i between 0 and 15 inclusive, and temporarily stores therein an array RSI (={RSI_0, RSI_1, ..., RSI_31}) (Step S50).

According to the above method, the random value selection information generation unit 1170 randomly generates one value RSIS among values between 0 and 16!−1 inclusive, and converts the value RSIS into T_i such that the following expression is satisfied. T_i denotes the value YR that is obtained in Step S20 in a case where cnt is i.

$$RSIS = (16 \times 15 \times \ldots \times 3) \times T\_2 + \ldots + 16 \times 15 \times T\_14 + 16 \times T\_15 + T\_16$$

Here, T_i is an integer between 0 and i−1 inclusive, the value i is an integer between 0 and 15 inclusive.

This conversion is one-to-one correspondence conversion. Furthermore, by using T_i, 15 elements among 16 elements each having a value 16 are converted to each have a different value among values 1 to 15, and a remaining one element having a value 16 is converted to have a value 0. In this way, an array including 16 random elements is generated. Random value selection information can be generated by arranging this array twice.

It may be possible to use any method of generating such an array that includes randomly arranged elements, in addition to the above method. However, it is desirable to use the above method of generating an array in which elements have 16! value variations, for maintaining the security.

(16) Multiplier Set Determination Units 1150-0 to 1150-31

The multiplier set determination units 1150-0 to 1150-31 perform the same operations. Accordingly, a multiplier set determination unit **1150-*i*** is described here. Here, the value i is an integer between 0 and 31 inclusive.

The multiplier set determination unit **1150-*i* initializes the multiplier set MT_i stored in the multiplier set storage unit 1130**.

Specifically, if the counter "count" is no less than 256, the multiplier set determination unit **1150-*i* calculates X_i0 and X_i1 for target data X using a random value R_(RSI_i) included in a random value set RT_(RSI_i) stored in the random value set storage unit 1140, in accordance with the i-th element RSI_i included in the array RSI generated by the random value selection information generation unit 1170**.

If the counter "count" is less than 256, the multiplier set determination unit **1150-*i*** calculates X_i0 and X_i1 using a cancellation value S_(RSI_i).

Note that the multiplier set determination unit **1150-*i*** calculates X_i0 and X_i1 respectively by executing $X\_i0 \leftarrow RS \mod n$ and $X\_i1 \leftarrow X \times X\_i0 \mod n$. Here, RS is R_(RSI_i) or S_(RSI_i).

(17) Multiplier Set Updating Unit 1160

Upon receiving an instruction to update the multiplier set MT_i from the second counter judgment unit 1070, the multiplier set updating unit 1160 updates the multipliers Xi_0 and X_i1 included in the multiplier set MT_i stored in the multiplier set storage unit 1130. MT_i is a multiplier set determined by the multiplier set determination unit **1150-*i***.

Specifically, the multiplier set updating unit 1160 executes $X\_i0 \leftarrow (X\_i0)^2 \mod n$ and $X\_i1 \leftarrow X \times X\_i0 \mod n$.

1.3 Operations of Exponentiation Device 1000

(1) Whole Operations

Figure 5:
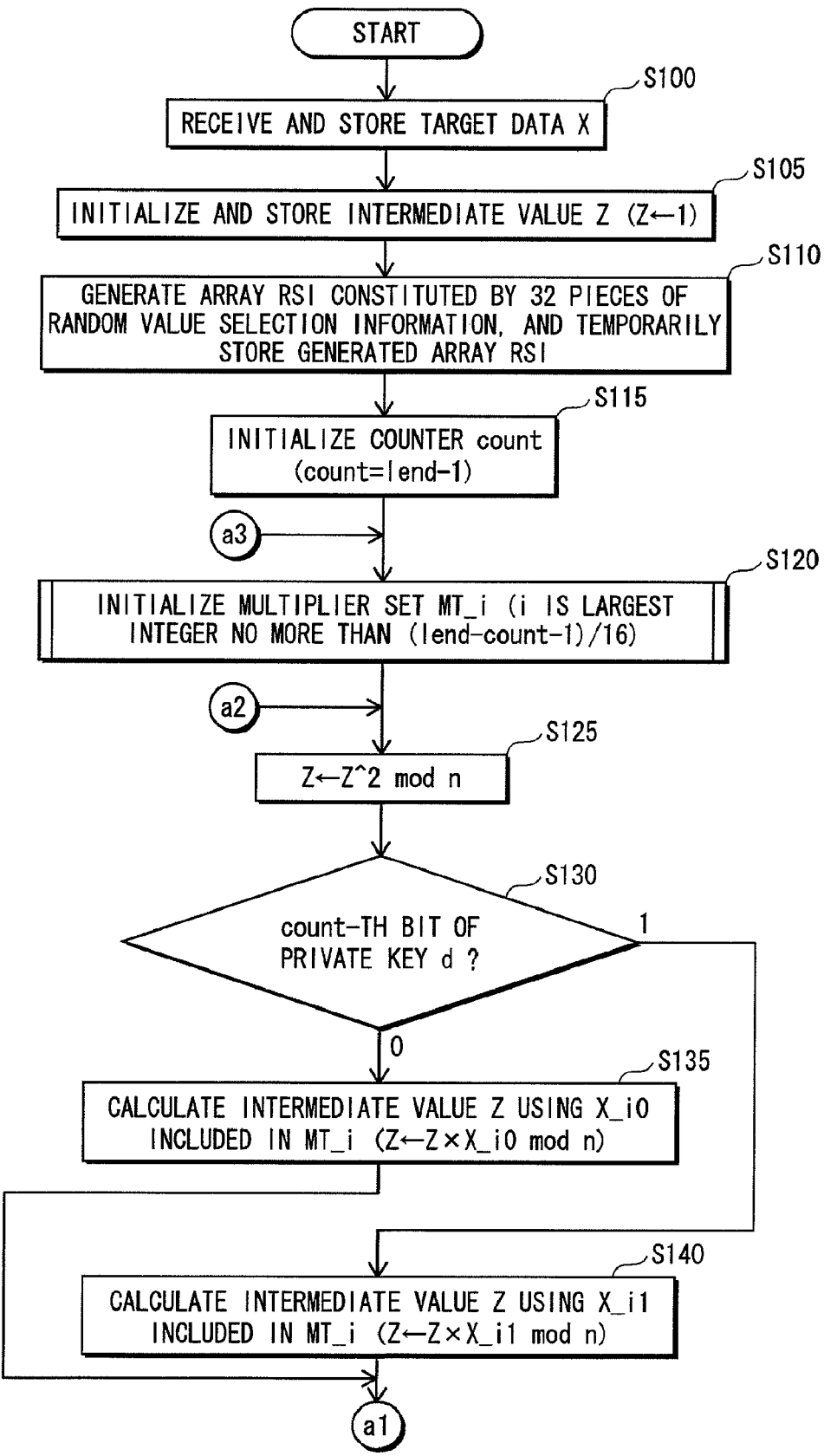
FIG. 5 is a flow chart showing operations of the exponentiation device 1000, continuing to FIG. 6.
Figure 6:
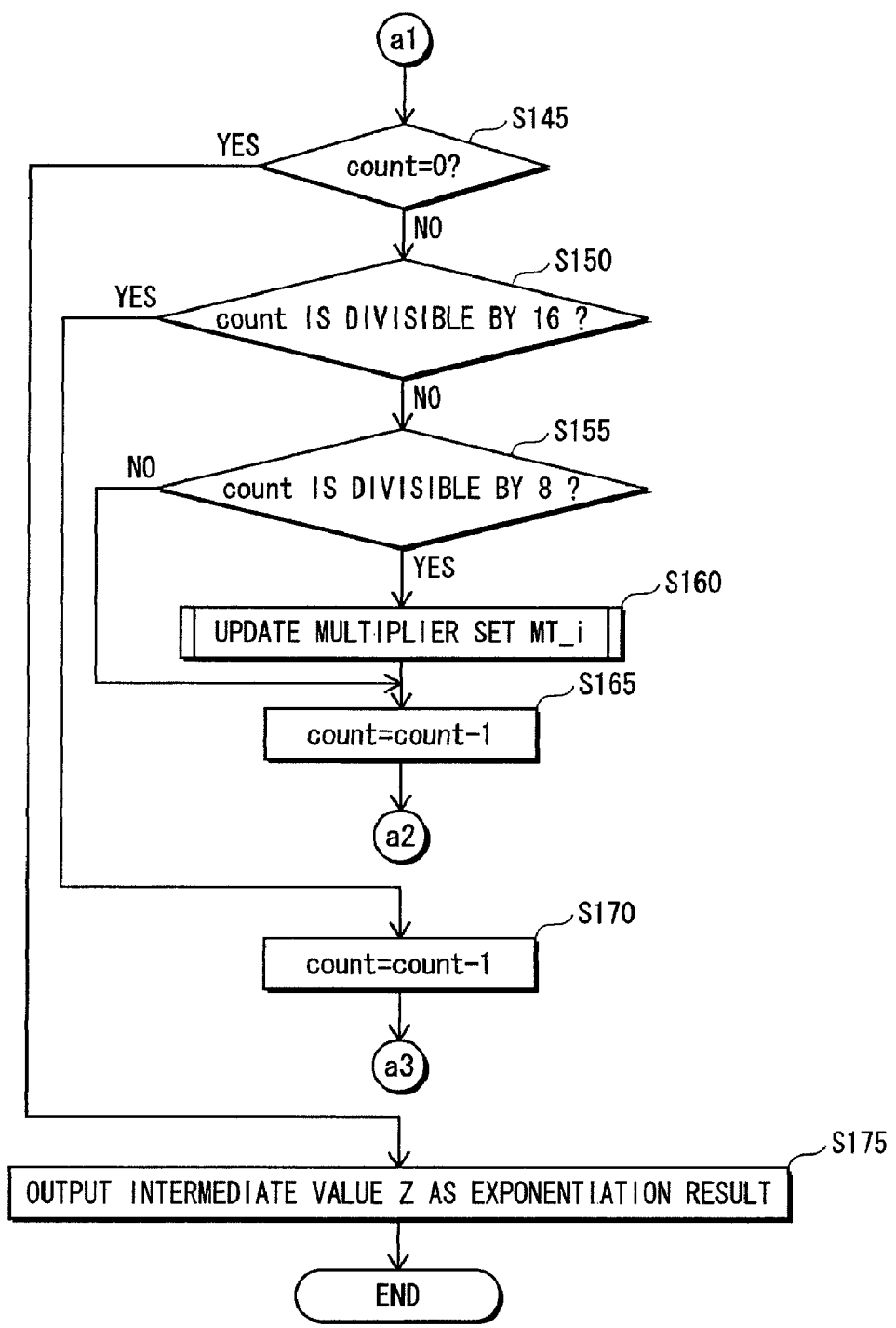
FIG. 6 is a flow chart showing the operations of the exponentiation device 1000, continuing from FIG. 5.

The following describes the operations of the exponentiation device 1000 with reference to flow charts shown in FIG. 5 and FIG. 6.

The input/output unit 1010 receives input of target data X, and stores the received target data X in the intermediate value storage unit 1120 (Step S100).

The input/output unit 1010 assigns a value 1 to a intermediate value Z, and stores the intermediate value Z in the intermediate value storage unit 1120 (Step S105).

The random value selection information generation unit 1170 generates an array RSI (={RSI_0, RSI_1, ..., RSI_31}) that is constituted by 32 pieces of random value selection information, and temporarily stores therein the generated array RSI (Step S110).

The counter initialization unit 1040 initializes the counter "count" (Step S115). Here, the counter initialization unit 1040 sets the counter "count" to be lend−1. Here, lend denotes the number of bits of the private key d.

The multiplier set determination unit 1150-$i$ initializes MT_i stored in the multiplier set storage unit 1130, that is, multipliers X_i0 and X_i1, with use of the target data X, random value selection information stored in the random value selection information generation unit 1170, and a random value set stored in the random value set storage unit 1140 (Step S120). Here, the value i is the largest integer no more than (lend−count−1)/16.

The squaring unit 1110 squares the intermediate value Z stored in the intermediate value storage unit 1120, and stores a result of the square as Z in the intermediate value storage unit 1120 (Step S125).

The bit judgment unit 1090 makes a judgment on bits of the private key d (Step S130). Specifically, the bit judgment unit 1090 judges whether the count-th bit of the private key d is 0 or 1.

If the count-th bit is judged to be 0 ("0" in Step S130), the multiplication unit 1100-$i$ multiplies the intermediate value Z stored in the intermediate value storage unit 1120 by the multiplier X_i0 included in the multiplier set MT_i stored in the multiplier set storage unit 1130. Then, the multiplication unit 1100-$i$ newly stores a result of the multiplication in the intermediate value storage unit 1120 as the intermediate value Z (Step S135). If the bit is judged to be 1 ("1" in Step S130), the multiplication unit 1100-$i$ multiplies the intermediate value Z stored in the intermediate value storage unit 1120 by the multiplier X_i1 stored in the multiplier set storage unit 1130, and newly stores a result of the multiplication in the intermediate value storage unit 1120 as the intermediate value Z (Step S140). Here, the value i is the largest integer no more than (lend−count−1)/16.

The first counter judgment unit 1060 judges whether the counter "count" stored in the counter storage unit 1030 is 0 (Step S145).

If the counter "count" is judged to be 0 ("YES" in Step S145), the input/output unit 1010 outputs the intermediate value Z stored in the intermediate value storage unit 1120, (as a result of exponentiation) (Step S175).

If the counter "count" is judged not to be 0 ("NO" in Step S145), the third counter judgment unit 1080 judges the counter "count" stored in the counter storage unit 1030 is divisible by 16, that is, whether the counter "count" is a multiple of 16 (Step S150).

If the counter "count" is judged to be divisible by 16 ("YES" in Step S150), the counter updating unit 1050 updates the counter "count" stored in the counter storage unit 1030 (Step S170). Specifically, the counter updating unit 1050 decrements the counter "count" stored in the counter storage unit 1030 (by 1), and newly stores a result of the decrement in the counter storage unit 1030 as the counter "count". Then, the flow returns to Step S120.

If the counter "count" is judged not to be divisible by 16 ("NO" in Step S150), the second counter judgment unit 1070 judges the counter "count" stored in the counter storage unit 1030 is divisible by 8, that is, whether the counter "count" is a multiple of 8 (Step S155).

If the counter "count" is judged to be divisible by 8 ("YES" in Step S155), the multiplier set updating unit 1160 updates the multiplier set MT_i stored in the multiplier set storage unit 1130 (Step S160). Here, the value i is the largest integer no more than (lend−count−1)/16.

The counter updating unit 1050 updates the counter "count" stored in the counter storage unit 1030 (Step S165). Specifically, the counter updating unit 1050 decrements the counter "count" stored in the counter storage unit 1030 (by 1), and newly stores a result of the decrement in the counter storage unit 1030 as the counter "count". Then, the flow returns to Step S125.

If the counter "count" is judged not to be divisible by 8 ("NO" in Step S155), the flow proceeds to Step S165, and returns to Step S125 after Step S165 completes.

(2) Initialization Processing of MT_i

Here, the processing of initializing the multiplier set MT_i performed in Step S120 of FIG. 5 is described with reference to a flow chart shown in FIG. 7.

The multiplier set determination unit 1150-$i$ judges whether the counter "count" is no less than 256 (Step S200). Here, the value i is the largest integer no more than (lend−count−1)/16.

If the counter "count" is judged to be no less than 256 ("YES" in Step S200), the multiplier set determination unit 1150-$i$ acquires the i-th element RSI_i from the array RSI, and acquires the random value R_(RSI_i) from the random value set RT_(RSI_i) based on the acquired RSI_i (Step S205).

The multiplier set determination unit 1150-$i$ assigns the acquired random value R_(RSI_i) to the multiplier X_i0 (Step S210). The multiplier set determination unit 1150-$i$ assigns a result of multiplication of the target data X by the multiplier X_i0 to the multiplier X_i1 (Step S215).

If the counter "count" is judged not to be no less than 256, that is, if the counter "count" is judged to be less than 256 ("NO" in Step S200), the multiplier set determination unit 1150-$i$ acquires the i-th RSI_i from the array RSI, and acquires the cancellation value S_(RSI_i) from the random value set RT_(RSI_i) based on the acquired RSI_i (Step S220).

The multiplier set determination unit 1150-$i$ assigns the acquired cancellation value S_(RSI_i) to the multiplier X_i0 (Step S225). The multiplier set determination unit 1150-$i$ assigns a result of multiplication of the target data X by the multiplier X_i0 to the multiplier X_i1 (Step S230).

(3) Update Processing of MT_i

Here, the processing of updating the multiplier set MT_i performed in Step S160 of FIG. 6 is described with reference to a flow chart shown in FIG. 8.

The multiplier set updating unit 1160 squares X_i0 included in MT_i stored in the multiplier set storage unit 1130, and newly assigns a result of the square to X_i0 (Step S300).

The multiplier set updating unit 1160 multiplies the target data X by X_i0, and assigns a result of the multiplication to X_i1 (Step S305).

Here, the value i is the largest integer no more than (lend−count−1)/16.

1.4 Effects of First Embodiment

In the first embodiment, the exponentiation device 1000 divides the bit sequence of the private key d into 32 blocks each having 16 bits, and allocates an index of a multiplier set for each of the blocks, as can been seen from Step S120 of FIG. 5 and Steps S150 and S170 of FIG. 6.

Furthermore, the exponentiation device 1000 divides each of the blocks having 16 bits into two subblocks each having eight bits, and allocates a different multiplier to each of the two subblocks using a multiplier set that have been allocated to the block.

Figure 9:
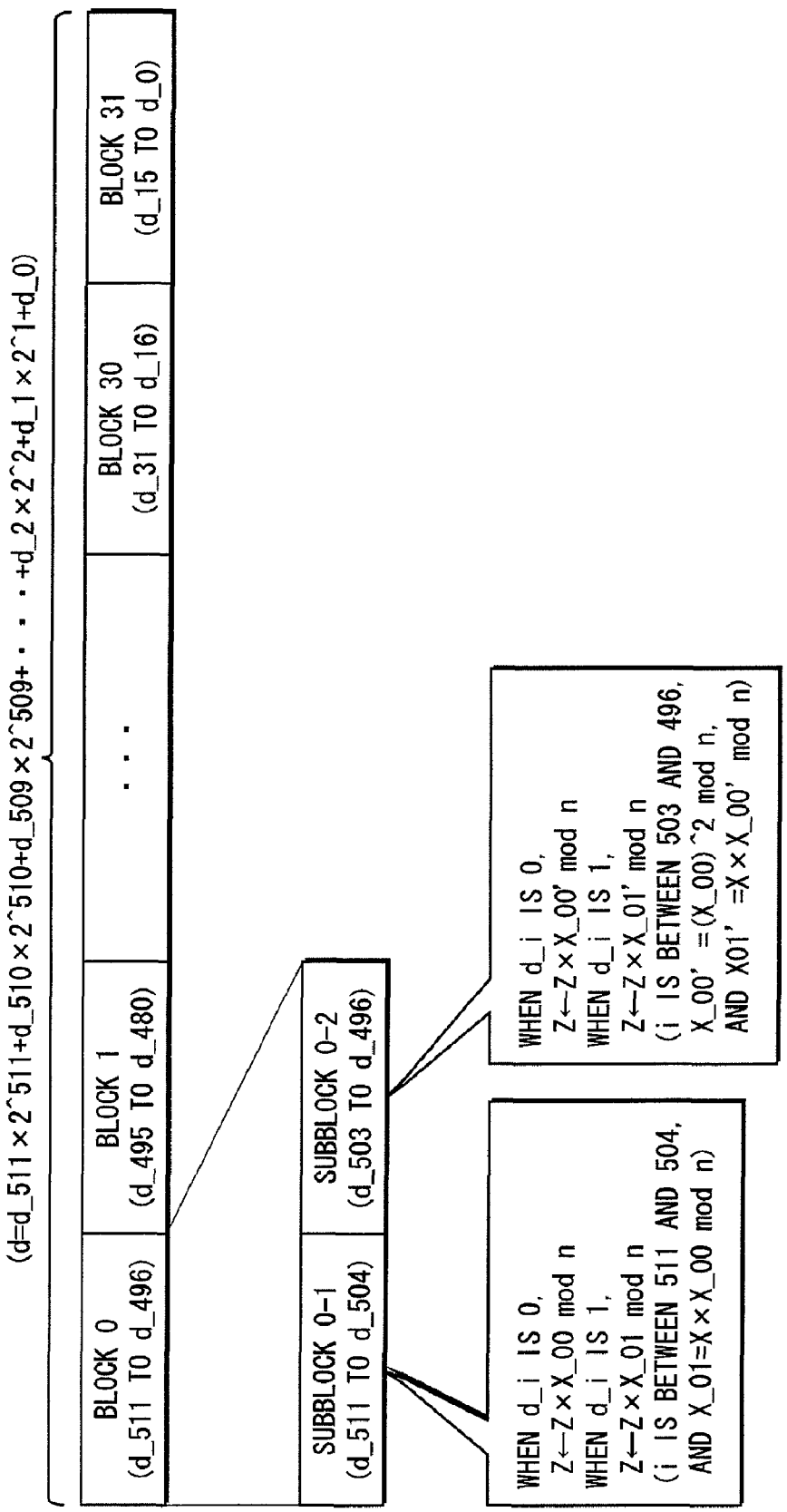
FIG. 9 shows a specific example in which a multiplier to be allocated is changed for each of subblocks constituting a private key.

For example, as shown in FIG. 9, the exponentiation device 1000 divides a bit sequence of the private key d having 512 bits into blocks including a block 0, a block 1, ..., a block 30, and a block 31. The exponentiation device 1000 further divides each of the blocks into two subblocks. Here, the multiplier set MT_i is allocated to a block i.

In FIG. 9, the block 0 is divided into a subblock 0-1 and a subblock 0-2.

With respect to the subblock 0-1, the exponentiation device 1000 uses $X\_00$ ($=R\_0$) or $X\_01$ ($=X \times X\_00$) that are included in MT_0 initialized in Step S120 of FIG. 5. Specifically, if a bit d_i included in the subblock 0-1 of the private key d is 0, the exponentiation device 1000 multiplies the intermediate value Z by $X\_00$. If the bit d_i of the private key d is 1, the exponentiation device 1000 multiplies the intermediate value Z by $X\_01$.

With respect to the subblock 0-2, the exponentiation device 1000 uses $X\_00'$ ($=(X\_00)^2 (=(R\_0)^2)$) or $X\_01'$ ($=X \times (X\_00)^2$) that are included in MT_0 updated in Step S160 of FIG. 6. Specifically, if a bit d_i included in the subblock 0-2 of the private key d is 0, the exponentiation device 1000 multiplies the intermediate value Z by $X\_00'$. If the bit d_i of the private key d is 1, the exponentiation device 1000 multiplies the intermediate value Z by $X\_01'$.

As described, in the first embodiment, the private key d is divided into subblocks each having eight bits, and the multiplier set updating unit 1160 updates (changes) a multiplier to be multiplied by the intermediate value Z using $X\_0$ or $X\_1$ for each subblock. Accordingly, a different multiplier is allocated to each subblock. As a result, it is possible to prevent the Big Mac Attack in which the private key d is obtained by analyzing what value a multiplier has.

The following gives the detailed descriptions.

Figure 10:
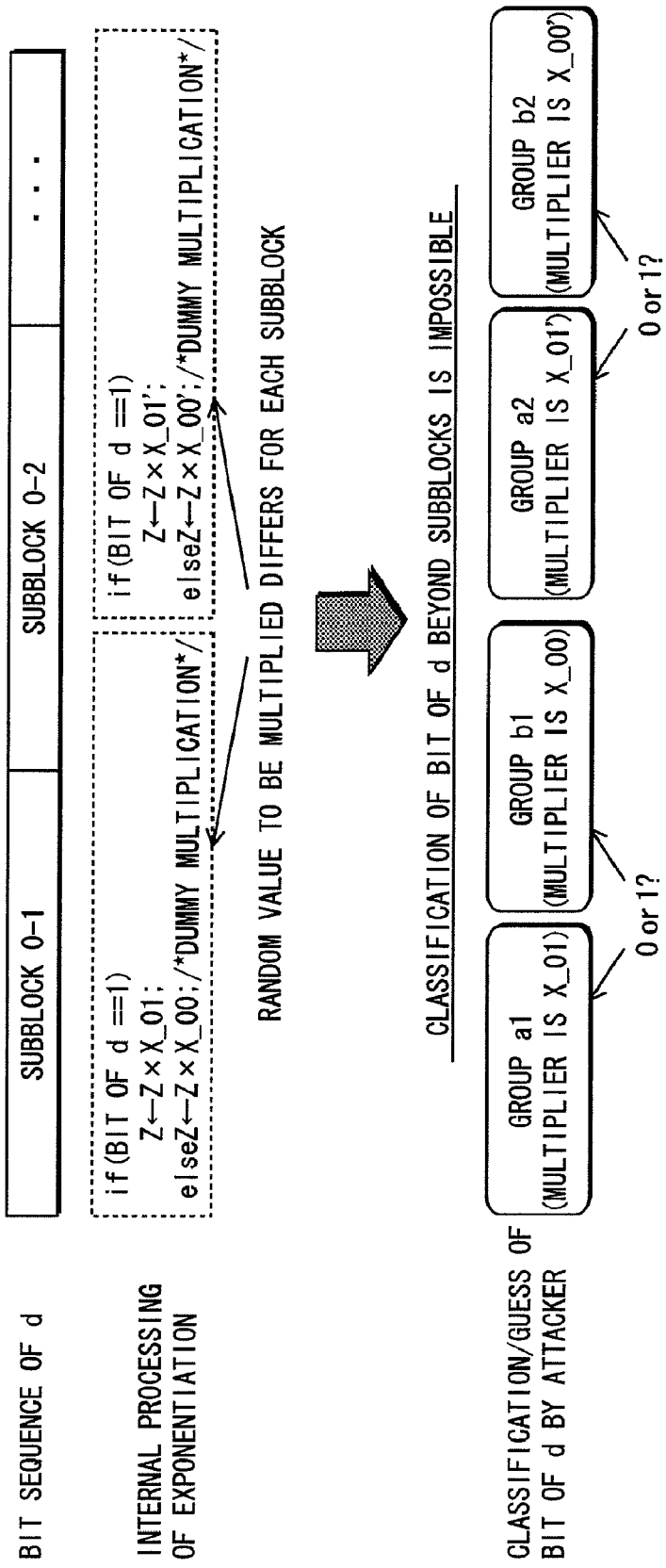
FIG. 10 shows that it is difficult for an attacker to classify and guess bits of a private key d.

FIG. 10 shows processing performed on the private key d by the exponentiation device 1000 of the first embodiment, and classification of multipliers and guess of bits of d performed by an attacker. With respect to the subblock 0-1, if the bit d_i is 0, the intermediate value Z is multiplied by $X\_0 = X\_00$. If the bit d_i is 1, the intermediate value Z is multiplied by $X\_1 = X\_01$. With respect to the subblock 0-2, $X\_0$ and $X\_1$ are respectively updated (changed) from $X\_00$ and $X\_01$ to $X\_00'$ ($=(X\_00)^2$) and $X\_01'$ ($=X \times X\_00'$). Accordingly, if the bit d_j is 0, the intermediate value Z is multiplied by $X\_0 = X\_00'$. If the bit d_j is 1, the intermediate value Z is multiplied by $X\_1 = X\_01'$. Here, the value i is an integer between 511 and 504 inclusive, and the value j is an integer between 503 and 496 inclusive.

Here, based on the waveform of the consumed power, the attacker can classify the subblock 0-1 into a group a1 and a group b1 each having a different multiplier, and classify the subblock 0-2 into a group a2 and a group b2 each having a different multiplier. However, the attacker does not know which of the group a1 and the group b1 corresponds to d_i as 0 or 1, and which of the group a2 and the group b2 corresponds d_i as 0 or 1. Accordingly, the attacker needs to assume that either one of the two groups included in each of the subblocks corresponds to 0 (or 1), and check whether the assumption is correct or not. The number of patterns where each of the group a1 and the group b1 corresponds to the bit value 0 or 1 is two. The number of patterns where each of the group a2 and the group b2 corresponds to the bit value 0 or 1 is two. The number of combinations of these patterns is 2×2=4. Accordingly, the attacker needs to check the four patterns. Here, when the number of subblocks is denoted as NB, the attacker needs to check 2^NB patterns. As NB is greater, the attacker takes a longer time to check patterns. This improves the security against the Big Mac Attack. For example, if the private key d is an integer having 512 bits, 512/8=64 blocks each having eight bits are included in the private key d. Therefore, the attacker needs to check 2^64 patterns, and has a longtime to check the patterns. As a result, the security against the Big Mac Attack is improved. In this way, it is possible to prevent the Big Mac Attack.

Also, the exponentiation device 1000 of the first embodiment cancels the influences of the random values R_0 to R_15 acquired for performing operations with respect to the higher-order bits (d_511 to d_256) of the private key d, by performing operations (multiplications) with respect to the lower-order bits (d_255 to d_0) respectively.

The following describes cancellation of the influences of the random values.

Here, for simplification of the description, the array RSI is composed of two arrays each including {0, 1, 2, ..., 14, 15, 0, 1, 2, ..., 14, 15}, that is, two arrays each including integers 0 to 15.

In other words, RT_i corresponds to the largest integer no more than (lend-count−1)/16.

Figure 11:
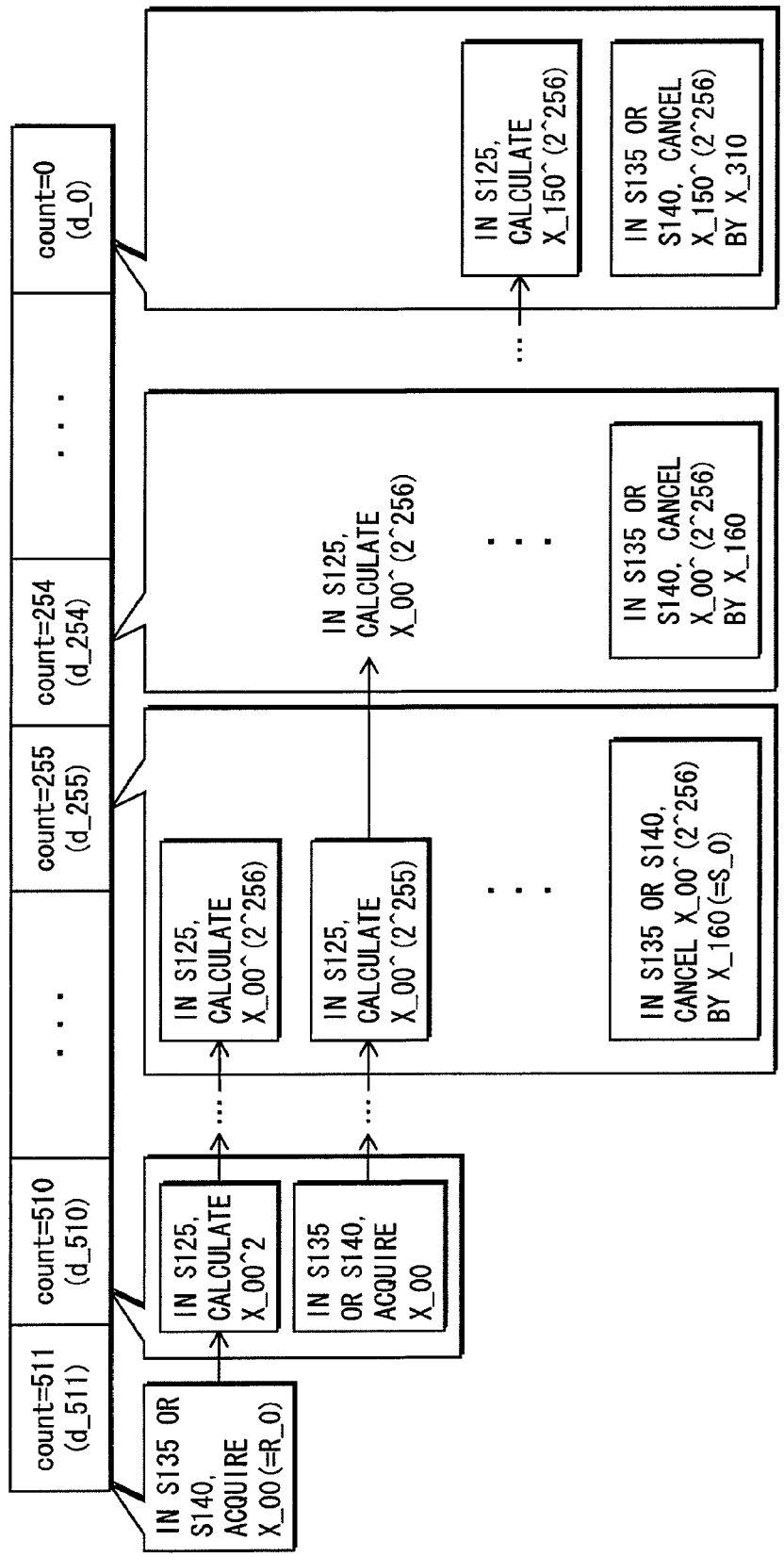
FIG. 11 shows that after exponentiation of a random value R is performed a predetermined number of times (256 times), an influence of the random value R is cancelled.

As shown in FIG. 11, when count=511, that is, when i=0, $X\_00$ ($=R\_0$) is assigned to the intermediate value Z by performing Step S135 or S140 shown in FIG. 5. When count is between 510 and 255 inclusive, the acquired R_0 is repeatedly squared in Step S125. That is, R_0 is squared 256 times. A result of the square is $R\_0^{(2^{256})}$. Accordingly, when count=255, in Step S125 the intermediate value Z includes a multiplier $R\_0^{(2^{256})}$. Also, when count=255, in Step S115, multipliers X_160 and X_161 each include $S\_(RSI\_16)$ ($=S\_0$), as shown in FIG. 7. Then, the intermediate value Z is multiplied by the multiplier X_160 in Step S135, or is multiplied by the multiplier X_161 in Step S140. As a result, the multiplier $R\_0^{(2^{256})}$ included in the intermediate value Z is cancelled. That is, multiplication of the multiplier $R\_0^{(2^{256})}$ by S_0 results in 1.

Also, in the same way, when count=510, Step S135 or S140 shown in FIG. 5 is performed, and accordingly $X\_00$ ($=R\_0$) is assigned to the intermediate value Z. When count is between 509 and 254 inclusive, the acquired R_0 is repeatedly squared in Step S125. That is, in Step S125 when count=255, the intermediate value Z includes the multiplier $R\_0^{(2^{256})}$. Also, when count=254, in Step S115, the multipliers X_160 and X_161 each include S_0, as shown in FIG. 7. Then, the intermediate value Z is multiplied by the multiplier X_160 in Step S135, or is multiplied by the multiplier X_161 in Step S140. As a result, the multiplier $R\_0^{(2^{256})}$ included in the intermediate value Z is cancelled.

In the subsequent operations, X_i0 acquired when count=509 or less is subsequently cancelled. Accordingly, after Step S135 or S140 is performed when count=0, all the multipliers X_i0 are cancelled. As a result, the intermediate value Z is X_d.

Figure 12:
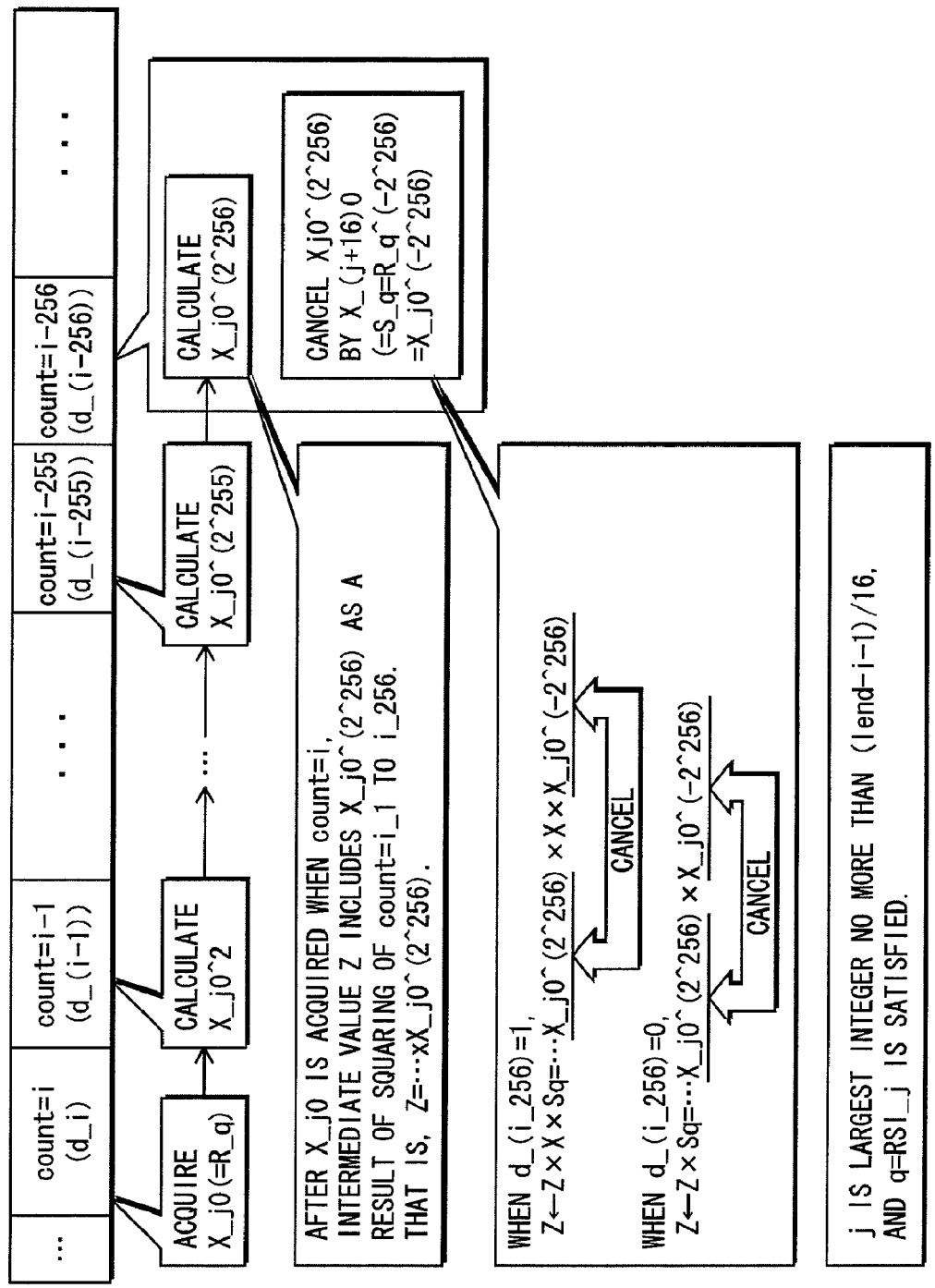
FIG. 12 shows that after exponentiation of a random value R, which is acquired as the count-th (=i-th) random value R, is performed a predetermined number of times (256 times), an influence of the random value R is cancelled.

Also, FIG. 12 shows transition of multiplier focusing on a multiplier X_j0 ($=R\_q$) acquired when count=i (i is an integer between 256 and 511 inclusive). Here, the value j is the largest integer no more than (lend-i−1)/16, and R_q=R_(RSI_j) is satisfied.

In FIG. 12, firstly, when count=i, in Step S135 or S140, X_j0 (=R_q) is assigned to the intermediate value Z. That is, X_j0 (=R_q) is included in the intermediate value Z.

When count=i−1, in Step S125, the intermediate value Z is squared, and a result Z of the square includes R_q^2.

Next, when count=i−2, in Step S125, the intermediate value Z (including R_q^2) is squared, and a result Z of the square includes (R_q^2)^2 (=R_q^(2^2)).

That is, after the intermediate value Z is repeatedly squared until count=i−255, the intermediate value Z includes R_q^(2^255) as a result.

Furthermore, when count=i−256, in Step S115, by performing initialization processing of MT_i, S_q is certainly assigned to X_(i+16)0.

The following describes the reason why S_q is assigned to X(i+16)0. Based on a range of values as the integer i, count=i−256 is certainly no more than 255. Accordingly, any one of values between S_0 and S_15 inclusive is assigned to X(i+16)0. Also, the largest integer no more than (lend-count−1)/16 is calculated at this time, as follows.

$$(lend\text{-}count - 1)/16 = (lend\text{-}(i - 256) - 1)/16$$
$$= (lend\text{-}i + 256 - 1)/16$$
$$= (lend\text{-}i - 1)/16 + 256/16$$
$$= (lend\text{-}i - 1)/16 + 16$$

Therefore, the largest integer no more than (lend-count−1)/16 is the largest integer no more than (lend-i−1)/16 to which 16 is added, that is, j+16. Since the method of generating the array RSI is used, RSI_j is equal to RSI_(j+16). S_(RSI_j)=S_(RSI_(j+16)), that is, S_(RSI_(j+16))=S_q is satisfied.

Also, when count=i−256, in Step S125, the intermediate value Z (including R_q^(2^255)) is squared, and a result Z of the square includes R_q^(2^256).

Then, when count=i−256, in Step S135 or S140, the intermediate value Z is multiplied by the multiplier S_q, and as a result R_q^(2^256) included in the intermediate value Z is cancelled.

As described, X_j0 acquired when count=i is certainly cancelled by multiplication performed when count=i−256 (Step S135 or S140).

Figure 13:
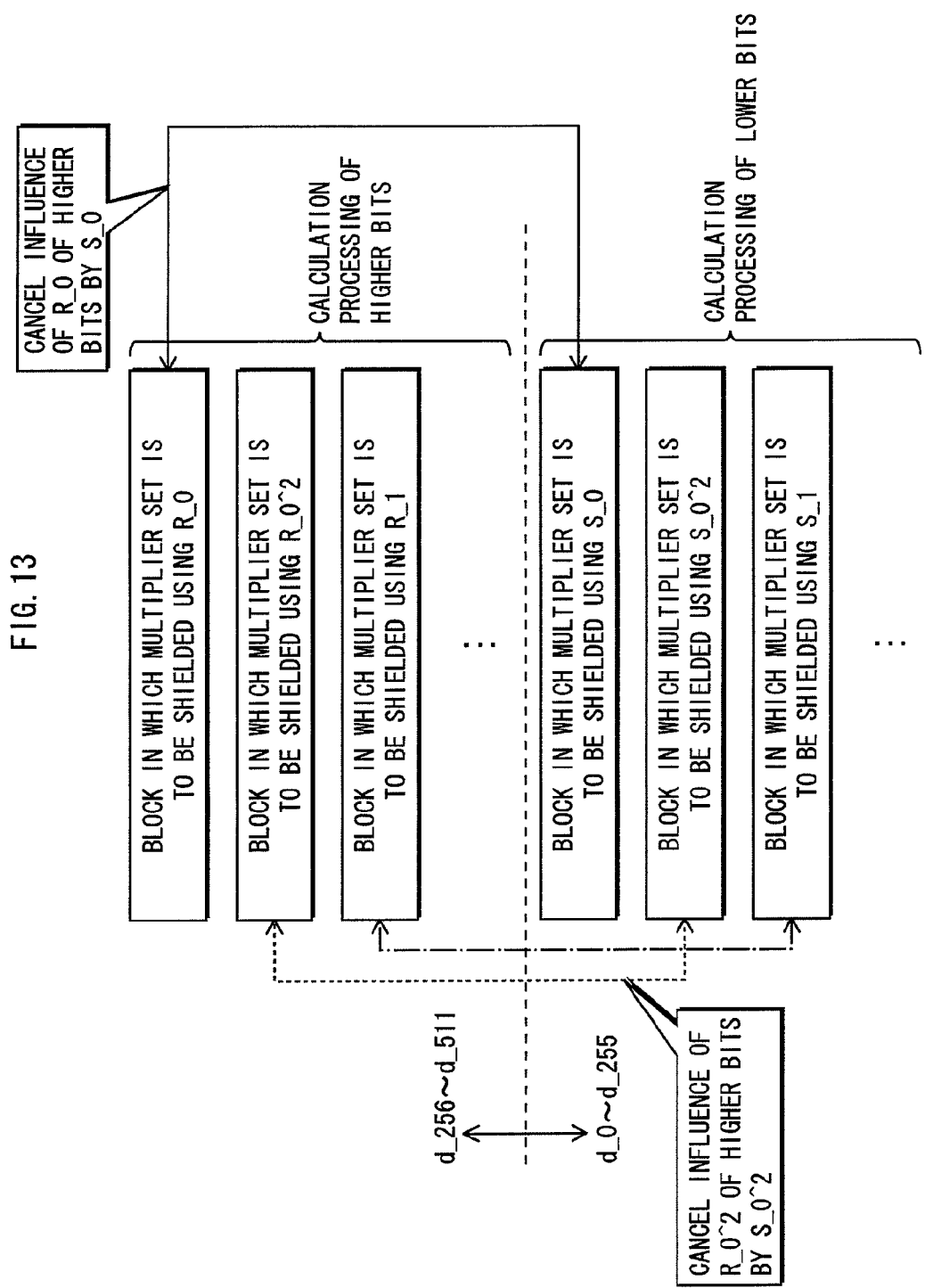
FIG. 13 shows that after exponentiation of a random value R is performed a predetermined number of times (256 times), an influence of the random value R is cancelled by dividing bits into higher-order bits and lower-order bits.

Also, as shown in FIG. 13, a multiplier set is determined using random values such that the influences of random values with respect to blocks (here, block 0 to block 15) corresponding to higher-order bits (d_256 to d_511) of the private key d are cancelled by performing operations with respect to blocks (here, block 16 to block 31) corresponding to lower-order bits (d_0 to d_255) of the private key d. This makes it unnecessary to perform cancellation operation for canceling the influence of the random value.

The following describes in detail why the cancellation operation is unnecessary. Note that, for simplification of the description, the array RSI has values {0, 1, 2, . . . , 14, 15, 0, 1, 2, . . . , 14, 15}, like the above.

As shown in FIG. 13, the random value R_0 is acquired with respect to the subblock 0-1 included in the block 0. Then, square is performed repeatedly 256 times until an operation target is shifted from the subblock 0-1 to a subblock in which a cancellation value S_0 is to be used for shielding a multiplier set, as shown in FIG. 11 and FIG. 12. A result of the repeatedly performed squares is an intermediate value by which R_0^(2^256) mod n is multiplied. Since S_0=R_0^(−2^256)mod n, the influence of the random value R_0, that is, (R_0^(2^256) mod n) is cancelled by multiplying R_0^(2^256) mod n by S_0.

The same applies to the case where the multiplier set determined by the multiplier set determination unit 1150-i is updated by the multiplier set updating unit 1160. For example, suppose a case where a multiplier set is updated when an operation target is a subblock subsequent to a subblock in which a multiplier set is to be shielded using R_0, that is, a case where an operation target is a subblock in which a multiplier set is to be shielded using R_0^2. In this case, an influence of the random value is cancelled by operations performed with respect to the subblock in which the multiplier set is shielded using S_0^2. In this way, the subblock in which the random value R_j is acquired is paired with a subblock in which a cancellation value S_j corresponding to the random value R_j is used, such that after a random value R_j is repeatedly squared predetermined times (here, 256 times), the influence of the random value R_j (R_j^(2^256) mod n) is cancelled by using the cancellation value S_j. This makes it possible to cancel all the influences of the random values. Accordingly, it is unnecessary to perform cancellation processing.

Furthermore, in the first embodiment, the random value selection information generation unit 1170 randomly generates patterns of the random value for shielding the multiplier set. This makes it difficult for attackers to acquire statistical information. This improves the resistance against the differential power analysis.

Note that although the Patent Document 1 also discloses the structure in which the multiplier set is updated, the Patent Document 1 fails to disclose the structure in which the pattern of determining the multiplier set is randomized and accordingly cancellation operation is unnecessary.

Specific Example

Figure 15:
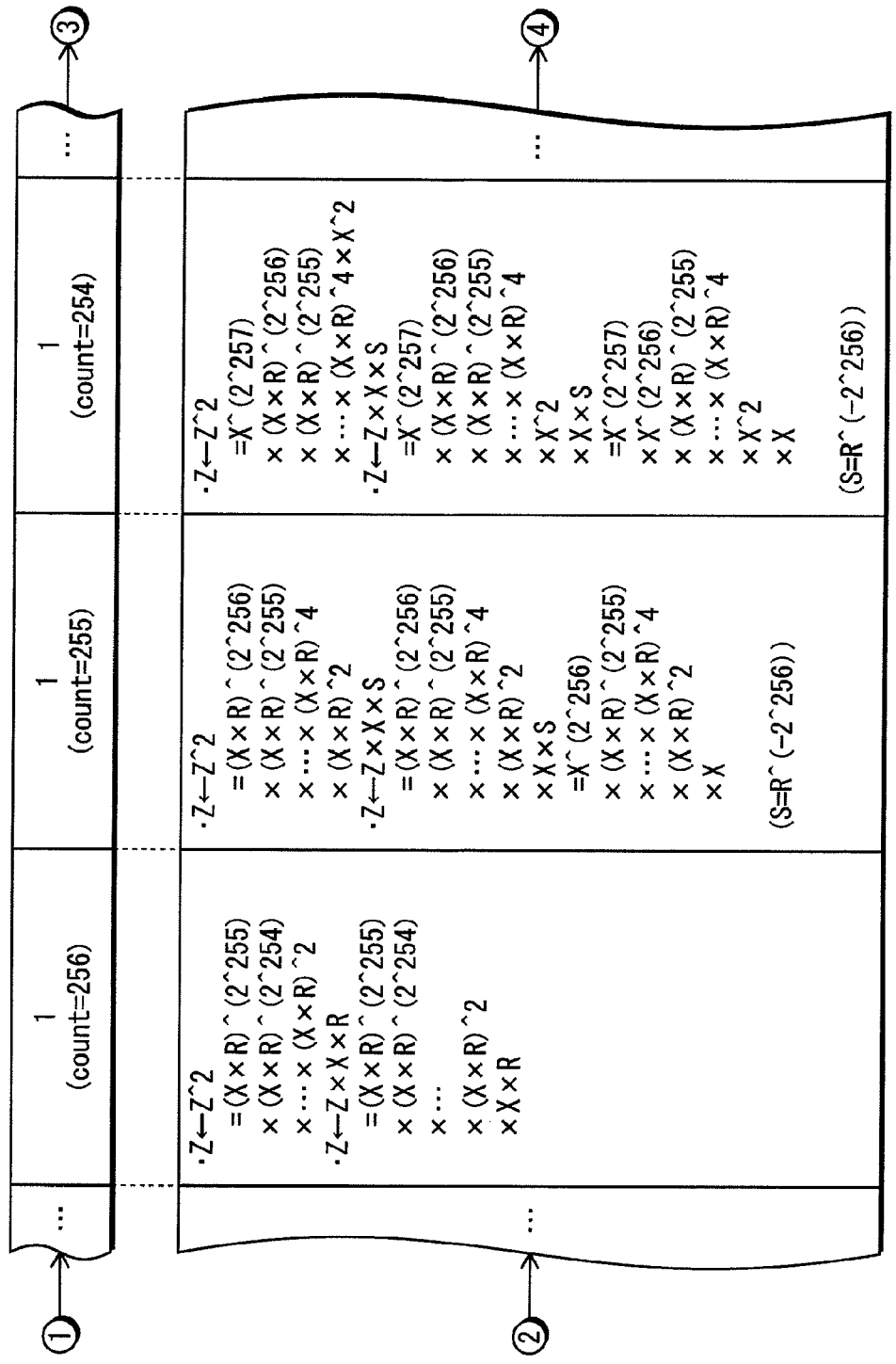
FIG. 15 shows, by giving a specific example, that after exponentiation of the random value R is performed the predetermined number of times (256 times), the influence of the random value R is cancelled, continuing from FIG. 14 and to FIG. 16.
Figure 16:
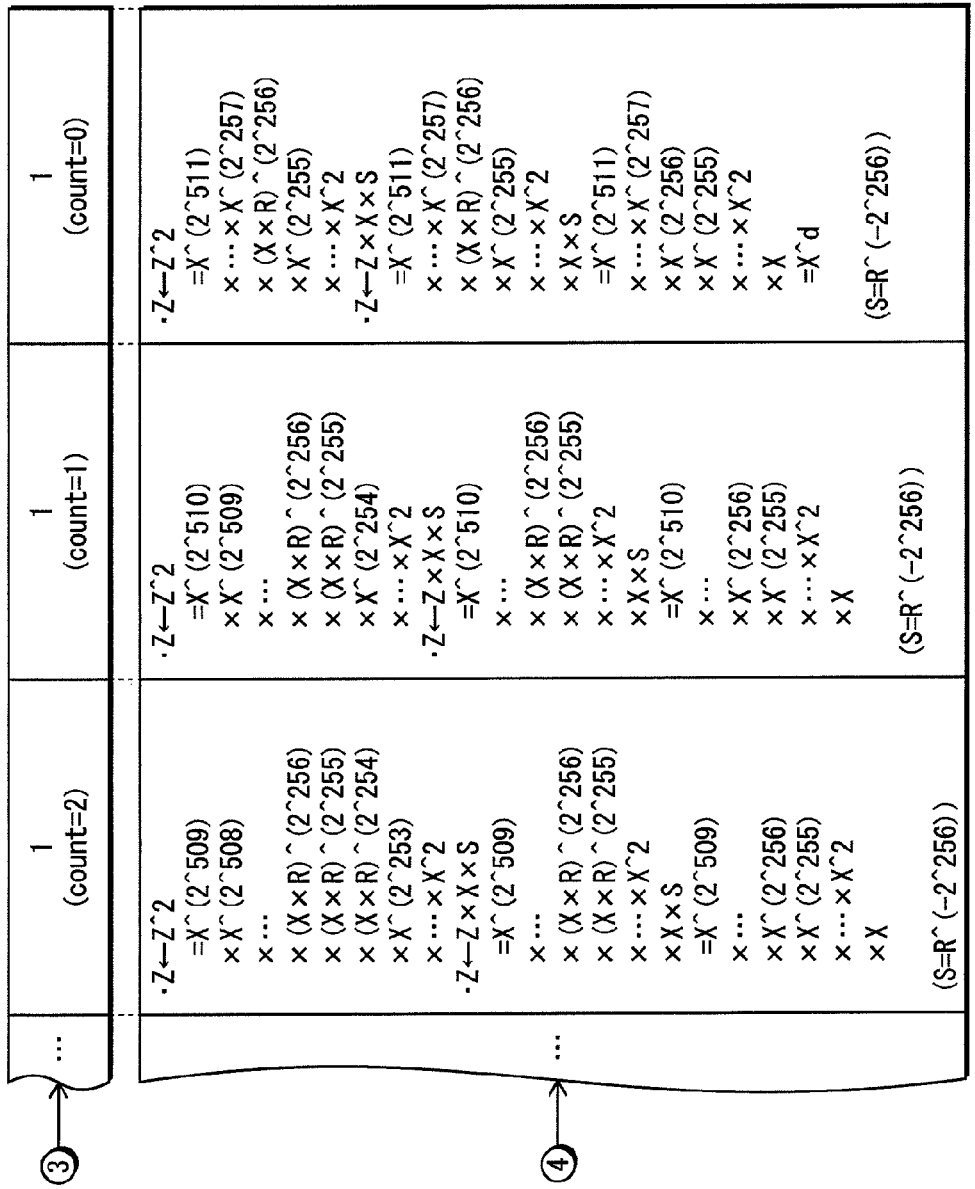
FIG. 16 shows, by giving the specific example, that after exponentiation of the random value R is performed the predetermined number of times (256 times), the influence of the random value R is cancelled, continuing from FIG. 15.

The following describes that influences of the random values acquired for performing operations with respect to the higher-order bits (d_511 to d_256) of the private key d are respectively cancelled by performing operations (multiplications) with respect to the lower-order bits (d_255 to d_0), using a further specific example with reference to FIG. 14 to FIG. 16.

For simplification of the description, all the bits of the private key d are each a value 1, and random values acquired for performing operations with respect to the higher-order bits (d_511 to d_256) are the same value R.

When a bit d_511 at the head of all the bits of the private key d is an operation target, that is, when count=511, the exponentiation device 1000 initializes the intermediate value Z, that is, assigns a value 1 to the intermediate value Z, and performs square and multiplication of the intermediate value Z. Here, since d_511=1, the intermediate value Z after the square and the multiplication have been performed is X×R, as shown in FIG. 14.

When count=510, the exponentiation device 1000 squares the intermediate value Z (=X×R), and multiplies the intermediate value Z (=X×R) by a result of the square. Here, since d_510=1, the intermediate value Z after the square and the multiplication have been performed is (X×R)^2×X×R, as shown in FIG. 14.

The exponentiation device 1000 repeatedly performs square and multiplication until count=256. As a result, the intermediate value Z is (X×R)^(2^255)×(X×R)^(2^254)× . . . ×(X×R)^2×X×R, as shown in FIG. 15.

When count=255, the exponentiation device 1000 squares the intermediate value Z. A result of the square is $(X \times R)^{\wedge}(2^{\wedge}256) \times (X \times R)^{\wedge}(2^{\wedge}255) \times \ldots \times (X \times R)^{\wedge}4 \times (X \times R)^{\wedge}2$, as shown in FIG. 15. Here, as described in the first embodiment, a random value to be used for performing multiplication is changed from the value R to a cancellation value S ($=R^{\wedge}(-2^{\wedge}256)$). Then, the exponentiation device 1000 performs multiplication, and the influence of the random value R acquired when count=511, that is, $R^{\wedge}(2^{\wedge}256)$ is cancelled by the cancellation value S. As a result, the intermediate value Z after the multiplication has been performed is $X^{\wedge}(2^{\wedge}256) \times (X \times R)^{\wedge}(2^{\wedge}255) \times \ldots \times (X \times R)^{\wedge}4 \times (X \times R)^{\wedge}2 \times X$, as shown in FIG. 15.

When count=254, the exponentiation device 1000 squares the intermediate value Z. The intermediate value Z after the square has been performed is $X^{\wedge}(2^{\wedge}257) \times (X \times R)^{\wedge}(2^{\wedge}256) \times (X \times R)^{\wedge}(2^{\wedge}255) \times \ldots \times (X \times R)^{\wedge}4 \times X^{\wedge}2$, as shown in FIG. 15. Next, the exponentiation device 1000 multiplies the intermediate value Z. The influence of the random value R acquired when the count=510, that is, $R^{\wedge}(2^{\wedge}256)$ is cancelled by the cancellation value S. As a result of the cancellation, the intermediate value Z is $X^{\wedge}(2^{\wedge}257) \times X^{\wedge}(2^{\wedge}256) \times (X \times R)^{\wedge}(2^{\wedge}255) \times \ldots \times (X \times R)^{\wedge}4 \times X^{\wedge}2 \times X$, as shown in FIG. 15.

The exponentiation device 1000 repeatedly performs square and multiplication until count=0. Accordingly, it is possible to cancel the influences of the random values acquired for performing operations with respect to the higher-order bits (d_511 to d_256) of the private key d respectively by performing operations (multiplications) with respect to the lower-order bits (d_255 to d_0).

After square and multiplication are performed when count=1, only the influence of the random value R acquired when count=256 ($R^{\wedge}(2^{\wedge}255)$) remains in the intermediate value Z.

Then, when count=1, the exponentiation device 1000 squares the intermediate value Z. As a result of the square, the intermediate value Z is $X^{\wedge}(2^{\wedge}511) \times X^{\wedge}(2^{\wedge}510) \times \ldots \times (X \times R)^{\wedge}(2^{\wedge}256) \times X^{\wedge}(2^{\wedge}255) \times X^{\wedge}4 \times X^{\wedge}2$, as shown in FIG. 16. The exponentiation device 1000 multiplies the intermediate value Z by a value $X \times S$ so as to cancel the influence of the random value R, which is acquired when count=256, that is, ($R^{\wedge}(2^{\wedge}256)$). This results in, as shown in FIG. 16, $X^{\wedge}(2^{\wedge}511) \times X^{\wedge}(2^{\wedge}510) \times \ldots \times X^{\wedge}(2^{\wedge}256) \times X^{\wedge}(2^{\wedge}255) \ldots \times X^{\wedge}4 \times X^{\wedge}2 \times X = X^{\wedge}d$.

Therefore, when calculating exponentiation $X^{\wedge}d$, the exponentiation device 1000 acquires a random value or a cancellation value by performing multiplication while count is values 511 and 0. Accordingly, it is possible to make it difficult to analyze the private key d using the Differential Power Analysis. Also, it is possible to cancel the influences of the random values respectively acquired for performing multiplications with respect to the higher-order bits (d_511 to d_256) of the private key d respectively by performing operations (multiplications) with respect to the lower-order bits (d_255 to d_0).

2. Second Embodiment

Figure 17:
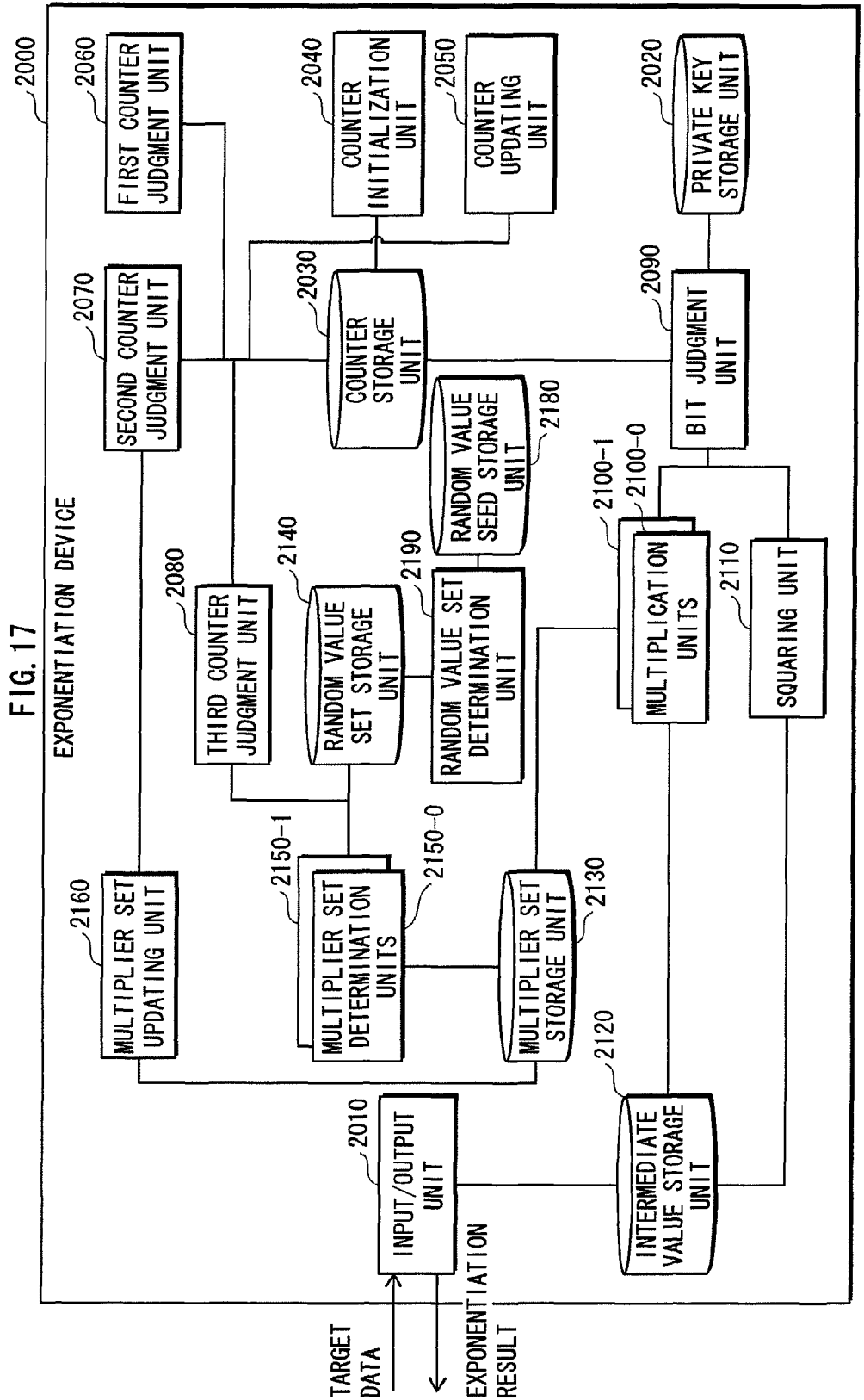
FIG. 17 is a block diagram showing the structure of an exponentiation device 2000.

FIG. 17 shows the structure of an exponentiation device 2000.

The exponentiation device 2000 inputs target data X that is target data of exponentiation, and outputs a result of exponentiation ($X^{\wedge}d$) using a private key d as an exponent for the target data X, like the exponentiation device 1000 of the first embodiment.

The exponentiation device 2000 is used, for example, for performing decryption in accordance with the RSA encryption scheme and generating a signature in accordance with the RSA signature scheme, like the exponentiation device 1000 of the first embodiment.

2.1 Structure of Exponentiation Device 2000

The exponentiation device 2000 includes, as shown in FIG. 17, an input/output unit 2010, a private key storage unit 2020, a counter storage unit 2030, a counter initialization unit 2040, a counter updating unit 2050, a first counter judgment unit 2060, a second counter judgment unit 2070, a third counter judgment unit 2080, a bit judgment unit 2090, multiplication units 2100-0 and 2100-1, a squaring unit 2110, an intermediate value storage unit 2120, a multiplier set storage unit 2130, a random value set storage unit 2140, multiplier set determination units 2150-0 and 2150-1, a multiplier set updating unit 2160, a random value seed storage unit 2180, and a random value set determination unit 2190.

Note that the input/output unit 2010, the private key storage unit 2020, the counter storage unit 2030, the counter initialization unit 2040, the counter updating unit 2050, the first counter judgment unit 2060, the second counter judgment unit 2070, the bit judgment unit 2090, the squaring unit 2110, the intermediate value storage unit 2120, and the multiplier set updating unit 2160 that are included in the exponentiation device 2000 are respectively the same as the input/output unit 1010, the private key storage unit 1020, the counter storage unit 1030, the counter initialization unit 1040, the counter updating unit 1050, the first counter judgment unit 1060, the second counter judgment unit 1070, the bit judgment unit 1090, the squaring unit 1110, the intermediate value storage unit 1120, and the multiplier set updating unit 1160 that are described in the first embodiment. Accordingly, descriptions thereof are omitted here.

The following describes the third counter judgment unit 2080, the multiplier set storage unit 2130, the multiplication units 2100-0 and 2100-1, the random value set storage unit 2140, the multiplier set determination units 2150-0 and 2150-1, the random value seed storage unit 2180, and the random value set determination unit 2190.

(1) Third Counter Judgment Unit 2080

Upon receiving an instruction to make a judgment from the first counter judgment unit 2060, the third counter judgment unit 2080 judges the counter "count" stored in the counter storage unit 2030 is divisible by 256, that is, whether the counter "count" is a multiple of 256.

If judging the counter "count" to be divisible by 256, the third counter judgment unit 2080 transmits an update instruction to the counter updating unit 2050.

If judging the counter "count" not to be divisible by 256, the third counter judgment unit 2080 transmits an instruction to make a judgment to the second counter judgment unit 2070.

(2) Multiplier Set Storage Unit 2130

The multiplier set storage unit 2130 stores therein multiplier sets MT_0 to MT_1 to be used by the multiplication units 2100-0 and 2100-1.

Figure 18:
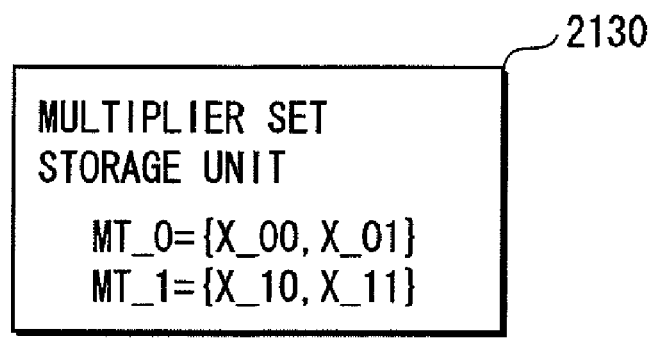
FIG. 18 shows a multiplier set stored in a multiplier set storage unit 2130.

Specifically, the multiplier set storage unit 2130 stores therein a multiplier set MT_i including multipliers X_i0 and X_i1, as shown in FIG. 18. Here, the value i is 0 or 1.

(3) Multiplication Units 2100-0 and 2100-1

The multiplication units 2100-0 and 2100-1 perform the same operations. Accordingly, a multiplication unit 2110-*i* is described here. Note that the value i is 0 or 1.

The multiplication unit 2110-*i* multiplies the intermediate value Z stored in the intermediate value storage unit 2120 by the multiplier X_i0 or X_i1 included in the multiplier set MT_i stored in the multiplier set storage unit 2130, and stores a result of the multiplication in the intermediate value storage unit 1120.

Specifically, if the bit judgment unit 2090 judges the count-th bit to be 0, the multiplication unit 2110-*i* multiplies the intermediate value Z by the multiplier X_i0, and newly assigns a result of the multiplication to the intermediate value Z. Also, if the bit judgment unit 2090 judges the count-th bit to be 1, the multiplication unit 2110-*i* multiplies the intermediate value Z by the multiplier X_i1, and newly assigns a result of the multiplication to the intermediate value Z.

(4) Random Value Set Storage Unit 2140

The random value set storage unit 2140 stores therein a random value set RT.

Figure 19:
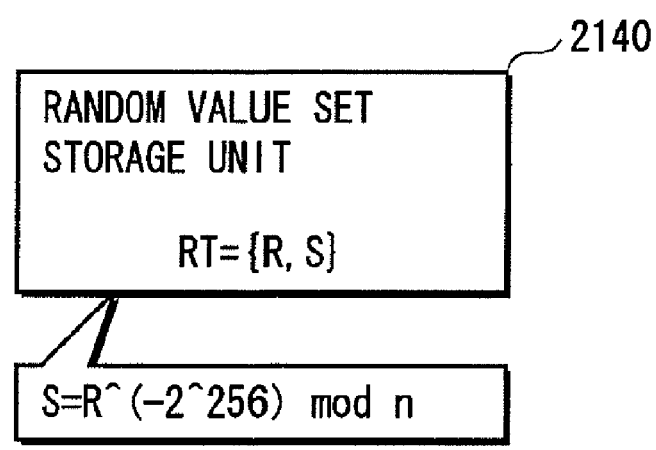
FIG. 19 shows a random value set stored in a random value set storage unit 2140.

Specifically, the random value set storage unit 2140 stores therein the random value set RT including a random value R and a cancellation value S, as shown in FIG. 19.

Also, the random value R and the cancellation value S satisfy the following expression.

$$S = R^{\wedge}(-2^{\wedge}256) \bmod n$$

That is, $R^{\wedge}(2^{\wedge}256) \times S = 1$

Note that the random value R and the cancellation value S are generated by the random value set determination unit 2190. The random value set determination unit 2190 is described later.

(5) Multiplier Set Determination Units 2150-0 and 2150-1

The multiplier set determination units 2150-0 and 2150-1 perform the same operations. Accordingly, a multiplier set determination unit 2150-*i* is described here. Note that the value i is 0 or 1.

The multiplier set determination unit 2150-*i* initializes the multiplier set MT_i stored in the multiplier set storage unit 2130.

Specifically, when the counter "count" is no less than 256, with respect to the target data X, the multiplier set determination unit 2150-*i* calculates X_i0 and X_i1 using the random value R included in the random value set RT stored in the random value set storage unit 2140.

When the counter "count" is less than 256, the multiplier set determination unit 2150-*i* calculates X_i0 and X_i1 using the cancellation value S included in the random value set RT.

Note that the multiplier set determination unit 2150-*i* calculates X_i0 and X_i1 respectively by executing X_i0←RS mod n and X_i1←X×X_i0 mod n. Here, the value RS is R or S.

(6) Random Value Seed Storage Unit 2180

The random value seed storage unit 2180 stores therein a random value seed U and a cancellation value seed V. The values U and V are stored in advance, and satisfy the following expression.

$$V = U^{\wedge}(-2^{\wedge}256) \bmod n$$

(7) Random Value Set Determination Unit 2190

The random value set determination unit 2190 generates a random value R and a cancellation value S included in the random value set RT respectively using the random value seed U and the cancellation value seed V stored in the random value seed storage unit 2180, and stores the generated random value R and cancellation value S in the random value set storage unit 2140.

Specifically, the random value set determination unit 2190 generates a random positive integer w, and calculates R and S using the following expressions.

$$R = U^{\wedge}w \bmod n$$

$$S = V^{\wedge}w \bmod n$$

These exponentiations are simply performed using a conventional method such as the binary method and the window method. The value w is a random value having 32 bits for example, but not limited to this.

2.2 Operations of Exponentiation Device 2000

(1) Whole Operations

Here, the operations of the exponentiation device 2000 are described with reference to flow charts shown in FIG. 20 and FIG. 21.

The input/output unit 2010 receives input of target data X, and stores the received target data X in the intermediate value storage unit 2120 (Step S400).

The input/output unit 2010 assigns a value 1 to an intermediate value Z, and stores the intermediate value Z in the intermediate value storage unit 2120 (Step S405).

The random value set determination unit 2190 generates a random value set RT, and stores the generated random value set RT in the random value set storage unit 2140 (Step S410).

The counter initialization unit 2040 initializes the counter "count" (Step S415). Here, the counter initialization unit 2040 assigns lend−1 to the counter "count". Here, the value lend denotes the number of bits of the private key d.

The multiplier set determination unit 2150-*i* initializes MT_i stored in the multiplier set storage unit 2130, that is, initializes the multipliers X_i0 and X_i1, with use of the target data X and the random value set RT stored in the random value set storage unit 2140 (Step S420). Here, the value i is the largest integer no more than (lend-count−1)/256.

The squaring unit 2110 squares the intermediate value Z stored in the intermediate value storage unit 2120, and newly stores a result of the square in the intermediate value storage unit 2120 as the intermediate value Z (Step S425).

The bit judgment unit 2090 make a judgment on the bits of the private key d (Step S430). Specifically, the bit judgment unit 2090 judges whether the count-th bit of the private key d is 0 or 1.

If the bit is judged to be 0 ("0" in Step S430), the multiplication unit 2110-*i* multiplies the intermediate value Z stored in the intermediate value storage unit 2120 by the multiplier X_i0 included in the multiplier set MT_i stored in the multiplier set storage unit 2130. Then, the multiplication unit 2110-*i* newly stores a result of the multiplication in the intermediate value storage unit 2120 as the intermediate value Z (Step S435). If the bit is judged to be 1 ("1" in Step S430), the multiplication unit 2110-*i* multiplies the intermediate value Z stored in the intermediate value storage unit 2120 by the multiplier X11 stored in the multiplier set storage unit 2130. Then, the multiplication unit 2110-*i* newly stores a result of the multiplication in the intermediate value storage unit 2120 as the intermediate value Z (Step S440). Here, the value i is the largest integer no more than (lend-count−1)/256.

The first counter judgment unit 2060 judges whether the counter "count" stored in the counter storage unit 2030 is 0 (Step S445).

If the counter "count" is judged to be 0 ("YES" in Step S445), the input/output unit 2010 outputs the intermediate value Z stored in the intermediate value storage unit 2120 (as a result of exponentiation) (Step S475).

If the counter "count" is judged not to be 0 ("NO" in Step S445), the third counter judgment unit 2080 judges whether the counter "count" stored in the counter storage unit 2030 is divisible by 256, that is, whether the counter "count" is a multiplier of 256 (Step S450).

If the counter "count" is judged to be divisible by 256 ("YES" in Step S450), the counter updating unit 2050 updates the counter "count" stored in the counter storage unit 2030 (Step S470). Specifically, the counter updating unit 2050 decrements the counter "count" stored in the counter storage unit 2030 (by 1), and newly stores a result of the decrement in the counter storage unit 2030 as the counter "count". Then, the flow returns to Step S420.

If the counter "count" is judged not to be divisible by 256 ("NO" in Step S450), the second counter judgment unit 2070 judges whether the counter "count" stored in the counter storage unit 2030 is divisible by 8, that is, whether the counter "count" is a multiplier of 8 (Step S455).

If the counter "count" is judged to be divisible by 8 ("YES" in Step S455), the multiplier set updating unit 2160 updates the multiplier set MT_i stored in the multiplier set storage unit 2130 (Step S460). Here, the value i is the largest integer no more than (lend-count-1)/256.

The counter updating unit 2050 updates the counter "count" stored in the counter storage unit 2030 (Step S465). Specifically, the counter updating unit 2050 decrements the counter "count" stored in the counter storage unit 2030 (by 1), and newly stores a result of the decrement in the counter storage unit 2030 as the counter "count". Then, the flow returns to Step S425.

If the counter "count" is judged not to be divisible by 8 ("NO" in Step S455), the flow proceeds to Step S465, and returns to Step S425 after Step S465 completes.

(2) Determination Processing of Random Value Set RT

Figure 20:
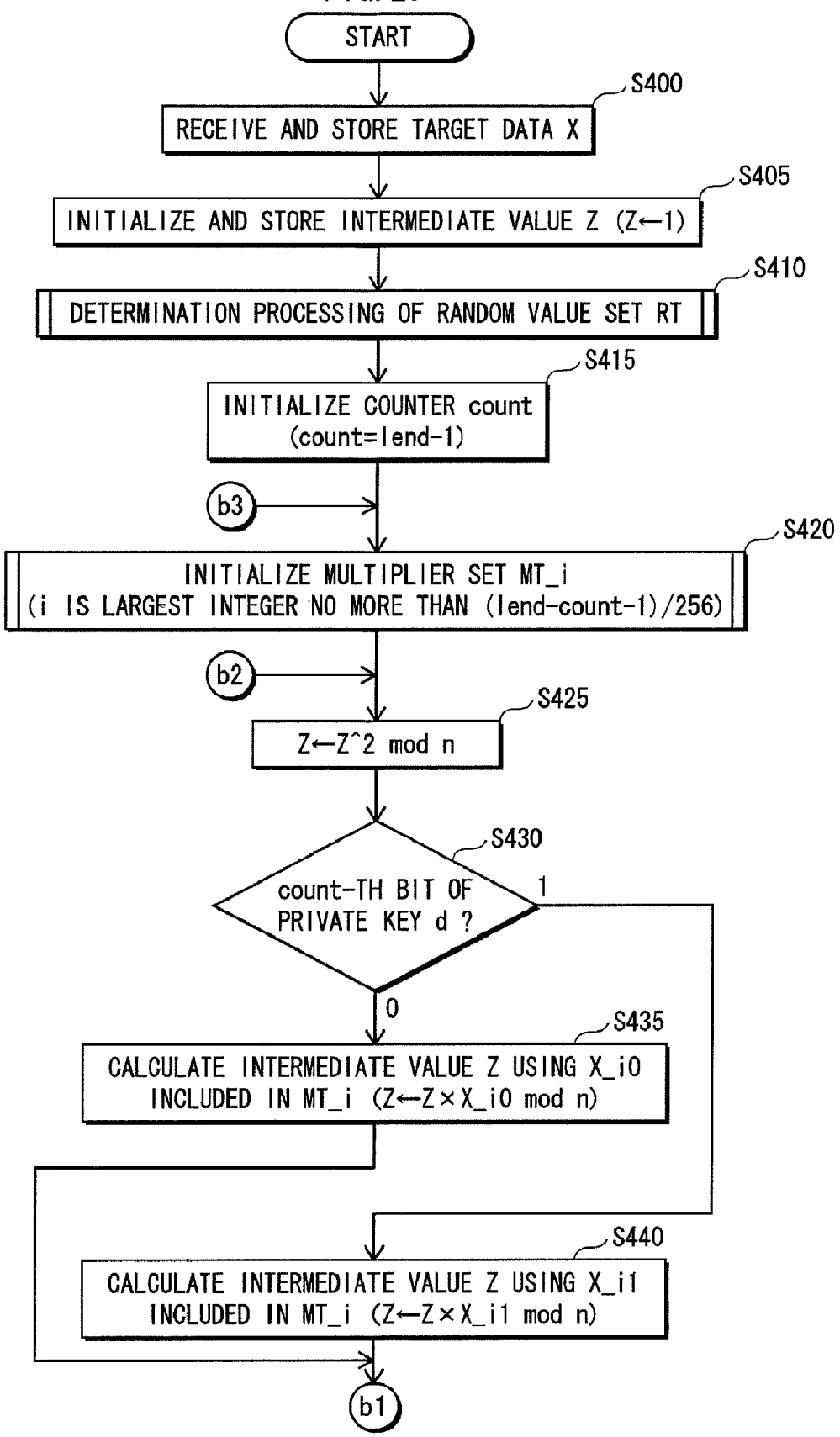
FIG. 20 is a flow chart showing operations of the exponentiation device 2000, continuing to FIG. 21.

Here, the processing of determining the random value set RT performed in Step S410 of FIG. 20 is described with reference to a flow chart shown in FIG. 22.

The random value set determination unit 2190 generates a random positive integer w (Step S500).

The random value set determination unit 2190 calculates a random value R (=U^w mod n) using the random value seed U stored in the random value seed storage unit 2180 and the positive integer w (Step S505).

The random value set determination unit 2190 calculates a cancellation value S (=V^w mod n) using the cancellation value seed V stored in the random value seed storage unit 2180 and the positive integer w (Step S510).

The random value set determination unit 2190 stores a random value set RT (={R,S}) including the calculated random value R and cancellation value S in the random value set storage unit 2140 (Step S515).

(3) Initialization Processing of MT_i

Figure 7:
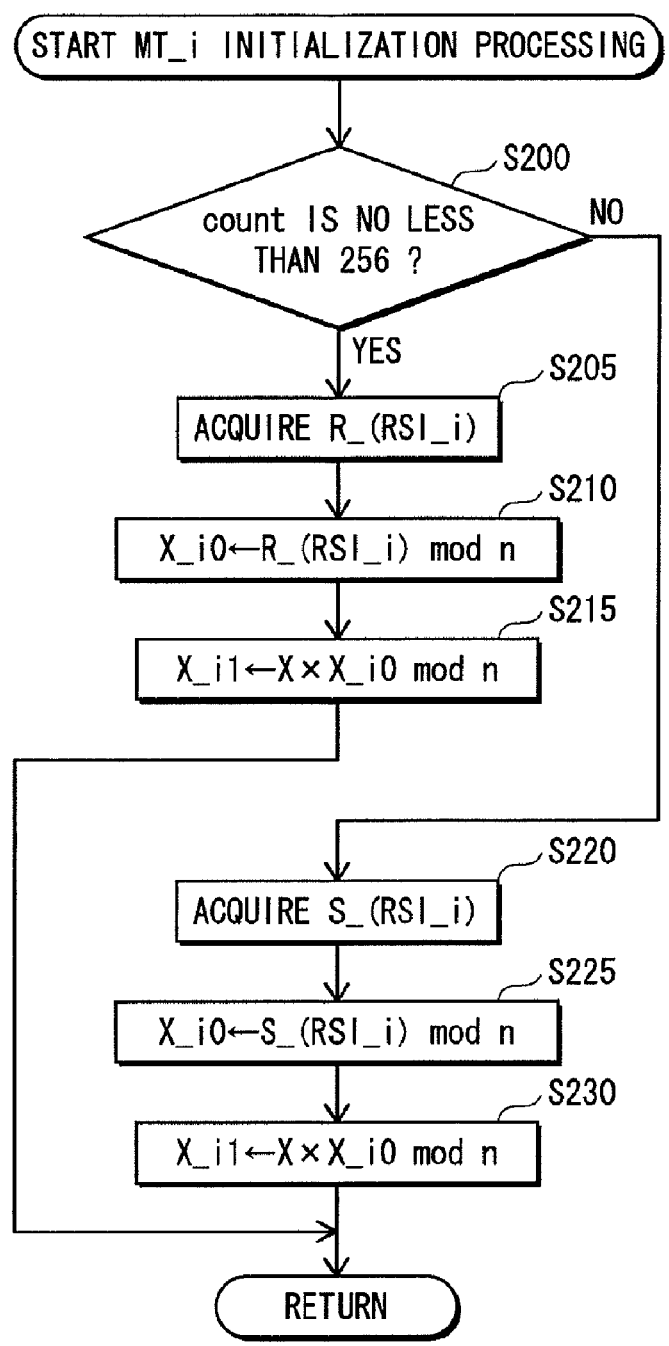
FIG. 7 is a flow chart showing operations of processing of initializing MT_i.

The processing of updating the multiplier set MT_i performed in Step S420 of FIG. 20 is realized by partially altering the flow chart of FIG. 7, and accordingly only the altered parts are described here.

Firstly, Step S205 is altered as follows: if the counter "count" is judged to be no less than 256 ("YES" in Step S200), the multiplier set determination unit 2150-i acquires the random value R included in the random value set RT stored in the random value set storage unit 2140.

Next, Step S210 is altered as follows: the multiplier set determination unit 1150-i assigns the acquired random value R_(RSI_i) to the multiplier X_i0.

Then, Step S220 is altered as follows: if the counter "count" is judged not to be no less than 256 ("NO" in Step S200), the multiplier set determination unit 2150-i acquires the cancellation value S included in the random value set RT stored in the random value set storage unit 2140.

Lastly, Step S225 is altered as follows: the multiplier set determination unit 2150-i assigns the acquired cancellation value S to the multiplier X_i0.

By altering the operation flow shown in FIG. 7 in this way, it is possible to realize the initialization processing of the multiplier set MT_i performed in Step S420 of FIG. 20.

(4) Update Processing of MT_i

Figure 8:
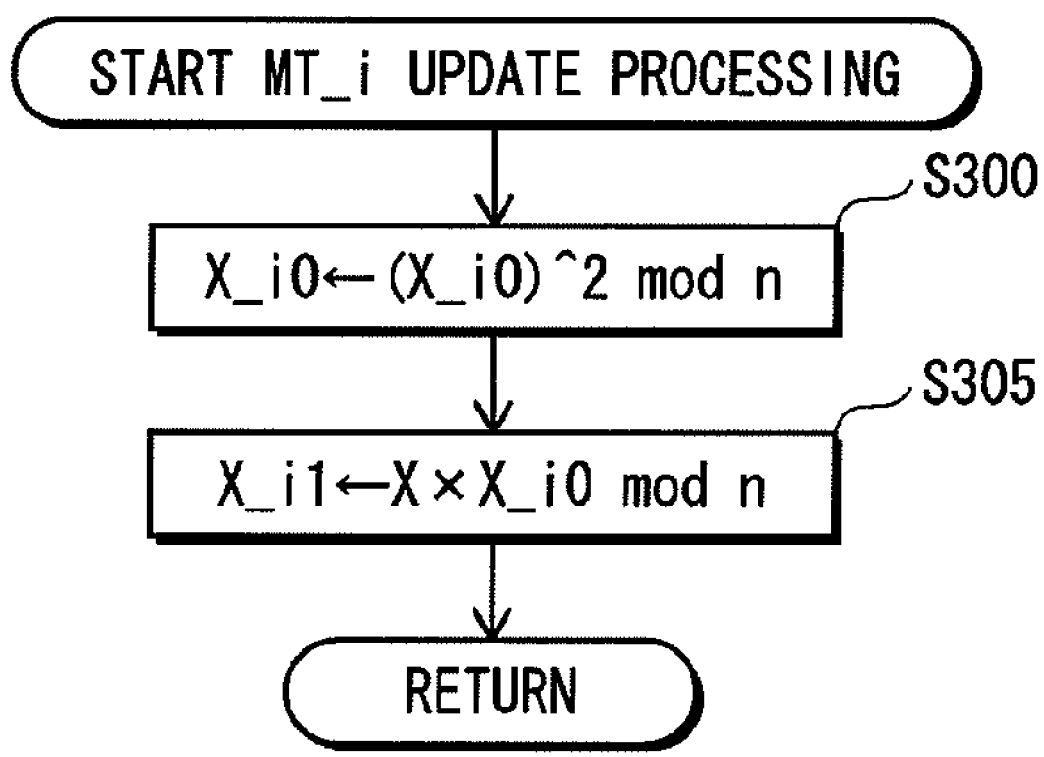
FIG. 8 is a flow chart showing operations of processing of updating MT_i.
Figure 21:
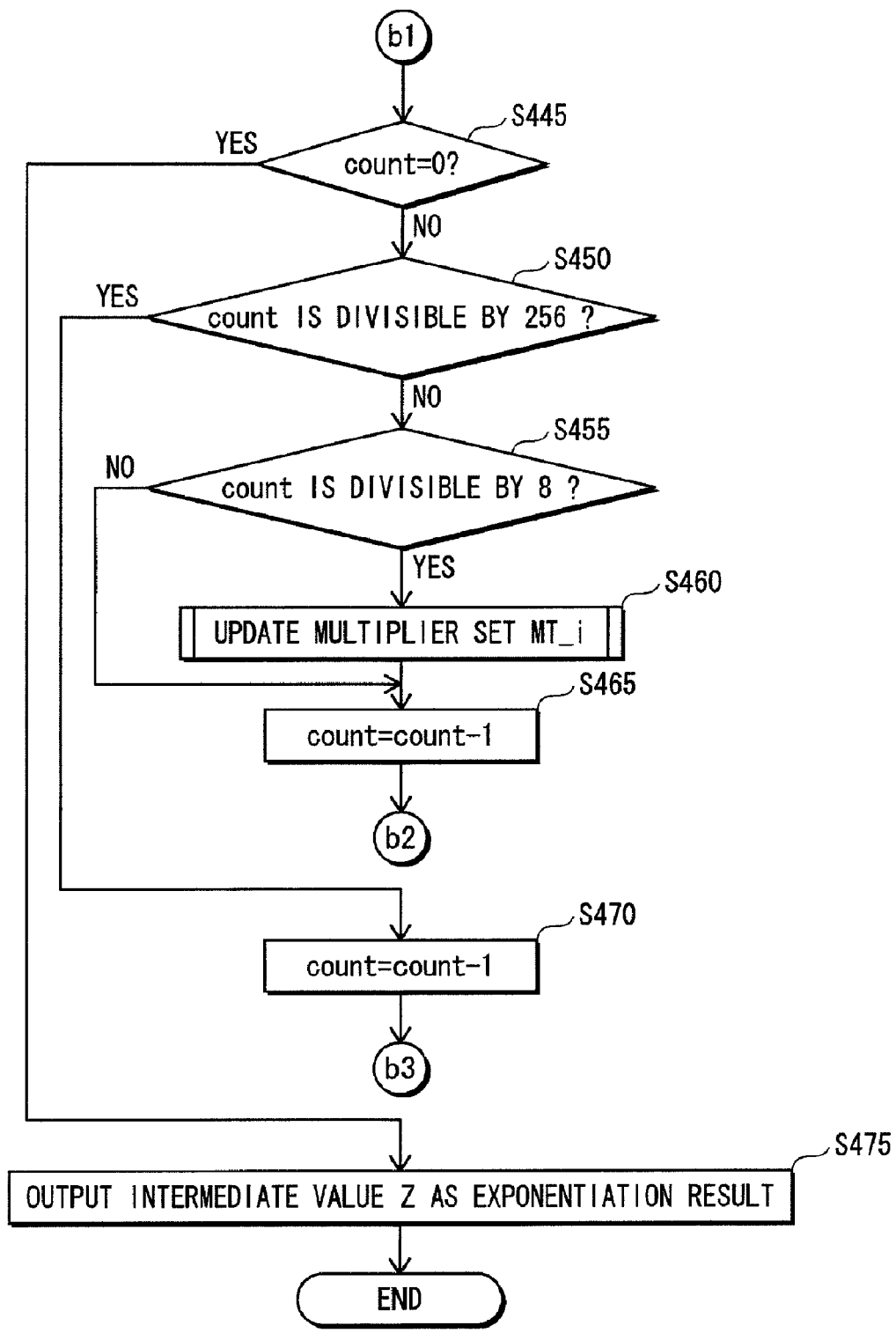
FIG. 21 is a flow chart showing the operations of the exponentiation device 2000, continuing from FIG. 20.

The processing of updating the multiplier set MT_i performed in Step S460 shown in FIG. 21 is realized by using the operation flow that is the same as that shown in FIG. 8, and accordingly description thereof is omitted here.

2.3 Effects of Second Embodiment

The second embodiment differs from the first embodiment only in method of determining a multiplier set using a random value set. Accordingly, the second embodiment exhibits the same effect as that of the first embodiment.

Against the differential power analysis, the random value set is calculated by performing exponentiation of a random value seed using a random positive integer. Accordingly, it is possible to randomize patterns of random values for blinding the multiplier set. This makes it difficult for an attacker to acquire statistical information. This improves the resistance against the differential power analysis.

3. Third Embodiment

Figure 23:
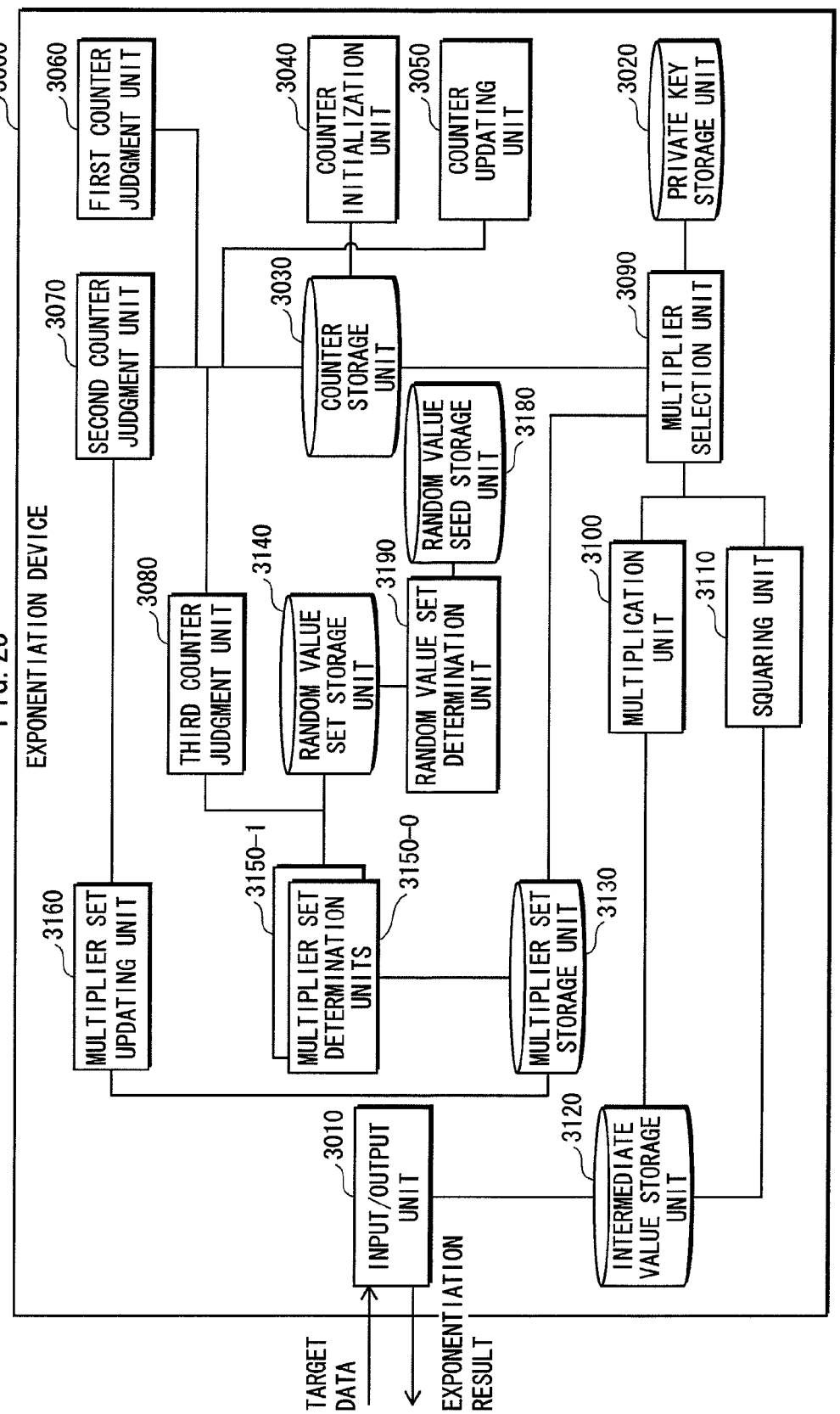
FIG. 23 is a block diagram showing the structure of an exponentiation device 3000.

FIG. 23 shows the structure of an exponentiation device 3000.

The exponentiation device 3000 inputs target data X that is target data of exponentiation, and outputs a result of exponentiation (X^d) using a private key d as an exponent for the target data X, like the exponentiation devices 1000 and 2000 of the first and second embodiments.

The exponentiation device 3000 is used, for example, for performing decryption in accordance with the RSA encryption scheme and generating a signature in accordance with the RSA signature scheme, like the exponentiation devices 1000 and 2000 of the first and second embodiments.

3.1 Structure of Exponentiation Device 3000

As shown in FIG. 23, the exponentiation device 3000 includes an input/output unit 3010, a private key storage unit 3020, a counter storage unit 3030, a counter initialization unit 3040, a counter updating unit 3050, a first counter judgment unit 3060, a second counter judgment unit 3070, a third counter judgment unit 3080, a multiplier selection unit 3090, a multiplication unit 3100, a squaring unit 3110, an intermediate value storage unit 3120, a multiplier set storage unit 3130, a random value set storage unit 3140, multiplier set determination units 3150-0 and 3150-1, a multiplier set updating unit 3160, a random value seed storage unit 3180, and a random value set determination unit 3190.

The input/output unit 3010, the private key storage unit 3020, the counter storage unit 3030, the counter updating unit 3050, the first counter judgment unit 3060, the squaring unit 3110, and the intermediate value storage unit 3120 are respectively the same as the input/output unit 1010, the private key storage unit 1020, the counter storage unit 1030, the counter updating unit 1050, the first counter judgment unit 1060, the squaring unit 1110, and the intermediate value storage unit 1120 that are described in the first embodiment. Accordingly, descriptions thereof are omitted here.

Also, the random value set storage unit 3140, the random value seed storage unit 3180, and the random value set determination unit 3190 are respectively the same as the random value set storage unit 2140, the random value seed storage unit 2180, and the random value set determination unit 2190 that are described in the second embodiment. Accordingly, descriptions thereof are omitted here.

The following describes the multiplier set storage unit 3130, the counter initialization unit 3040, the second counter judgment unit 3070, the third counter judgment unit 3080, the multiplier selection unit 3090, the multiplication unit 3100, the multiplier set determination units 3150-0 and 3150-1, and the multiplier set updating unit 3160.

(1) Multiplier Set Storage Unit 3130

The multiplier set storage unit 3130 stores therein multiplier sets MT_0 to MT_1 to be used by the multiplication unit 3100.

Figure 24:
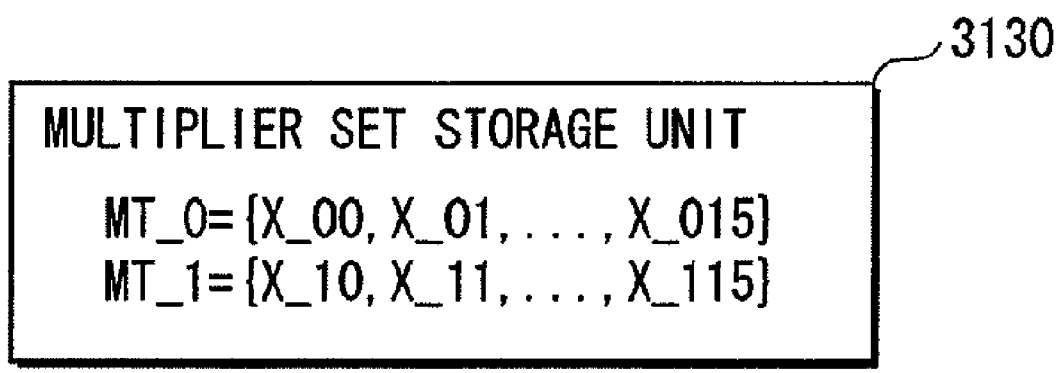
FIG. 24 shows a multiplier set stored in a multiplier set storage unit 3130.

Specifically, the multiplier set storage unit 3130 stores therein a multiplier set MT_i (i is 0 or 1), which is constituted by 16 multipliers X_i0, X_i1, ..., X_i15, as shown in FIG. 24. Since sw=4, the multipliers X_i0 to X_i15 are stored. With respect to a value sw, the multiplier set storage unit 2130 generally stores therein multipliers X_i0, X_i1, ..., X_(i (2^sw−1)).

(2) Counter Initialization Unit 3040

The counter initialization unit 3040 assigns a value b to the counter "count".

Here, b=(the smallest integer no less than lend/sw)−1 is satisfied. The value lend denotes the number of bits of the private key d. For example, lend=512. The value sw denotes a positive integer. For example, sw=4. Note that the value sw may be a value 2, 3, or no less than 5.

(3) Third Counter Judgment Unit 3080

Upon receiving an instruction to make a judgment from the first counter judgment unit 2060, the third counter judgment unit 3080 judges whether the counter "count" stored in the counter storage unit 3030 is divisible by 64, that is, whether the counter "count" is a multiple of 64.

If judging the counter "count" to be divisible by 64, the third counter judgment unit 3080 transmits an update instruction to the counter updating unit 3050.

If judging the counter "count" not to be divisible by 64, the third counter judgment unit 3080 transmits an instruction to make a judgment to the second counter judgment unit 3070.

(4) Second Counter Judgment Unit 3070

Upon receiving an instruction to make a judgment from the third counter judgment unit 3080, the second counter judgment unit 3070 judges whether the counter "count" stored in the counter storage unit 3030 is divisible by 2, that is, whether the counter "count" is a multiple of 2.

If judging the counter "count" to be divisible by 2, the second counter judgment unit 3070 transmits, to the multiplier set updating unit 3160, an update instruction to update the multiplier set MT_i stored in the multiplier set storage unit 3130. Here, the value i is the largest integer no more than (b-count)/64.

If judging the counter "count" not to be divisible by 2, the second counter judgment unit 3070 transmits an update instruction to update the counter "count" to the counter updating unit 3050.

(5) Multiplier Selection Unit 3090

The multiplier selection unit 3090 selects a multiplier X_ij included in the multiplier set MT_i stored in the multiplier set storage unit 3130, using divided secret information D_count as an index j (j=D_count) with respect to the counter "count" stored in the counter storage unit 1030.

Figure 25:
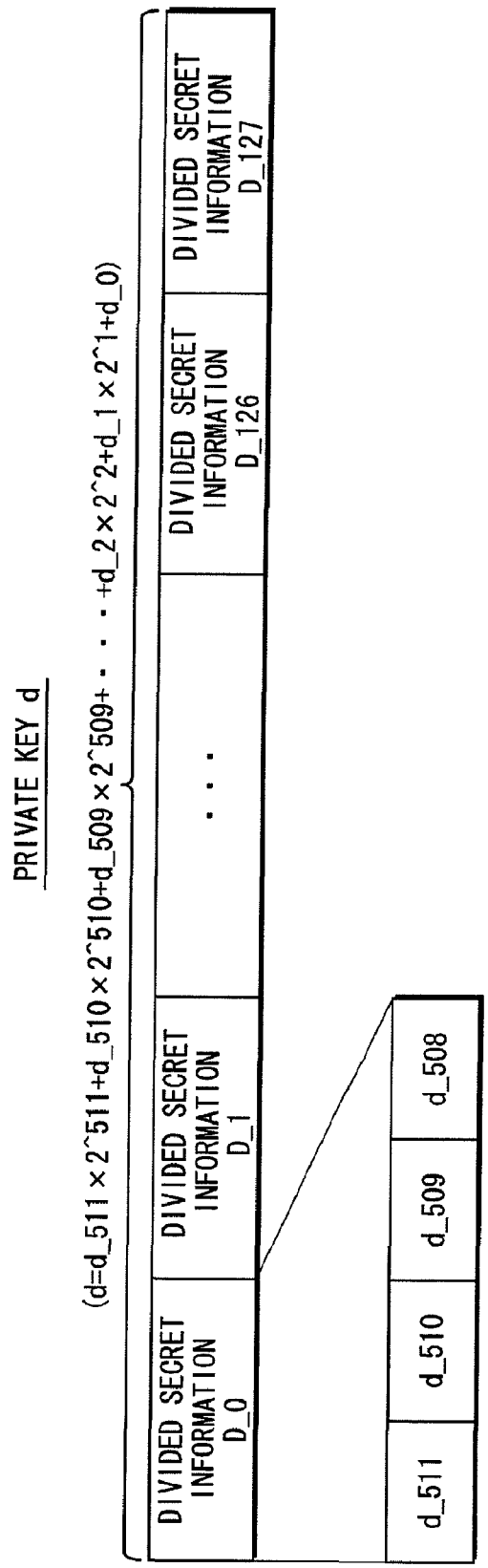
FIG. 25 shows an example of a plurality of pieces of divided secret information that constitute the private key d.

Here, the divided secret information D_count is information obtained by dividing a bit sequence of the private key d for each sw bits. For example, as shown in FIG. 25, when sw=4, the bit sequence of the private key d is divided into pieces of divided secret information each having 4 bits D_127, D_126, ..., D_1, D_0. Note that since each of the pieces of divided secret information D_127, D_126, ..., D_1, D_0 has 4 bits, each of the pieces of divided secret information has a different one of values between 0 and 15 inclusive represented in decimal. That is, the divided secret information D_count is any one of values between 0 and 15 inclusive. Accordingly, a multiplier X_ij corresponding to the divided secret information D_count is certainly stored in the multiplier set storage unit 3130.

(6) Multiplication Unit 3100

The multiplication unit 3100 multiplies the intermediate value Z stored in the intermediate value storage unit 3120 by the multiplier X_ij selected by the multiplier selection unit 3090, and stores a result of the multiplication in the intermediate value storage unit 3120.

Specifically, the multiplication unit 3100 executes Z←Z× X_ij mod n.

Here, the value i is the largest integer no more than (b-count)/64, and the value count is a counter stored in the counter storage unit 1030.

(7) Multiplier Set Determination Units 3150-0 and 3150-1

The multiplier set determination units 3150-0 and 3150-1 perform the same operations. Accordingly, a multiplier set determination unit 3150-i is described here. Note that the value i is 0 or 1.

The multiplier set determination unit 3150-i initializes the multiplier set MT_i stored in the multiplier set storage unit 2130.

Specifically, when the counter "count" is no less than 64, with respect to the target data X, the multiplier set determination unit 3150-i calculates X_i0, X_i1, X_i2, ..., X_i14, X_i15 using the random value R included in the random value set RT stored in the random value set storage unit 3140.

If the counter "count" is less than 64, the multiplier set determination unit 3150-i calculates X_i0, X_i1, X_i2, ..., X_i14, X_i15 using the cancellation value S included in the random value set RT.

Note that the multiplier set determination unit 3150-i calculates X_i0, X_i1, X_i2, ..., X_i14, X_i15 by respectively executing X_i0←RS mod n, X_i1←X×X_i0 mod n, X_i2←X×X_i1 mod n, ..., X_i15←X×X_i14 mod n (=X^15×RS mod n). Here, the value RS is R or S.

(8) Multiplier Set Updating Unit 3160

The multiplier set updating unit 3160 updates the multipliers X_i0 and X_i1 included in the multiplier set MT_i stored in the multiplier set storage unit 3130. Here, MT_i is a multiplier set determined by the multiplier set determination unit 3150-i.

Specifically, the multiplier set updating unit 3160 executes x_j0←X_j0^2 mod n, X_j 1←X×X_j0 mod n, X_j2←X× X_j1 mod n, ..., X_j15←X×X_j14 mod n.

3.2 Operations of Exponentiation Device 3000

(1) Whole Operations

Here, the operations of the exponentiation device 3000 are described with reference to flow charts shown in FIG. 26 and FIG. 27.

The input/output unit 3010 receives input of target data X, and stores the received target data X in the intermediate value storage unit 3120 (Step S600).

The input/output unit 3010 initializes the intermediate value Z to a value 1, and stores the initialized value in the intermediate value storage unit 3120 (Step S605).

The random value set determination unit 3190 generates a random value set RT, and stores the generated random value set RT in the random value set storage unit 3140 (Step S610).

The counter initialization unit 3040 initializes the counter "count" (Step S615). Here, the counter initialization unit 3040 assigns a value b (=(the smallest integer no less than lend/sw)−1) to the counter "count". Here, the value lend denotes the number of bits of the private key d, and sw=4.

The multiplier set determination unit 3150-i initializes MT_i stored in the multiplier set storage unit 3130, that is, initializes the multipliers X_i0 and X_i1, with use of the target data X and the random value set RT stored in the random value set storage unit 3140 (Step S620). Here, the value i is the largest integer no more than (b-count)/64.

The squaring unit 3110 squares the intermediate value Z stored in the intermediate value storage unit 3120, and newly stores a result of the square in the intermediate value storage unit 3120 as the intermediate value Z (Step S625).

The multiplier selection unit 3090 selects the multiplier X_ij from the multiplier set MT_i stored in the multiplier set storage unit 3130 (Step S630). Here, the value i is the largest integer no more than (b-count)/64, and j=D_count. The value D_count denotes the divided secret information with respect to the counter "count".

The multiplication unit 3100 multiplies the intermediate value Z stored in the intermediate value storage unit 3120 by the multiplier X_ij selected by the multiplier selection unit 3090, and stores a result of the multiplication in the intermediate value storage unit 1120 (Step S635).

The first counter judgment unit 3060 judges whether the counter "count" stored in the counter storage unit 3030 is 0 (Step S640).

If the counter "count" is judged to be 0 ("YES" in Step S640), the input/output unit 3010 outputs the intermediate value Z stored in the intermediate value storage unit 3120 (as a result of exponentiation) (Step S670).

If the counter "count" is judged not to be 0 ("NO" in Step S640), the third counter judgment unit 3080 judges whether the counter "count" stored in the counter storage unit 3030 is divisible by 64, that is, whether the counter "count" is a multiplier of 64 (Step S645).

If the counter "count" is judged to be divisible by 64 ("YES" in Step S645), the counter updating unit 3050 updates the counter "count" stored in the counter storage unit 3030 (Step S665). Specifically, the counter updating unit 3050 decrements the counter "count" stored in the counter storage unit 3030 (by 1), and newly stores a result of the decrement in the counter storage unit 3030 as the counter "count". Then, the flow returns to Step S620.

If the counter "count" is judged not to be divisible by 64 ("NO" in Step S645), the second counter judgment unit 3070 judges whether the counter "count" stored in the counter storage unit 3030 is divisible by 2, that is, whether the counter "count" is a multiplier of 2 (Step S650).

If the counter "count" is judged to be divisible by 2 ("YES" in Step S650), the multiplier set updating unit 3160 updates the multiplier set MT_i stored in the multiplier set storage unit 3130 (Step S655). Here, the value i is the largest integer no more than (b-count)/64.

The counter updating unit 3050 updates the counter "count" stored in the counter storage unit 3030 (Step S660). Specifically, the counter updating unit 3050 decrements the counter "count" stored in the counter storage unit 3030 (by 1), and newly stores a result of the decrement in the counter storage unit 3030 as the counter "count". Then, the flow returns to Step S625.

If the counter "count" is judged not to be divisible by 2 ("NO" in Step S650), the flow proceeds to Step S660, and returns to Step S625 after S660 completes.

(2) Determination Processing of Random Value Set RT

Figure 22:
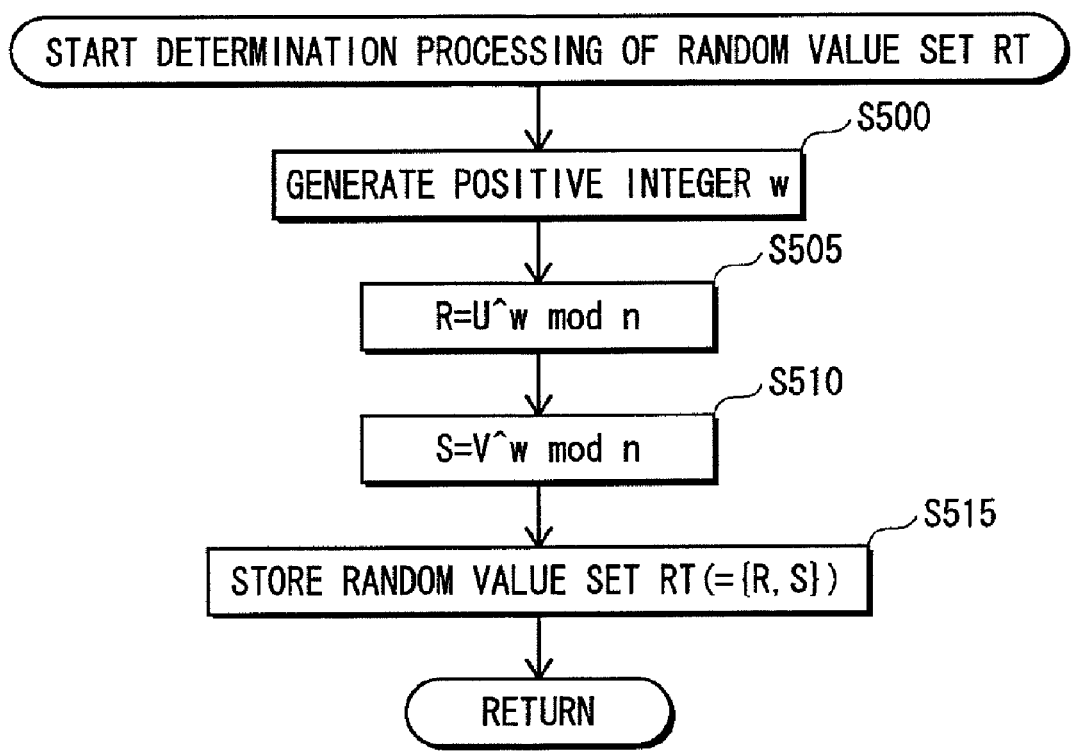
FIG. 22 is a flow chart showing operations of processing of determining a random value set RT.
Figure 26:
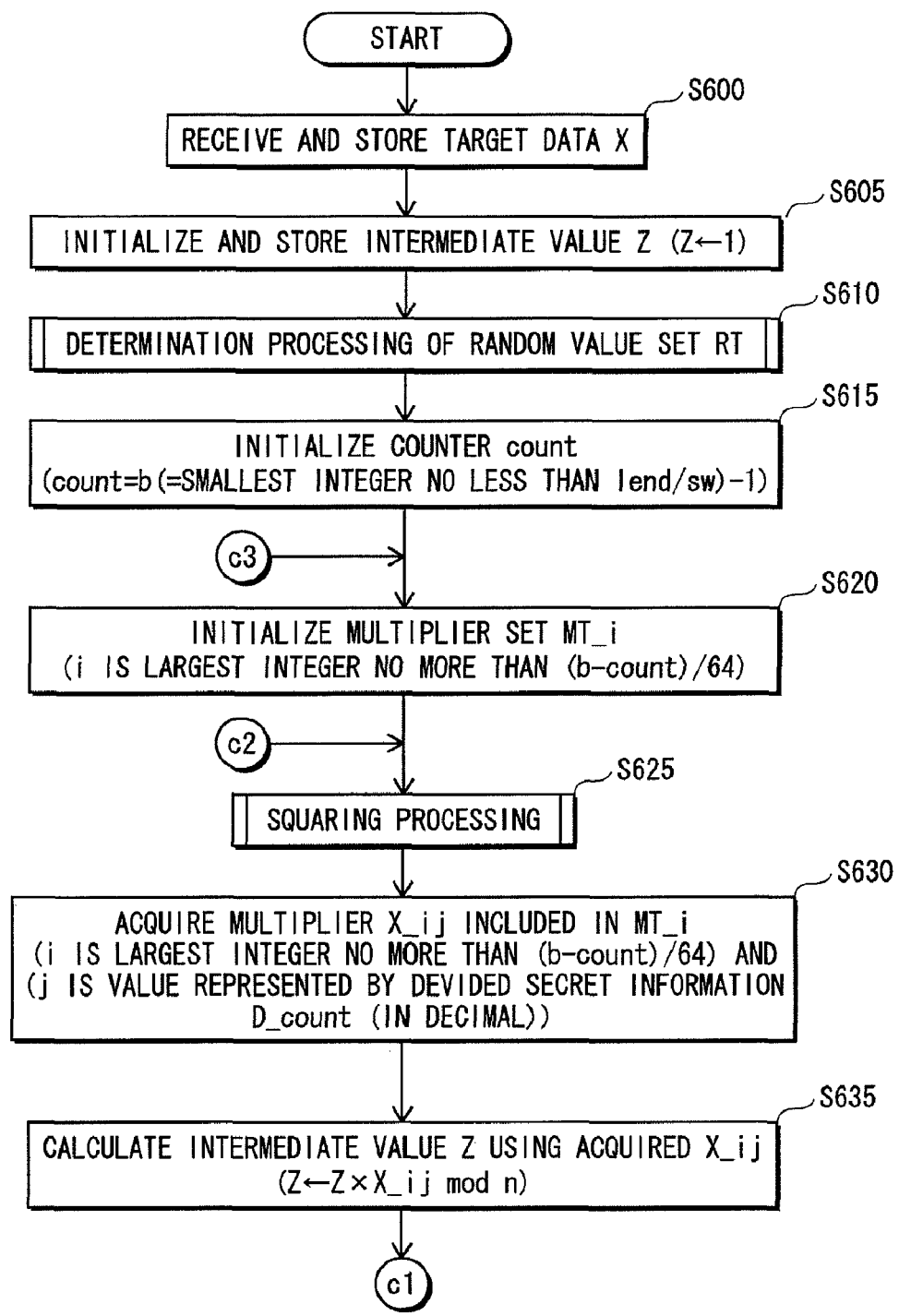
FIG. 26 is a flow chart showing operations of the exponentiation device 3000, continuing to FIG. 27.

The processing of determining the random value set RT performed in Step S610 shown in FIG. 26 is realized by using the operation flow that is the same as that shown in FIG. 22, and accordingly description thereof is omitted here.

(3) Initialization Processing of MT_i

Figure 28:
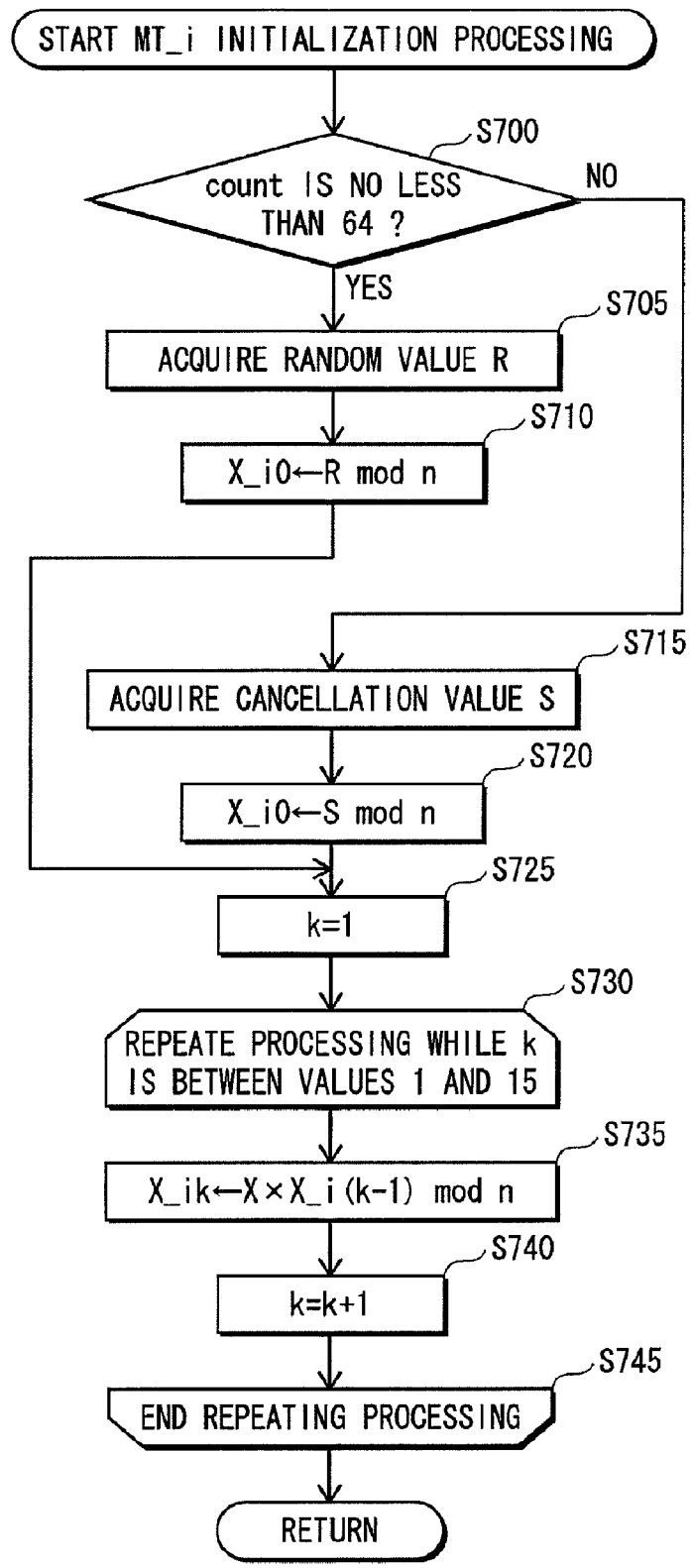
FIG. 28 is a flow chart showing operations of processing of initializing MT_i.

Here, the processing of initializing the multiplier set MT_i performed in Step S620 shown in FIG. 26 is described with reference to a flow chart shown in FIG. 28.

The multiplier set determination unit 3150-i judges whether the counter "count" is no less than 64 (Step S700). Here, the value i is the largest integer no more than (b-count)/64.

If judging the counter "count" to be no less than 64 ("YES" in Step S700), the multiplier set determination unit 3150-i acquires the random value R included in the random value set RT stored in the random value set storage unit 3140 (Step S705). The multiplier set determination unit 3150-i assigns the acquired random value R to the multiplier X_i0 (Step S710).

If judging the counter "count" not to be no less than 64 ("NO" in Step S700), the multiplier set determination unit 3150-i acquires the cancellation value S included in the random value set RT stored in the random value set storage unit 3140 (Step S715). The multiplier set determination unit 3150-i assigns the acquired cancellation value S to the multiplier X_i0 (Step S720).

The multiplier set determination unit 3150-i assigns a value 1 to a counter k (Step S725).

The multiplier set determination unit 3150-i repeatedly performs processing of Steps S730 to S745 while the counter k is between values 1 and 15 inclusive (Step S730).

The multiplier set determination unit 3150-i assigns a result of multiplication of the target data X by a multiplier X_i(k−1) to a multiplier X_ik (Step S735).

The multiplier set determination unit 3150-i increments the counter k by a value 1, and newly assigns a result of the increment to the counter k (Step S740).

(4) Square Processing

Figure 29:
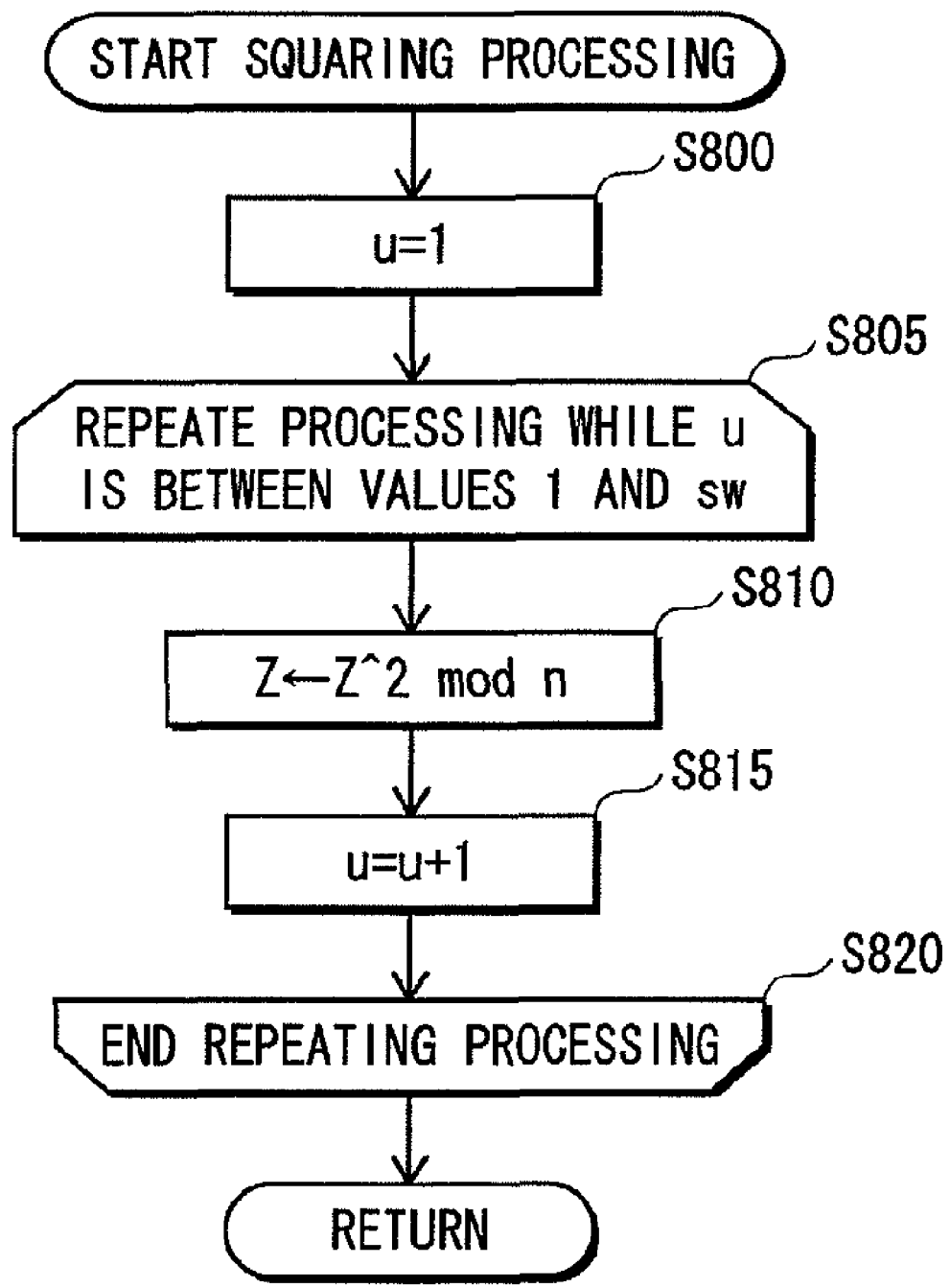
FIG. 29 is a flow chart showing operations of processing of squaring operations.

Here, the square processing performed in Step S625 shown in FIG. 26 is described with reference to a flow chart shown in FIG. 29.

The squaring unit 3110 assigns a value 1 to a counter u (Step S800).

The squaring unit 3110 repeatedly performs processing of Steps S810 to S820 while the counter u is between values 1 and sw inclusive (here, sw=4) (Step S805).

The squaring unit 3110 squares the intermediate value Z stored in the intermediate value storage unit 3120, and newly stores a result of the square in the intermediate value storage unit 3120 as the intermediate value Z (Step S810).

The squaring unit 3110 increments the counter u by a value 1, and newly assigns a result of the increment to the counter u (Step S815).

As a result, the exponentiation device 3000 calculates $Z^{16}$ by performing square once.

(5) Update Processing of MT_i

Figure 27:
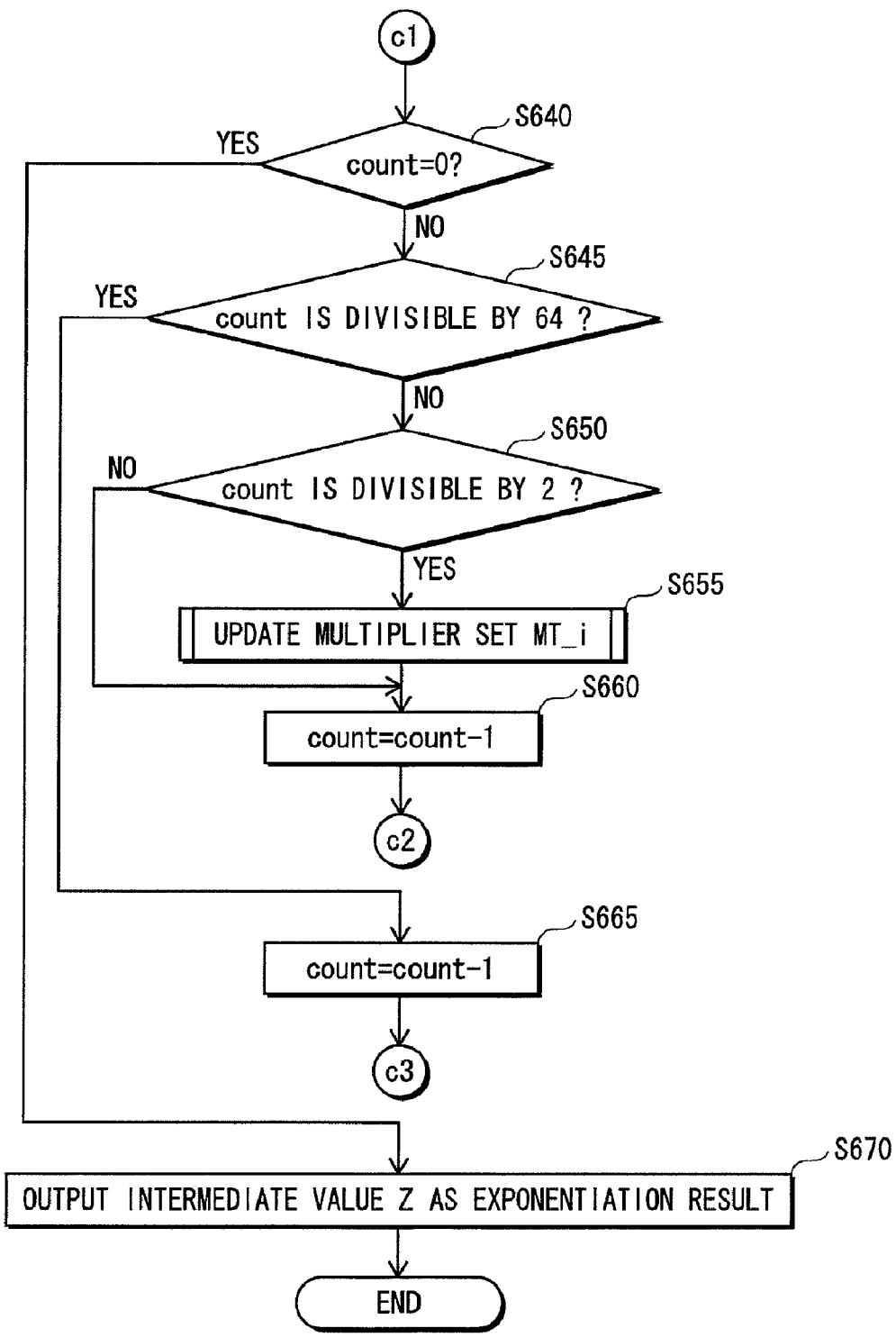
FIG. 27 is a flow chart showing the operations of the exponentiation device 3000, continuing from FIG. 26.
Figure 30:
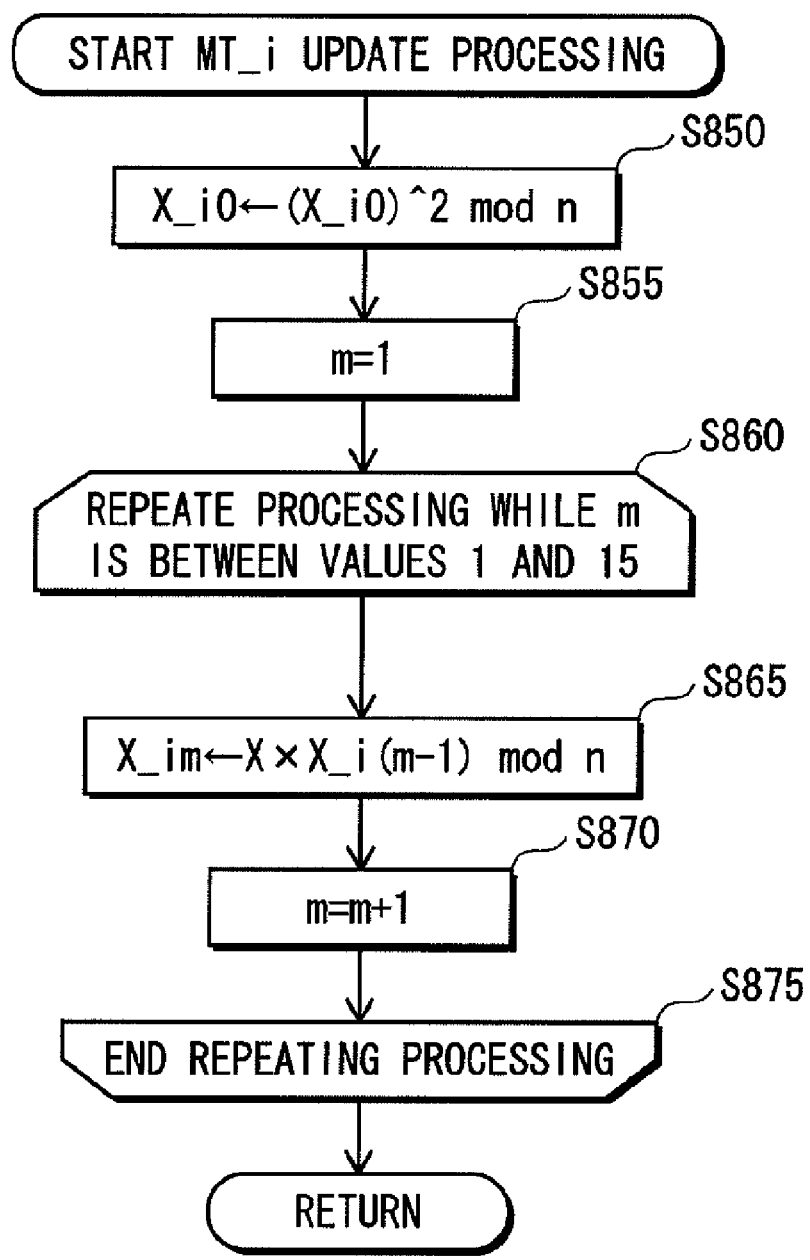
FIG. 30 is a flow chart showing operations of processing of updating MT_i.

Here, the processing of updating the multiplier set MT_i performed in Step S655 shown in FIG. 27 is described, with reference to a flow chart shown in FIG. 30.

The multiplier set updating unit 3160 squares X_i0 included in MT_i stored in the multiplier set storage unit 3130, and newly assigns a result of the square to X_i0 (Step S850).

The multiplier set updating unit 3160 assigns a value 1 to a counter m (Step S855).

The multiplier set updating unit 3160 repeatedly performs processing of Steps S865 to S875 while the counter m is between values 1 and 15 inclusive (Step S860).

The multiplier set updating unit 3160 assigns a result of multiplication of the target data X by a multiplier X_i (m−1) to a multiplier X_im (Step S865).

The multiplier set updating unit 3160 increments the counter m by a value 1, and newly assigns a result of the increment to the counter m (Step S870).

3.3 Effects of Third Embodiment

In the third embodiment, the multiplier set updating unit 3160 updates the multipliers to be used for the intermediate value Z, that is, X_i0, X_i1, . . . , X_i15 (i is 0 or 1) for each block having 2×4=8 bits. Accordingly, multipliers are different for each block, like the first and second embodiments. As a result, it is possible to prevent the Big Mac Attack which attempts to acquire the private key d by analyzing a multiplier of d.

Also, in the third embodiment, it is unnecessary for performing cancellation operation even when exponentiation based on the window method is performed. Here, a window width is four bits, and the private key d having 512 bits is divided into 64 windows.

The following describes why the cancellation operation is unnecessary.

That is, a window in which the random value R is acquired is paired with a window in which the cancellation value S corresponding to the random value R is included, such that after the random value R is repeatedly squared predetermined times (64 times, here), the influence of the random value R ($R^{(2^{256})}$ mod n) is cancelled by using the cancellation value S.

4. Modification Examples

The embodiments described above are simply implementation examples of the present invention. It should be noted that the present invention is not limited to these embodiments, and may be implemented in various embodiments that do not depart from the scope of the present invention. For example, cases such as the following are included in the present invention.

(1) The bit size of the private key d according to the first to the third embodiments is not limited to be 512. Alternatively, the bit size of the private key d may be 1024 or 2048. Also, the exponentiation device executes $X^d$ mod n. It may be possible to execute $X^d$ mod n in the following way. dp=d mod p−1 and dq=d mod q−1 are determined, $X^{dp}$ mod p and $X^{dq}$ mod q are executed using the Chinese Remainder Theorem. Here, it may be possible to use the exponentiation device for executing $X^{dp}$ mod p and $X^{dq}$ mod q. In this case, $X^{dp}$ mod p is calculated for example by performing an exponentiation using mod p instead of mod n, which is used by the multiplication unit and the like. Here, X included in $X\_i1 \leftarrow X \times X\_i0$ mod p (i=0 or 1) for determining a multiplier set may be a result of mod p. Alternatively, by using a result of mod n as X instead, X mod p is calculated depending on X as an input. It is possible to prevent information of p from being leaked due to an electrical power measured at the time of calculation of X mod p. Also, the same applies to the case a result of mod p is used as X.

(2) Each of the second counter judgment units of the first and second embodiments judges whether the counter is divisible by 8. Alternatively, it may be possible to judge whether the value is divisible by a value other than 8, for example 4. Further alternatively, the second counter judgment unit may store therein a table including a plurality of positive integers, and judge whether the counter matches any one of the positive integers included in the table. Note that the positive integers included in the table may be random values, in addition to regular values such as multiples of 8. Also, in such a case, the value u varies based on what value the positive integer is, too.

Likewise, in the third embodiment, the second counter judgment unit may judge whether the counter is divisible by a value other than 2 such as 4. Further alternatively, the second counter judgment unit may store therein a table including a plurality of positive integers, and judge whether the counter matches anyone of the positive integers included in the table.

(3) The third counter judgment unit of the first embodiment judges whether the counter is divisible by 16, and determines a multiplier set based on a result of the judgment. Alternatively, the third counter judgment unit may judge whether the counter is divisible by an exponent of 2 such as 32 and 64, for example. Further alternatively, the third counter judgment unit may judge whether the counter is an odd number.

(4) Each of the multiplier set updating units of the first to the third embodiments squares a multiplier $X\_i0$ (i is a value between 0 and 31 inclusive) included in a multiplier set. Alternatively, the multiplier $X\_i0$ may be cubed, for example. In other words, the multiplier $X\_i0$ only has to be updated using the multiplier $X\_i0$ that has yet not been updated.

(5) In the first embodiment, the number of random value sets is 32. Alternatively, for example, if the number of variations of multiplier sets, that is, the number of variations of combinations of pieces of random value selection information to be included in the array RSI is approximately $2^{32}$, the number of random value sets may be 26. Generally, when the number of random value sets is g, the number of variations of multiplier sets is a factorial of g/2.

(6) In the first and second embodiments, calculations are performed by making judgments on bits of an exponent in the direction from the higher-order bits to the lower-order bits. Alternatively, calculations may be performed by making judgments on bits of an exponent in the direction from the lower-order bits to the higher-order bits.

In such a case, the squaring unit squares not an intermediate value but a multiplier set that has been determined immediately before so as to update the multiplier set. Also, the multiplier set updating unit is unnecessary. The multiplier set determination unit that firstly performs calculation shields a multiplier set using R. In other words, the multiplier set $MT\_0$ is changed with respect to the lower bits of the exponent for each of the bits as follows: $(R, X \times R) \Rightarrow (R^2, (X \times R)^2) = (R^4, (X \times R)^4) \Rightarrow \ldots \Rightarrow (R^{(2^{255})}, (X \times R)^{(2^{255})})$. Here, $(R, X \times R)$ denotes $X\_00 = R$ and $X\_01 = X \times R$. Furthermore, a multiplier set determination unit that secondarily performs calculation shields the multiplier set using $(S \times R^{(2^{255})})$. At this time, a multiplier set $MT\_1$ is acquired by multiplying multipliers included in a precedent multiplier set $MT\_0$ by S respectively. Before these multiplications are performed, the squaring unit squares multipliers included in the multiplier set $MT\_0$, respectively. In other words, the squaring unit executes $MT\_0 = (R^{(2^{255})}, (X \times R)^{(2^{255})}) \Rightarrow MT\_0 = (R^{(2^{256})}, (X \times R)^{(2^{256})}) \Rightarrow MT\_1 = (S \times R^{(2^{256})}, S \times (X \times R)^{(2^{256})})$. As a result, the multipliers included in $MT\_1$ are $S \times R^{(2^{256})}$ and $S \times (X \times R)^{(2^{256})}$.

Furthermore, the random value seed U and the cancellation value seed V stored in the random value seed storage unit of the second embodiment are determined such that $V = U^{(-2^{256}-1)}$ is satisfied. This makes the relation between R and S satisfy $S = R^{(-2^{256}-1)}$. As a result, the above multipliers included in $MT\_1$ are $S \times R^{(2^{256})} = R^{(-1)}$ and $S \times (X \times R)^{(2^{256})} = X^{(2^{256})} \times R^{(-1)}$. Then, by performing multiplication using the multiplier set $MT\_1$, it is possible to cancel the influence of the random value R due to multiplication performed using $(R, X \times R)$ that is an initial value of $MT\_0$. Regarding the subsequent bits, the squaring unit performs squares as follows: $(R^{(-2)}, X^{(2^{257})} \times R^{(-2)}), (R^{(-4)}, X^{(2^{258})} \times R^{(-4)}), \ldots, (R^{(-255)}, X^{(2^{511})} \times R^{(-255)})$. Accordingly, it is also possible to cancel the influences of the random values with respect to the lower-order bits by respectively performing operation processing with respect to the higher-order bits that one-to-one correspond to the lower-order bits.

Also, in the first embodiment, the random value $R\_i$ and the cancellation value $S\_i$ included in the random value set $RT\_i$ may be determined to be any value as long as $S = R^{(-2^{256}-1)}$ as described above.

(7) In the first to the third embodiments, a plurality of multiplier sets are determined respectively. Alternatively, the following may be possible. One multiplier set is used, and the multiplier set determination unit replaces a result of calculation to be included in the one multiplier set.

(8) A random value set is generated in the following way. Part or all of the random values and part or all of the cancellation values stored in the random value set storage unit of the first embodiment are determined to be a random value seed and a cancellation value seed respectively. The random value seed and the cancellation value seed are squared respectively, and results of the squares are multiplied by each other. Alternatively, it may be possible to combine the first embodiment and the third embodiment in the same way.

(9) In the first to the third embodiments, the random value and the cancellation value are stored in advance, or the random value seed and the cancellation value seed are stored in advance. Alternatively, it may be possible to calculate the above values or value seeds based on the private key at a time of firstly performing encryption processing, and then store the calculated values or value seeds. Such a structure makes it unnecessary to store the random value and the cancellation value at the time of the manufacture of the device. Also, the private key may be given from outside. Furthermore, it may be possible to calculate and use the random value and the cancellation value based on the private key each time encryption processing is performed.

(10) The random value according to the first to the third embodiments may be any value. It may be possible to use a private key, a public key, a value stored for the purpose other than exponentiation. Also, in the case where the Chinese Remainder Theorem is used, it may be possible to use the same value for a random value Rp included in mod p and a random value Rq included in mod q. This can reduce the size of the memory. Alternatively, it may be possible to use a cancellation value instead of the random value. In either case, the relation between the random value and the cancellation value needs to be maintained.

(11) Against the differential power analysis in the first to the third embodiments, it may be possible to additionally perform other countermeasure such as the Exponent Blinding. When the Exponent Blinding is used, an exponent randomly changes each time. This improves the security more.

(12) In the second embodiment, in the case where the Chinese Remainder Theorem is used, the following may be employed. Firstly, a random value seed and a cancellation value seed of mod p are respectively raised to the w-th power. After an exponentiation using a multiplier set of mod p completes, a random value seed and cancellation value seed of mod q are respectively raised to the w-th power. Then, a storage region of the random value seed and the cancellation value seed is rewritten. This can reduce the size of the memory for storing the random value and the cancellation value.

(13) In the second embodiment, power operation of a value raising to the w-th is performed using a conventional method. Alternatively, this power operation may be performed using a method to which a countermeasure against the differential power analysis is added. This improves the security more.

(14) In the first to the third embodiments, the influence of the random value is cancelled using a combination of the random value and the cancellation value. Alternatively, it may be possible to cancel the influence of the random value using a combination of no less than three random values. In this case, a random value set is a pair of random values that cancels each other.

Figure 31:
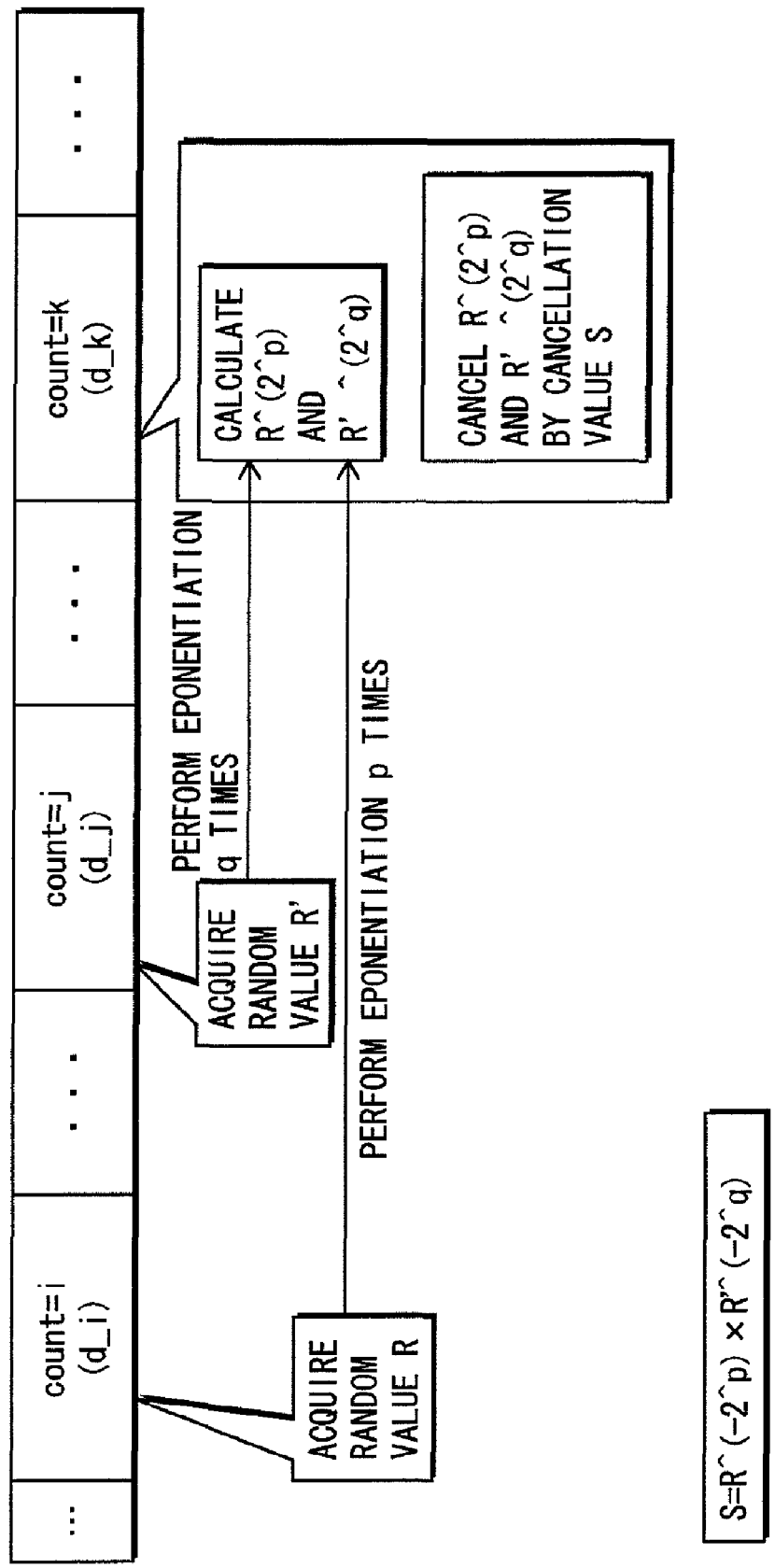
FIG. 31 shows an example in which influences that random values R and R' exert on operations are cancelled by using the two random values R and R' and one cancellation value S.

(14-1) The following describes a case where the influence of the random values R and R' is cancelled using the cancellation value S with reference to FIG. 31. For simplification of the description, the cases where count=i, j, and k are focused.

Here, when count=i, the random value R is acquired firstly. When count=j, the updated random value R' is acquired firstly. Also, when count=k, the influence of the random values R and R' are cancelled, and $S=R^{\wedge}(-2^{\wedge}p) \times R'^{\wedge}(-2^{\wedge}q)$ is satisfied.

As shown in FIG. 31, when count=i, the random value R is acquired. When count=j, the random value R' is acquired. When count=k, square is performed using the random values R and R'. Accordingly, squares are performed using the random values R and R' respectively p times and q times.

Then, when count=k, multiplication is performed (for example, Step S135 or S140 shown in FIG. 5). Accordingly, results of operations of the random values R and R' ($R^{\wedge}(2^{\wedge}p)$ and $R'^{\wedge}(2^{\wedge}p)$) are cancelled using a cancellation value $S (=R^{\wedge}(-2^{\wedge}p) \times R'^{\wedge}(-2^{\wedge}q))$.

At this time, the exponentiation device may store therein beforehand a combination of three values including the random values R and R' and the cancellation value S.

Also, the exponentiation device may store therein beforehand four combinations using the random values R and R' and the cancellation values S_1 and S_2 respectively corresponding to the random values R and R', and calculate a cancellation value S using the cancellation values S_1 and S_2.

Note that the cancellation value S may be calculated at any time before operations for cancelling the results of operations of the random values R and R' ($R^{\wedge}(2^{\wedge}p)$ and $R'^{\wedge}(2^{\wedge}p)$) are performed.

(14-2) In a case where the influence of the random value R is cancelled using the cancellation values S and S', the relation between the random value R and the cancellation value S and the relation between the random value R and the cancellation value S' are defined as follows. Note that, when the random value R is acquired and multiplied by the cancellation value S, the random value R is squared i times.

The relation between the random value R and the cancellation value S is defined as $S=R^{\wedge}(-2^{\wedge}i)$. The relation between the random value R and the cancellation value S' is defined as $S'=R^{\wedge}(-2^{\wedge}(i+1-j))$. Note that the value j is an integer less than the value i.

In this case, immediately after the random value R is squared i times, multiplication is performed using a cancellation value $S (=R^{\wedge}(-2^{\wedge}i))$. As a result, a part of the value $R^{\wedge}(2^{\wedge}i)$ is cancelled, and a value $R^{\wedge}(2^{\wedge}(i-j))$ remains. This value $R^{\wedge}(2^{\wedge}(i-j))$ is squared, and a result of the square is a value $R^{\wedge}(2^{\wedge}(i-j+1))$. By multiplying the value $R^{\wedge}(2^{\wedge}(i-j+1))$ by a cancellation value $S' (=R^{\wedge}(-2^{\wedge}(i+1-j)))$, the value $(2^{\wedge}(i-j+1))$ is cancelled.

(15) The present invention may perform scalar multiplication over an elliptic curve instead of performing exponentiation. In this case, multiplication and square performed by the exponentiation device 1000 are respectively replaced with elliptic curve addition and elliptic curve doubling. Also, an "exponent" is replaced with a "scalar".

Specifically, the multiplication "Z←Z×Xi0" described in the first embodiment is replaced with elliptic curve addition "Z←Z+Xi0". The multiplication "Z←Z×Xi1 (=Z×X×RS)" is replaced with elliptic curve addition "Z←Z+Xi1 (=Z+X+RS)". Also, the square "Z←Z^2" described in the first embodiment is replaced with elliptic curve doubling "Z←2*Z (=Z+Z)".

The following shows a specific example of a case where scalar multiplication over an elliptic curve is calculated.

Figure 32:
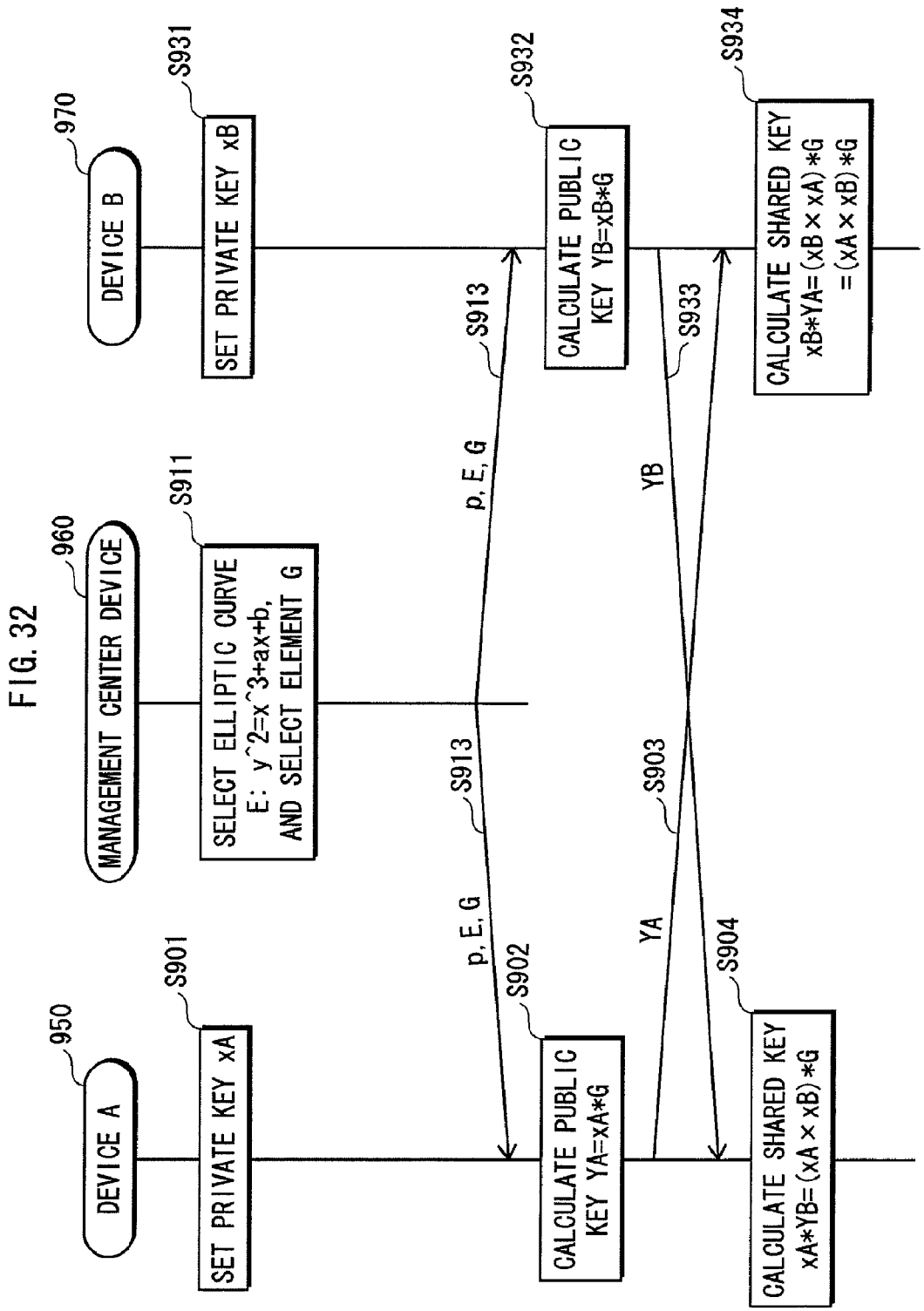
FIG. 32 is a flow chart showing operations of an example of key sharing between a device A and a device B using the elliptic curve.

Here, the following describes an example of key sharing between a device A and a device B with reference to a flowchart shown in FIG. 32.

The device A sets a private key xA, and stores therein the private key xA (Step S901). Also, the device B sets a private key xB, and stores therein the private key xB (Step S931).

There exists a management center that stores therein an elliptic curve. The management center has installed therein a management center device 960. The management center device 960 installed in the management center selects appropriate parameters a and b of an elliptic curve E: $y^2=x^3+ax+b$, and stores therein the selected parameters a and b. Also, the management center device 960 selects a prime p and an appropriate element G on the elliptic curve E, and stores therein the selected prime p and element G (Step S911).

The management center device 960 reveals the prime p, the elliptic curve E, and the element G (Step S913).

The device A calculates a public key YA=xA*G (Step S902), and outputs the calculated public key YA to the device B (Step S903). Also, the device B calculates a public key YB=xB*G (Step S932), and outputs the calculated public key YB to the device A (Step S933).

Then, the device A calculates a shared key xA*YB (Step S904). Here, the shared key xA*YB=(xA×xB)*G is satisfied.

On the other hand, the device B calculates a shared key xB*YA (Step S934). Here, the shared key xB*YA=(xB×xA)*G=(xA×xB)*G=xA*YB is satisfied.

In this way, the device A and the device B can share the same session key.

Here, the discrete logarithm problem on the elliptic curve is used as the basis for the security.

Also, the symbol "*" denotes multiple addition of an element included in the elliptic curve. x*G denotes addition of a base point G to itself x times, as follows.

$$x*G=G+G+G+\ldots+G$$

Next, the following simply describes elliptic curve exponentiation over the elliptic curve.

As an example, 100*P is calculated.

When 100*P=2 (2 (P+2 (2 (2 (P+2P))))) is satisfied, 100*P is calculated by performing doubling six times and addition twice using a point on the elliptic curve.

In this way, the elliptic curve exponentiation amounts to operation using doubling and addition.

Here, an elliptic curve is defined by an equation of the form $y^2=x^3+ax+b$, a point P on the elliptic curve is represented by coordinates (x1,y1), and a point Q on the elliptic curve is represented by coordinates (x2,y2). Here, a point R on the elliptic curve defined by R=P+Q is represented by coordinates (x3,y3).

If the point P is not equal to the point Q, R=P+Q amounts to addition. The following shows addition formulas.

$$x3=\{(y2-y1)/(x2-x1)\}^2-x1-x2$$

$$y3=\{(y2-y1)/(x2-x1)\}(x1-x3)-y1$$

If the point P is equal to the point Q, R=P+Q=P+P=2×P is satisfied, and R=P+Q amounts to doubling. The following shows doubling formulas.

$$x3=\{(3\times x1^2+a)/(2\times y1)\}^2-(2\times x1)$$

$$y3=\{(3\times x1^2+a)/(2\times y)\}(x1-x3)-y1$$

Here, the above operations are operations over a finite field defining an elliptic curve.

For details on formulas of elliptic curve exponentiation, see "Efficient Elliptic Curve Exponentiation" (Miyaji, Ono, and Cohen, Advances in Cryptology-Proceedings of ICICS '97, Lecture Notes in Computer Science, 1997, Springer-Verlag, pp. 282-290.)

(16) The group described in the present invention corresponds to a residue field that is a set of "mod n" described in the first to the third embodiments and the elliptic curve according to the above modification example (15).

Here, the group described here is a group G having the characteristics (G0) to (G3) shown below.

(G0) With respect to two arbitrary elements a and b included in the group G, a product ab is defined, and the product ab belongs to the group G.

(G1) With respect to three arbitrary elements a, b, and c included in the group G, (ab)c=a(bc) is satisfied (associative law).

(G2) With respect to an arbitrary element a included in the group G, an element e that satisfies ae=ea is included in the group G (existence of a unit element).

(G3) With respect to an arbitrary element a included in the group G, an element b that satisfies ab=ba=e is included in the group G (existence of an inverse element).

Note that the group is defined over the residue field. Alternatively, by replacing the product with a sum in the above definition, the group is defined over the elliptic curve.

Also, the basic operation and the window operation used in the present invention respectively correspond to the multiplication described in the first to the third embodiments and the elliptic curve addition described in the above modification example (15).

Also, the carry operation corresponds to the square ($v^2$) described in the first to the third embodiments and the elliptic curve doubling (2*v) described in the above modification example (15).

(17) The present invention may be, instead of the exponentiation device, a decryption device employing the RSA encryption or a signature generation device employing the RSA signature that use the exponentiation device. Alternatively, the present invention may be an information security device that performs exponentiation using secret information as an exponent. For example, the present invention may be a decryption device employing the ElGamal encryption or a signature generation device employing the DSA signature.

(18) The above embodiments and modification examples are applied to the following cases.

(18-1) The above embodiments and modification examples may be applied to decryption of ciphertext and generation of signature data in accordance with the public key encryption scheme. These applications have been described above as a result of exponentiation of target data X.

(18-2) The above embodiments and modification examples may be applied to authentication. Authentication refers to verifying that a message has been sent by a person who is who he/she claims to be, or verifying that a message has not been tampered with. The above embodiments and modification examples may be applied to authentication of identity. Authentication of identity refers to verifying that a party has an access right to data, or has an access right to a facility (a right of entry). Furthermore, the described embodiments and modification examples can be applied to non repudiation. Denial prevention refers to, for instance, counteracting a party who claims not to have agreed to something despite actually having agreed.

(18-3) The above embodiments and modification examples may be applied to key exchange. Key exchange refers to two people using a broadcast wave to share a private key for using in a certain private key encryption scheme.

(18-4) The above embodiments and modification examples may be applied in coin tossing (also known as bit commitment). Coin tossing refers to, for instance, two chess players who live in different cities using e-mail to decide which player will be white.

(18-5) The above embodiments and modification examples may be applied to secret sharing. Secret sharing refers to, for instance, certain secret information being usable to k people who work together, but not being usable to only k−1 of the people.

(18-6) The above embodiments and modification examples may be applied to Zero-Knowledge Proof. Zero-knowledge Proof refers to, for instance, a party that has succeeded in solving an arithmetic or combination logic problem convincing another party of the solving by providing only a minimal amount of information, i.e., only the solution.

(19) In the first embodiment, with respect to all the bits of the private key d, a random value R or a cancellation value S is used in Step S135 or S140.

Alternatively, it may be possible to perform multiplication using a random value R with respect to each of one or more specific bits. A random value R acquired with respect to each of the one or more specific bits is repeatedly squared predetermined times. With respect to a bit that is an operation target and immediately subsequent to the specific bit, multiplication is performed using a cancellation value S corresponding to the random value R. As a result, it is possible to cancel an influence of the squares of the random value R acquired with respect to the specific bit. Here, the specific bit is a bit other than the lowest-order bit.

The following gives the description taking a case where the number of one or more specific bits is one.

With respect to the i-th bit between the 511-th and the 256-th bit inclusive, multiplication is performed using a random value R. Then, with respect to the (i−256)-th bit, that is, a bit that is an operation target and immediately subsequent to a bit in which square has been repeatedly performed 256 times, multiplication is performed using a cancellation value S corresponding to the random value R. At this time, with respect to each of other bits, as is conventionally done, if a value of the bit is 0, an intermediate value Z is multiplied by 1. Also, if the bit has a value 1, the intermediate value Z is multiplied by target data X.

Likewise, in the second embodiment, with respect to each of one or more specific bits, multiplication is performed using a random value R. Here, the specific bit is a bit other than the lowest-order bit.

Likewise, in the third embodiment, with respect to each of one or more specific windows, multiplication is performed using a random value R. Here, the specific window is a window other than the lowest-order window.

(20) In the above first and second embodiments, the exponentiation device may update a random value to be used for multiplication for each bit.

Likewise, in the above third embodiment, the exponentiation device may update a random value to be used for multiplication for each window.

(21) In the first embodiment, the operation expression to be used by the multiplication unit of the exponentiation device may be $X\_i$ ($=X^{\wedge}(di) \times RS\_(RSI\_i)$). Here, the value $RS\_(RSI\_i)$ is equal to $R\_(RSI\_i)$ or $S\_(RSI\_i)$.

This is because when $d\_i$ is 0, $X^{\wedge}(d\_i)=1$ is satisfied. Accordingly, $X\_i=R(RSI\_i)$ is satisfied, and $X\_i$ is equal to $X\_i0$. Also, when $d\_i$ is 1, $X^{\wedge}(d\_i)=X$ is satisfied. Accordingly, $X\_i=X \times R (RSI\_i)$ is satisfied, and $X\_i$ is equal to $X\_i1$.

Likewise, in the second embodiment, an operation expression to be used by the multiplication unit of the exponentiation device may be $X\_i$ ($=X^{\wedge}(d\_i) \times RS$). Here, the value RS is R or S.

Likewise, in the third embodiment, a formula to be used by the multiplication unit of the exponentiation device may be $X\_i$ ($=X^{\wedge}w \times RS$). Here, the value RS is R or S, and the value w is a value of a window.

(22) Each of the above described devices is specifically a computer system composed of a microprocessor, a ROM, a RAM, a hard disk unit, a display unit, a keyboard, a mouse, and so on. The RAM or the hard disk unit has stored therein a computer program. Functions of each of the devices are achieved by the microprocessor operating in accordance with the computer system. Here, the computer program is composed of combinations of instruction codes each indicating an instruction to a computer so as to achieve predetermined functions.

(23) Part or all of the compositional elements of each of the above devices may be composed of one system LSI (Large Scale-integration). The system LSI is a super-multifunctional LSI on which a plurality of compositional units are integrated on one chip, and is specifically a computer system composed of a microprocessor, a ROM, a RAM, and so on. The RAM has stored therein a computer program. The LSI achieves its functions by the microprocessor operating in accordance with the computer program.

Also, the compositional elements of each of the above devices may be separately integrated into one chip, or integrated into one chip including part or all of the compositional elements.

Also, although the system LSI is used here, the system LSI may be called an IC, an LSI, a super LSI, and an ultra LSI, depending on the integration degree. Also, a method of forming integrated circuits is not limited to LSIs, and may be realized using a dedicated circuit or a general-purpose processor. Furthermore, it may be possible to use an FPGA (Field Programmable Gate Array) programmable after manufacturing LSIs or a reconfigurable processor in which connection and setting of a circuit cell inside an LSI can be reconfigured.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

(24) Part or all of the compositional elements of each of the above devices may be composed of a removable IC card or a single module. The IC card or the single module is a computer system composed of a microprocessor, a ROM, a RAM, and the like. The IC card or the module may include the above-described super-multifunctional LSI. Functions of the IC card or the module are achieved by the microprocessor operating in accordance with the computer program. The IC card or the module may be tamper-resistant.

(25) The present invention may be the above method. Also, the present invention may be a computer program that realizes the method by a computer or a digital signal composed of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc), and a semiconductor memory, which stores the computer program or the digital signal. Furthermore, the present invention may be the computer program or the digital signal stored in the storage medium.

Furthermore, the present invention may be the computer program or the digital signal transmitted via an electric communication network, a wireless or wired communication network, a network such as the Internet, data broadcasting, and the like.

Furthermore, the present invention may be a computer system that includes a microprocessor and a memory, the memory storing the computer program, and the microprocessor operating in accordance with the computer program.

Furthermore, the present invention may be implemented by another computer system, by transmitting the computer program or digital signal stored in the storage medium to the other computer system, or by transmitting the computer program or digital signal to the other computer system via the network.

(26) The present invention may be any combination of the above-described embodiments and modifications.

5. Conclusion (1) The present invention is an exponentiation device that inputs target data, and outputs a result of an exponentiation of the target data using secret information as an exponent, the secret information indicating the number of secrets, the exponentiation device comprising: an input/output unit operable to receive input of the target data, and output the result of the exponentiation of the target data; a secret information storage unit operable to store therein the secret information; an intermediate value storage unit operable to store therein an intermediate value; a secret information judgment unit operable to make a judgment on the secret information; a multiplier set storage unit operable to store therein a plurality of multiplier sets each including a plurality of multipliers; a random value set storage unit operable to store therein a random value set including a plurality of random values; a plurality of multiplier set determination units respectively operable to determine the plurality of multiplier sets based on the plurality of random values included in the random value set, and store the determined multiplier sets in the multiplier set storage unit; a multiplication unit operable to perform, for each of the plurality of multiplier sets, a multiplication of the intermediate value by any one of the multipliers included in the multiplier sets based on a result of the judgment made by the secret information judgment unit, and store a result of the multiplication in the intermediate value storage unit; a squaring unit operable to square the intermediate value, and store a result of the square in the intermediate value storage unit; and a multiplier set updating unit operable to update each of the multiplier sets based on any one of the multipliers included in the multiplier set, and store the updated multiplier set in the multiplier set storage unit, wherein a multiplier to be used by the multiplication unit is selected from among the plurality of multipliers stored in the multiplier storage unit based on the result of the judgment made by the secret information judgment unit, and an influence of the random value determined by the multiplier set determination unit is cancelled, by using a combination of processing performed by any one of the plurality of multiplier set determination units, a multiplier set determination unit among plurality of multiplier set determination units that is other than the any one multiplier set determination unit, the multiplication unit that performs multiplications respectively using the multiplier sets determined by the plurality of multiplier set determination units, the squaring unit, and the multiplier set updating unit.

(2) According to the exponentiation device of the above modification example (1), the number of the multiplier set determination units to be included in the combination of processing may be just two.

(3) According to the exponentiation device of the above modification example (2), the number of the multiplier set determination units to be included in the exponentiation device may be two, and the number of the multiplier sets to be determined respectively by the multiplier set determination units is one.

(4) The exponentiation device of the above modification example (3) may further comprise a counter storage unit operable to store therein a counter; a counter updating unit operable to update the counter; and a counter judgment unit operable to judge what value the counter indicates, wherein the secret information judgment unit may make the judgment based on the counter, and the multiplier set updating unit may update the multiplier based on a result of the judgment made by the counter updating unit.

(5) According to the exponentiation device of the above modification example (4), one of the plurality of multiplier set determination units that firstly performs processing is a first multiplier set determination unit. The first multiplier set determination unit performs processing before the multiplication unit and the squaring unit perform processing. Also, one of the multiplier set determination units that secondly performs processing is a second multiplier set determination unit. The second multiplier set determination unit performs processing if the counter judgment unit judges that the counter is in the middle of a bit sequence of the exponent.

(6) The exponentiation device of any of the above modification examples (2) to (5) may further comprise a random value set determination unit operable to determine the random value set based on one or more random value seeds that have been given in advance.

(7) According to the exponentiation device of any of the above modification examples (2) to (6), the multiplier set determination unit may randomly select any one of the random values included in the random value set.

(8) According to the exponentiation device of the above modification example (2) or (6), the random value set determination unit may determine the one or more random value seeds itself to be the random value set.

(9) According to the exponentiation device of the above modification example (2) or (6), the random value set determination unit may determine the random value set by generating a random exponent and performing exponentiation of the random value seed using the random exponent to obtain the random value.

(10) According to the exponentiation device of any of the above modification examples (1) to (9), the multiplier set storage unit stores therein two multipliers $X\_0$ and $X\_1$, the multiplier set updating unit determines a result of square of the multiplier $X\_0$ to be an updated multiplier $X0'$, which is the multiplier $X\_0$ that has been updated, and determines a result of multiplication of the updated multiplier $X\_0'$ by the target data to be an updated multiplier $X\_1'$, which is the multiplier $X\_1$ that has been updated, and then stores the updated multipliers $X\_0'$ and $X\_1'$ in the multiplier set storage unit ("x_y" denotes that "y" is written as a subscript index to the right of "x").

(11) According to the exponentiation device of any of the above modification examples (1) to (9), the multiplier set storage unit stores therein $2^k$ multipliers $X\_0, X\_1, X\_2, \ldots, X\_(2^k)$ (where, k is no less than 2), the multiplier set updating unit determines a result of square of the multiplier $X\_0$ to be an updated multiplier $X\_0'$, which is the multiplier $X\_0$ that has been updated, and determines a result of multiplication of the updated multiplier $X0'$ by the target data to be an updated multiplier $X\_1'$, which is the multiplier $X\_1$ that has been updated, and then stores the updated multipliers $X\_0'$ and $X\_1'$ in the multiplier set storage unit ("x_y" denotes x raised to the y-th power).

(12) Also, the present invention is a decryption device that inputs a ciphertext, and outputs, as decrypted text, a result of an exponentiation of the ciphertext using secret information as an exponent, the secret information indicating the number of secrets, the decryption device comprising: an input/output unit operable to receive input of the ciphertext, and output the decrypted text; a secret information storage unit operable to store therein the secret information; an intermediate value storage unit operable to store therein an intermediate value; a secret information judgment unit operable to make a judgment on the secret information; a multiplier set storage unit operable to store therein a plurality of multiplier sets each including a plurality of multipliers; a random value set storage unit operable to store therein a random value set including a plurality of random values; a plurality of multiplier set determination units respectively operable to determine the plurality of multiplier sets based on the plurality of random values included in the random value set, and store the determined multiplier sets in the multiplier set storage unit; a multiplication unit operable to perform, for each of the plurality of multiplier sets, a multiplication of the intermediate value by any one of the multipliers included in the multiplier sets based on a result of the judgment made by the secret information judgment unit, and store a result of the multiplication in the intermediate value storage unit; a squaring unit operable to square the intermediate value, and store a result of the square in the intermediate value storage unit; and a multiplier set updating unit operable to update each of the multiplier sets based on any one of the multipliers included in the multiplier set, and store the updated multiplier set in the multiplier set storage unit, wherein a multiplier to be used by the multiplication unit is selected from among the plurality of multipliers stored in the multiplier storage unit based on the result of the judgment made by the secret information judgment unit, and an influence of the random value determined by the multiplier set determination unit is cancelled, by using a combination of processing performed by any one of the plurality of multiplier set determination units, a multiplier set determination unit among plurality of multiplier set determination units that is other than the any one multiplier set determination unit, the multiplication unit that performs multiplications respectively using the multiplier sets determined by the plurality of multiplier set determination units, the squaring unit, and the multiplier set updating unit.

(13) Also, the present invention is a signature generation device that inputs signature target data, and outputs, as signature data, a result of an exponentiation of the signature target data using secret information as an exponent, the secret information indicating the number of secrets, the signature generation device comprising: an input/output unit operable to receive input of the signature target data, and output the signature data; a secret information storage unit operable to store therein the secret information; an intermediate value storage unit operable to store therein an intermediate value; a secret information judgment unit operable to make a judgment on the secret information; a multiplier set storage unit operable to store therein a plurality of multiplier sets each including a plurality of multipliers; a random value set storage unit operable to store therein a random value set including a plurality of random values; a plurality of multiplier set determination units respectively operable to determine the plurality of multiplier sets based on the plurality of random values included in the random value set, and store the determined multiplier sets in the multiplier set storage unit; a multiplication unit operable to perform, for each of the plurality of multiplier sets, a multiplication of the intermediate value by any one of the multipliers included in the multiplier sets based on a result of the judgment made by the secret information judgment unit, and store a result of the multiplication in the intermediate value storage unit; a squaring unit operable to square the intermediate value, and store a result of the square in the intermediate value storage unit; and a multiplier set updating unit operable to update each of the multiplier sets based on any one of the multipliers included in the multiplier set, and store the updated multiplier set in the multiplier set storage unit, wherein a multiplier to be used by the multiplication unit is selected from among the plurality of multipliers stored in the multiplier storage unit based on the result of the judgment made by the secret information judgment unit, and an influence of the random value determined by the multiplier set determination unit is cancelled, by using a combination of processing performed by any one of the plurality of multiplier set determination units, a multiplier set determination unit among plurality of multiplier set determination units that is other than the any one multiplier set determination unit, the multiplication unit that performs multiplications respectively using the multiplier sets determined by the plurality of multiplier set determination units, the squaring unit, and the multiplier set updating unit.

(14) Also, the present invention is an exponentiation method of inputting target data, and outputting a result of an exponentiation of the target data with use of secret information as an exponent, the secret information indicating the number of secrets, the exponentiation method comprising: an input/output step for receiving input of the target data, and outputting the result of the exponentiation of the target data; a secret information storage step for storing therein the secret information; an intermediate value storage step for storing therein an intermediate value; a secret information judgment step for making a judgment on the secret information; a multiplier set storage step for storing therein a plurality of multiplier sets each including a plurality of multipliers; a random value set storage step for storing therein a random value set including a plurality of random values; a plurality of multiplier set determination steps for respectively determining the plurality of multiplier sets based on the plurality of random values included in the random value set; a multiplication step for performing, for each of the plurality of multiplier sets, a multiplication of the intermediate value by any one of the multipliers included in the multiplier sets based on a result of the judgment made by the secret information judgment step; a squaring step for squaring the intermediate value; and a multiplier set updating step for updating each of the multiplier sets based on any one of the multipliers included in the multiplier set, wherein a multiplier to be used by the multiplication step is selected from among the plurality of multipliers based on the result of the judgment made by the secret information judgment step, and an influence of the random value determined by the multiplier set determination step is cancelled, by using a combination of processing performed by any one of the plurality of multiplier set determination steps, a multiplier set determination step among plurality of multiplier set determination steps that is other than the any one multiplier set determination step, the multiplication step that performs multiplications respectively using the multiplier sets determined by the plurality of multiplier set determination steps, the squaring step, and the multiplier set updating step.

(15) Also, the present invention is a program to be executed by an exponentiation device that inputs target data, and outputs a result of an exponentiation of the target data using secret information as an exponent, the secret information indicating the number of secrets, the program causing a computer to execute: an input/output step for receiving input of the target data, and outputting the result of the exponentiation of the target data; a secret information storage step for storing therein the secret information; an intermediate value storage step for storing therein an intermediate value; a secret information judgment step for making a judgment on the secret information; a multiplier set storage step for storing therein a plurality of multiplier sets each including a plurality of multipliers; a random value set storage step for storing therein a random value set including a plurality of random values; a plurality of multiplier set determination steps for respectively determining the plurality of multiplier sets based on the plurality of random values included in the random value set; a multiplication step for performing, for each of the plurality of multiplier sets, a multiplication of the intermediate value by any one of the multipliers included in the multiplier sets based on a result of the judgment made by the secret information judgment step; a squaring step for squaring the intermediate value; and a multiplier set updating step for updating each of the multiplier sets based on any one of the multipliers included in the multiplier set, wherein a multiplier to be used by the multiplication step is selected from among the plurality of multipliers based on the result of the judgment made by the secret information judgment step, and an influence of the random value determined by the multiplier set determination step is cancelled, by using a combination of processing performed by any one of the plurality of multiplier set determination steps, a multiplier set determination step among plurality of multiplier set determination steps that is other than the any one multiplier set determination step, the multiplication step that performs multiplications respectively using the multiplier sets determined by the plurality of multiplier set determination steps, the squaring step, and the multiplier set updating step.

(16) Also, the present invention is a medium having recorded therein the program according to the modification example (15).

(17) Also, the present invention is an integrated circuit for use in an exponentiation device that inputs target data, and outputs a result of an exponentiation of the target data using secret information indicating the number of secrets as an exponent, the integrated circuit comprising: an input/output unit operable to receive input of the target data, and output the result of the exponentiation of the target data; a secret information storage unit operable to store therein the secret information; an intermediate value storage unit operable to store therein an intermediate value; a secret information judgment unit operable to make a judgment on the secret information; a multiplier set storage unit operable to store therein a plurality of multiplier sets each including a plurality of multipliers; a random value set storage unit operable to store therein a random value set including a plurality of random values; a plurality of multiplier set determination units respectively operable to determine the plurality of multiplier sets based on the plurality of random values included in the random value set, and store the determined multiplier sets in the multiplier set storage unit; a multiplication unit operable to perform, for each of the plurality of multiplier sets, a multiplication of the intermediate value by any one of the multipliers included in the multiplier sets based on a result of the judgment made by the secret information judgment unit, and store a result of the multiplication in the intermediate value storage unit; a squaring unit operable to square the intermediate value, and store a result of the square in the intermediate value storage unit; and a multiplier set updating unit operable to update each of the multiplier sets based on any one of the multipliers included in the multiplier set, and store the updated multiplier set in the multiplier set storage unit, wherein a multiplier to be used by the multiplication unit is selected from among the plurality of multipliers stored in the multiplier storage unit based on the result of the judgment made by the secret information judgment unit, and an influence of the random value determined by the multiplier set determination unit is cancelled, by using a combination of processing performed by any one of the plurality of multiplier set determination units, a multiplier set determination unit among plurality of multiplier set determination units that is other than the any one multiplier set determination unit, the multiplication unit that performs multiplications respectively using the multiplier sets determined by the plurality of multiplier set determination units, the squaring unit, and the multiplier set updating unit.

(18) According to the present invention, in the process of preventing the security deterioration due to the Big Mac Attack and performing exponentiation of target data, the influence of the random value R is cancelled. Accordingly, it is unnecessary to additionally perform cancellation processing, unlike conventional arts. This greatly increases the value of the present invention.

INDUSTRIAL APPLICABILITY

The present invention can be used managerially, continuously, and repeatedly in the industry for manufacturing and retailing the above exponentiation devices, devices for decrypting ciphertexts in accordance with the public key encryption scheme, and devices for generating signature data in accordance with the public key encryption scheme.

Also, the use of the exponentiation device according to the present invention can make it difficult to analyze a private key using the Big Mac Attack.

The invention claimed is:

1. An information security device that securely and reliably processes predetermined information by performing a power operation d&X over a group defined by a predetermined set and a basic operation that uses elements of the predetermined set, the power operation d&X being the basic operation repeatedly performed d times using an element X, the information security device comprising:

a processor;

an acquisition unit operable to acquire a value d;

a main operation unit operable to perform, using the processor, the power operation d&X by performing a window operation and a carry operation based on a window method for each of a plurality of windows, the window operation being performed using the element X and a window value of a corresponding one of the windows, the windows resulting from division of the value d, and each of the windows having a predetermined bit; and a processing unit operable to (i) decrypt the predetermined information using a result of the power operation d&X or (ii) add a digital signature to the predetermined information using a result of the power operation d&X, wherein with respect to a first window included in the windows, the main operation unit uses a random value R to perform the window operation, wherein with respect to a second window included in the windows, the main operation unit uses a cancellation value S to perform the window operation, and wherein the cancellation value S cancels a cumulative factor that is a result of the carry operations performed using the random value R with respect to windows from the first window to the second window.

2. The information security device of claim 1, wherein the second window is ahead of the first window by a value v, wherein the cancellation value S is an inverse of a power operation $(2^\wedge v)\&R$ performed using a result of a power operation $(2^\wedge v)$ and the random value R, wherein the main operation unit includes:

an acquisition subunit operable to acquire the random value R and the cancellation value S;

a variable storage subunit operable to store therein a variable Z;

an initialization subunit operable to assign a unit element to the variable Z, as an initial value;

a carry operation subunit operable to perform the carry operation to carry the variable Z by a window width, and assign a result of the carry operation to the variable Z;

a window operation subunit operable to acquire a result of a power operation w&X performed using the element X and a window value w of a window that is being an operation target, perform the window operation using at least the acquired result of the power operation w&X and the variable Z, and assign a result of the window operation to the variable Z; and a control subunit operable to control the carry operation subunit and the window operation subunit respectively to perform the carry operations and the window operations with respect to all the windows, wherein with respect to the first window, the window operation subunit performs the window operation using a result of the power operation w&X, the random value R, and the variable Z, and assigns a result of the window operation to the variable Z, and wherein with respect to the second window, the window operation subunit performs the window operation using a result of the power operation w&X, the cancellation value S, and the variable Z, and assigns a result of the window operation to the variable Z.

3. The information security device of claim 2, wherein with respect to a window-group that includes i consecutive windows starting with the first window (i is less than v), the window operation subunit performs, for each of the windows included in the window-group, the window operation using a result of the power operation w&X, the random value R, and the variable Z, and wherein with respect to a window-group that includes i consecutive windows starting with the second window, the window operation subunit performs, for each of the windows included in the window-group, the window operation using a result of the power operation w&X, the cancellation value S, and the variable Z.

4. The information security device of claim 3, wherein a number of bits included in each of all the windows of the value d is u (u is an integer no less than 1), wherein a number of the windows of the value d is lend/u, wherein the value lend is a least exponent of 2 that is no less than a bit length of the value d, wherein the value v satisfies lend=2v, wherein the first window is a window located at a head of all the windows of the value d, and the second window is a lend/2u+1-th window counting from the first window, wherein lend/2u windows starting with the first window are divided into a first to a p-th window-groups for each i consecutive windows, and lend/2u windows starting with the second window and ending with a window located at an end of all the windows of the value d are divided into a p+1-th to an m-th window-groups for each i consecutive windows, wherein with respect to the first to the p-th window-groups, when the operation target is shifted from one window-group to a subsequent window-group, the acquisition subunit acquires a random value different from a random value that has been used with respect to the one window-group, wherein with respect to each of the first to the p-th window-groups, the window operation subunit acquires, for each of the windows included in the window-group, a result of the window operation performed using a random value acquired by the acquisition subunit, wherein with respect to an m'-th window-group included in the p+1-th to the m-th window-groups, the acquisition subunit acquires a cancellation value corresponding to a random value that has been used with respect to an (m'−p)-th window-group, and wherein with respect to the m'-th window-group, the window operation subunit acquires a result of the window operation performed using the corresponding cancellation value acquired by the acquisition subunit.

5. The information security device of claim 4, wherein the acquisition subunit stores beforehand therein p random values and p cancellation values in one-to-one correspondence, the p random values being different from each other, wherein with respect to each of the first to the p-th window-groups, the acquisition subunit acquires a random value to be used, by selecting one among one or more random values that have not yet been selected at a time of shift of the operation target to each of the first to the p-th window-groups, and wherein with respect to the m'-th window-group, the acquisition subunit acquires the cancellation value to be used, by selecting the cancellation value corresponding to the random value that has been used with respect to the (m'−p)-th window-group.

6. The information security device of claim 4, wherein the acquisition subunit acquires the different random value, by performing an exponentiation R^q using a predetermined value q and a random value R that is being stored therein at the time of shift of the operation target, and newly storing therein a result of the exponentiation R^q as the random value R, and wherein the acquisition subunit acquires the cancellation value, by performing an exponentiation S^q using the predetermined value q and a cancellation value S that is being stored therein at the time of shift of the operation target, and newly storing therein a result of the exponentiation S^q as the cancellation value S.

7. The information security device of claim 6, wherein the acquisition subunit stores therein beforehand a first seed value U and a second seed value V that is a cancellation value for cancelling a result of a power operation (2^v)&U performed using the value v and the first seed value U, and wherein with respect to the first window-group, before performing the window operations and the carry operations, the acquisition subunit generates a random value r, and (i) performs an exponentiation using the random value r and the first seed value U, and stores therein a result of the exponentiation as a random value R, and (ii) performs an exponentiation using the random value r and the second seed value V, and stores therein a result of the exponentiation as a cancellation value S.

8. The information security device of claim 4, wherein each of all the window-groups includes one window.

9. The information security device of claim 4, wherein each of all the windows of the value d has one bit.

10. The information security device of claim 2,
wherein with respect to a third window that is between the first window and the second window, the acquisition subunit further acquires a random value R' different from the random value R,
wherein the acquisition subunit further acquires a cancellation value S' for canceling a cumulative factor that is a result of the carry operations performed using the random value R' with respect to windows from the third window to the second window, and stores therein the acquired cancellation value S' together with the cancellation value S,
wherein with respect to the third window, the window operation subunit performs the window operation using a result of the power operation w&X, the random value R', and the variable Z, and assigns a result of the window operation to the variable Z, and
wherein with respect to the second window, the window operation subunit further acquires a result of the window operation performed using the cancellation value S'.

11. The information security device of claim 10,
wherein the acquisition subunit stores therein the cancellation values S and S' by storing therein beforehand a value T that is a result of a basic operation performed using the cancellation values S and S', and
wherein with respect to the second window, the acquisition subunit acquires the cancellation values S and S' by acquiring the value T.

12. The information security device of claim 10,
wherein the acquisition subunit stores therein beforehand the cancellation values S and S', and
wherein the acquisition subunit acquires the cancellation values S and S' by performing a basic operation using the cancellation values S and S' to acquire a value T.

13. The information security device of claim 1,
wherein the set is a residue field with a value n being a modulus, and the basic operation is a multiplication,
wherein the element X is a value included the residue field,
wherein the carry operation is an exponentiation over the residue field,
wherein the basic operation and the window operation are each the multiplication over the residue field, and
wherein the main operation unit performs the power operation $d\&X=X^d$ by performing the exponentiation over the residue field and the multiplication over the residue field.

14. The information security device of claim 1,
wherein the predetermined set is a set of points on an elliptic curve, and the basic operation is an addition,
wherein the element X is one of the points on the elliptic curve,
wherein the carry operation is an exponentiation over the elliptic curve,
wherein the basic operation and the window operation are each an addition over the elliptic curve, and
wherein the main operation unit performs the power operation $d\&X=d*X$ by performing the exponentiation over the elliptic curve and the multiplication over the elliptic curve.

15. A method for use in an information security device that securely and reliably processes predetermined information by performing a power operation d&X over a group defined by a predetermined set and a basic operation that uses elements of the predetermined set, the power operation d&X being the basic operation repeatedly performed d times using an element X, the method comprising:

an acquisition step for acquiring a value d;
a main operation step for performing, using a processor, the power operation d&X by performing a window operation and a carry operation based on a window method for each of a plurality of windows, the window operation being performed using the element X and a window value of a corresponding one of the windows, the windows resulting from division of the value d, and each of the windows having a predetermined bit, and
a processing step of (i) decrypting the predetermined information using a result of the power operation d&X or (ii) adding a digital signature to the predetermined information using result of the power operation d&X,
wherein with respect to a first window included in the windows, the main operation step uses a random value R to perform the window operation,
wherein with respect to a second window included in the windows, the main operation step uses a cancellation value S to perform the window operation, and
wherein the cancellation value S cancels a cumulative factor that is a result of the carry operations performed using the random value R with respect to windows from the first window to the second window.

16. A non-transitory computer-readable recording medium having recorded therein a computer program for use in an information security device that securely and reliably processes predetermined information by performing a power operation d&X over a group defined by a predetermined set and a basic operation that uses elements of the predetermined set, the power operation d&X being the basic operation repeatedly performed d times using an element X, wherein, when executed, the computer program causes the information security device to perform a method comprising:

an acquisition step for acquiring a value d;
a main operation step for performing the power operation d&X by performing a window operation and a carry operation based on a window method for each of a plurality of windows, the window operation being performed using the element X and a window value of a corresponding one of the windows, the windows resulting from division of the value d, and each of the windows having a predetermined bit; and
a processing step of (i) decrypting the predetermined information using a result of the power operation d&X or (ii) adding a digital signature to the predetermined information using a result of the power operation d&X,
wherein with respect to a first window included in the windows, the main operation step uses a random value R to perform the window operation,
wherein with respect to a second window included in the windows, the main operation step uses a cancellation value S to perform the window operation, and
wherein the cancellation value S cancels a cumulative factor that is a result of the carry operations performed using the random value R with respect to windows from the first window to the second window.

17. An integrated circuit for use in an information security device that securely and reliably processes predetermined information by performing a power operation d&X over a group defined by a predetermined set and a basic operation that uses elements of the predetermined set, the power operation d&X being the basic operation repeatedly performed d times using an element X, the integrated circuit comprising:

a processor;

an acquisition unit operable to acquire a value d;

a main operation unit operable to perform, using the processor, the power operation d&X by performing a window operation and a carry operation based on a window method for each of a plurality of windows, the window operation being performed using the element X and a window value of a corresponding one of the windows, the windows resulting from division of the value d, and each of the windows having a predetermined bit; and a processing unit operable to (i) decrypt the predetermined information using a result of the power operation d&X or (ii) add a digital signature to the predetermined information using a result of the power operation d&X, wherein with respect to a first window included in the windows, the main operation unit uses a random value R to perform the window operation, wherein with respect to a second window included in the windows, the main operation unit uses a cancellation value S to perform the window operation, and wherein the cancellation value S cancels a cumulative factor that is a result of the carry operations performed using the random value R with respect to windows from the first window to the second window.

* * * * *